US012809078B2

(12) United States Patent
Hiruma et al.

(10) Patent No.: US 12,809,078 B2
(45) Date of Patent: Nov. 24, 2026

(54) LONG PHASE DIFFERENCE FILM, LONG OPTICAL FILM, LONG POLARIZING FILM, MANUFACTURING METHOD FOR LONG PHASE DIFFERENCE FILM, AND MANUFACTURING METHOD FOR LONG OPTICAL FILM

(71) Applicant: DAI NIPPON PRINTING CO., LTD., Tokyo (JP)

(72) Inventors: Yusuke Hiruma, Tokyo (JP); Terutaka Takahashi, Tokyo (JP); Moeko Otsu, Tokyo (JP); Ryo Furugen, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 3 days.

(21) Appl. No.: 18/997,407

(22) PCT Filed: Jul. 21, 2023

(86) PCT No.: PCT/JP2023/026797

§ 371 (c)(1),
(2) Date: Feb. 24, 2025

(87) PCT Pub. No.: WO2024/019148

PCT Pub. Date: Jan. 25, 2024

(65) Prior Publication Data

US 2026/0118568 A1 Apr. 30, 2026

(30) Foreign Application Priority Data

Jul. 21, 2022 (JP) ................................ 2022-116751
Jul. 21, 2022 (JP) ................................ 2022-116770

(51) Int. Cl.
*G02B 5/30* (2006.01)
*B29D 11/00* (2006.01)
(Continued)

(52) U.S. Cl.
CPC ...... *G02B 5/3083* (2013.01); *B29D 11/00644* (2013.01); *G02B 1/12* (2013.01);
(Continued)

(58) Field of Classification Search
CPC .... G02B 5/3083; G02B 5/3016; G02B 5/305; G02B 1/12; B29D 11/00644; G02F 1/1337
(Continued)

(56) References Cited

U.S. PATENT DOCUMENTS

2010/0265433 A1* 10/2010 Hoshi .................. H04N 13/337 349/62
2014/0334001 A1* 11/2014 Oh ....................... G02B 5/3083 156/182
(Continued)

FOREIGN PATENT DOCUMENTS

JP 2013-033085 2/2013
JP 5962760 8/2016
(Continued)

OTHER PUBLICATIONS

International Preliminary Report on Patentability, issued in PCT Application No. PCT/JP2023/026797, dated Jan. 30, 2025, with Written Opinion (translation), 13 pages.
(Continued)

*Primary Examiner* — Jerry M Blevins
(74) *Attorney, Agent, or Firm* — HSML P.C.

(57) ABSTRACT

A long phase difference film (10) having a longitudinal direction (D2) and a transverse direction (D1) includes a substrate (20) and a phase difference layer (40) superimposed to the substrate (20). The phase difference layer (40) includes a first region (41) and a pair of second regions (42). The first region (41) is located between the pair of second regions (42) in the transverse direction (D1). The phase
(Continued)

difference layer (40) contains cured material of a liquid crystal composition. The second region (42) has a second slow axis (A42). A second orientation angle (θ42) between the second slow axis (A42) and the longitudinal direction (D2) is larger than or equal to 0° and smaller than 10° or larger than 170° and smaller than 180°.

17 Claims, 26 Drawing Sheets

(51) Int. Cl.
*G02B 1/12* (2006.01)
*G02F 1/1337* (2006.01)
(52) U.S. Cl.
CPC .......... *G02B 5/3016* (2013.01); *G02B 5/305* (2013.01); *G02F 1/1337* (2013.01)
(58) Field of Classification Search
USPC .......................................................... 349/194
See application file for complete search history.

(56) References Cited

U.S. PATENT DOCUMENTS

| | | | | |
|---|---|---|---|---|
| 2018/0011234 | A1* | 1/2018 | Takahashi | C08G 64/1608 |
| 2018/0272593 | A1* | 9/2018 | Iijima | G02F 1/13363 |
| 2020/0301056 | A1* | 9/2020 | Hisakado | G02B 5/3016 |
| 2022/0365265 | A1* | 11/2022 | Kubota | G02B 5/3033 |

FOREIGN PATENT DOCUMENTS

| | | |
|---|---|---|
| JP | 2019-073712 | 5/2019 |
| JP | 2019-079027 | 5/2019 |
| JP | 2021-124641 | 8/2021 |
| JP | 2021-184046 | 12/2021 |
| WO | 2017/043438 | 3/2017 |

OTHER PUBLICATIONS

International Search Report, issued in the corresponding PCT Application No. PCT/JP2023/026797, dated Oct. 3, 2023, 7 pages (with machine translation).
Japanese Office Action, issued in the corresponding Japanese patent application No. 2022-116770, dated Sep. 29, 2023, 12 pages (with machine translation).
Japanese Office Action, issued in the corresponding Japanese patent application No. 2022-116751, dated Sep. 29, 2023, 13 pages (with machine translation).
Japanese Office Action, issued in the corresponding Japanese patent application No. 2022-116770, dated Jan. 19, 2024, 11 pages (with machine translation).

* cited by examiner

LONG PHASE DIFFERENCE FILM, LONG OPTICAL FILM, LONG POLARIZING FILM, MANUFACTURING METHOD FOR LONG PHASE DIFFERENCE FILM, AND MANUFACTURING METHOD FOR LONG OPTICAL FILM

TECHNICAL FIELD

The present invention relates to a long phase difference film, a long optical film, a long polarizing film, a manufacturing method for a long phase difference film, and a manufacturing method for a long optical film.

BACKGROUND ART

Phase difference films and polarizing films are applied to display, such as organic EL display and liquid crystal display. As described in JP 2021-184046 A, a phase difference film can be prepared by applying a polymerizable liquid crystal composition onto a substrate to form a coating layer on the substrate and curing the coating layer. A long phase difference film can be manufactured by forming a long coating layer on a long substrate and curing the coating layer. A long polarizing film can be manufactured by using a long phase difference film. A roll-to-roll manufacturing method is high in production efficiency and low in manufacturing cost.

In JP 2021-184046 A, a long polarizing film is manufactured by transferring a phase difference layer of a long phase difference film onto a long receiving film. With the thus manufactured long polarizing film, burrs sometimes occur at ends of the transferred phase difference layer in a width direction. When burrs occur, a foreign substance is included in a long polarizing film, with the result that a manufacturing line is contaminated with the foreign substance.

The first and second disclosures are made in consideration of such points, and it is an object of the disclosures to suppress the occurrence of burrs at ends of a phase difference layer.

SUMMARY OF INVENTION

First Disclosure

It is an object of the first disclosure to suppress occurrence of burrs at ends of a phase difference layer.

A long phase difference film according to the first disclosure is a long phase difference film having a longitudinal direction and a transverse direction, and includes:

a substrate; and a phase difference layer superimposed to the substrate, wherein the phase difference layer includes a first region and a pair of second regions, the first region is located between the pair of second regions in the transverse direction, the phase difference layer contains cured material of a liquid crystal composition, the second region has a second slow axis, and a second orientation angle between the second slow axis and the longitudinal direction is larger than or equal to 0° and smaller than 10° or larger than 170° and smaller than 180°.

A long optical film according to the first disclosure is a long optical film having a longitudinal direction and a transverse direction, and includes:

a substrate, a bonding layer, and a phase difference layer in this order, wherein the phase difference layer includes a first region and a pair of second regions, the first region is located between the pair of second regions in the transverse direction, the phase difference layer contains cured material of a liquid crystal composition, the second region has a second slow axis, and a second orientation angle between the second slow axis and the longitudinal direction is larger than or equal to 0° and smaller than 10° or larger than 170° and smaller than 180°.

A long polarizing film according to the first disclosure is a long polarizing film having a longitudinal direction and a transverse direction, and includes:

a polarizing layer including a polarizer; and a phase difference layer superimposed to the polarizing layer, wherein the phase difference layer includes a first region and a pair of second regions, the first region is located between the pair of second regions in the transverse direction, the phase difference layer contains cured material of a liquid crystal composition, the second region has a second slow axis, and a second orientation angle between the second slow axis and the longitudinal direction is larger than or equal to 0° and smaller than 10° or larger than 170° and smaller than 180°.

A manufacturing method for a long phase difference film according to the first disclosure includes:

forming a first coating layer by applying an alignment layer formation composition onto a long substrate having a longitudinal direction and a transverse direction;

applying rays of polarized light, different in polarized state from each other, to an end region and a central region other than the end region of the first coating layer in the transverse direction to form an alignment layer in which the end region and the central region respectively have alignment control forces in orientation directions different from each other, from the first coating layer;

forming a second coating layer by applying a liquid crystal composition to an intermediate including the substrate and the alignment layer; and forming a phase difference layer containing cured material of the liquid crystal composition by curing the second coating layer, wherein the phase difference layer includes a first region facing the central region and a second region facing the end region, the second region has a second slow axis, and a second orientation angle between the second slow axis and the longitudinal direction is larger than or equal to 0° and smaller than 10° or larger than 170° and smaller than 180°.

A manufacturing method for a long optical film according to the first disclosure includes:

laminating the long phase difference film according to the first disclosure to a long receiving film including a bonding layer; and peeling the substrate from the long phase difference film bonded to the bonding layer.

According to the first disclosure, it is possible to suppress occurrence of burrs at ends of a phase difference layer.

Second Disclosure

It is an object of the second disclosure to suppress occurrence of burrs at ends of a phase difference layer.

A long phase difference film according to the second disclosure is a long phase difference film having a longitudinal direction and a transverse direction, and includes:

a substrate; and a phase difference layer superimposed to the substrate, wherein the phase difference layer includes a first region, a pair of second regions, and a pair of third regions, the first region is located between the pair of second regions in the transverse direction, the pair of second regions is located between the pair of third regions in the transverse direction, the phase difference layer contains cured material of a liquid crystal composition, the second region has no orientation, and the third region is horizontally oriented.

A long optical film according to the second disclosure is a long optical film having a longitudinal direction and a transverse direction, and includes:

a substrate, a bonding layer, and a phase difference layer in this order, wherein the phase difference layer includes a first region and a pair of second regions, the first region is located between the pair of second regions in the transverse direction, the phase difference layer contains cured material of a liquid crystal composition, and the second region has no orientation.

A long polarizing film according to the second disclosure is a long polarizing film having a longitudinal direction and a transverse direction, and includes:

a polarizing layer including a polarizer; and a phase difference layer superimposed to the polarizing layer, wherein the phase difference layer includes a first region and a pair of second regions, the first region is located between the pair of second regions in the transverse direction, the phase difference layer contains cured material of a liquid crystal composition, and the second region has no orientation.

A manufacturing method for a long phase difference film according to the second disclosure includes:

forming a first coating layer by applying an alignment layer formation composition onto a long substrate having a longitudinal direction and a transverse direction;

applying polarized light to a central region, other than an end region, of the first coating layer in the transverse direction to form an alignment layer in which the central region has an alignment control force, from the first coating layer;

forming a second coating layer by applying a liquid crystal composition to an intermediate including the substrate and the alignment layer; and forming a phase difference layer containing cured material of the liquid crystal composition by curing the second coating layer, wherein the phase difference layer includes a first region facing the central region, a second region facing the end region, and a third region facing the substrate on an outer side of the alignment layer in the transverse direction, and the third region is horizontally oriented.

A manufacturing method for a long optical film according to the second disclosure includes:

laminating the long phase difference film according to the second disclosure to a long receiving film including a bonding layer; and peeling the substrate from the long phase difference film bonded to the bonding layer.

According to the second disclosure, it is possible to suppress occurrence of burrs at ends of a phase difference layer.

DESCRIPTION OF EMBODIMENTS

Figure 1:
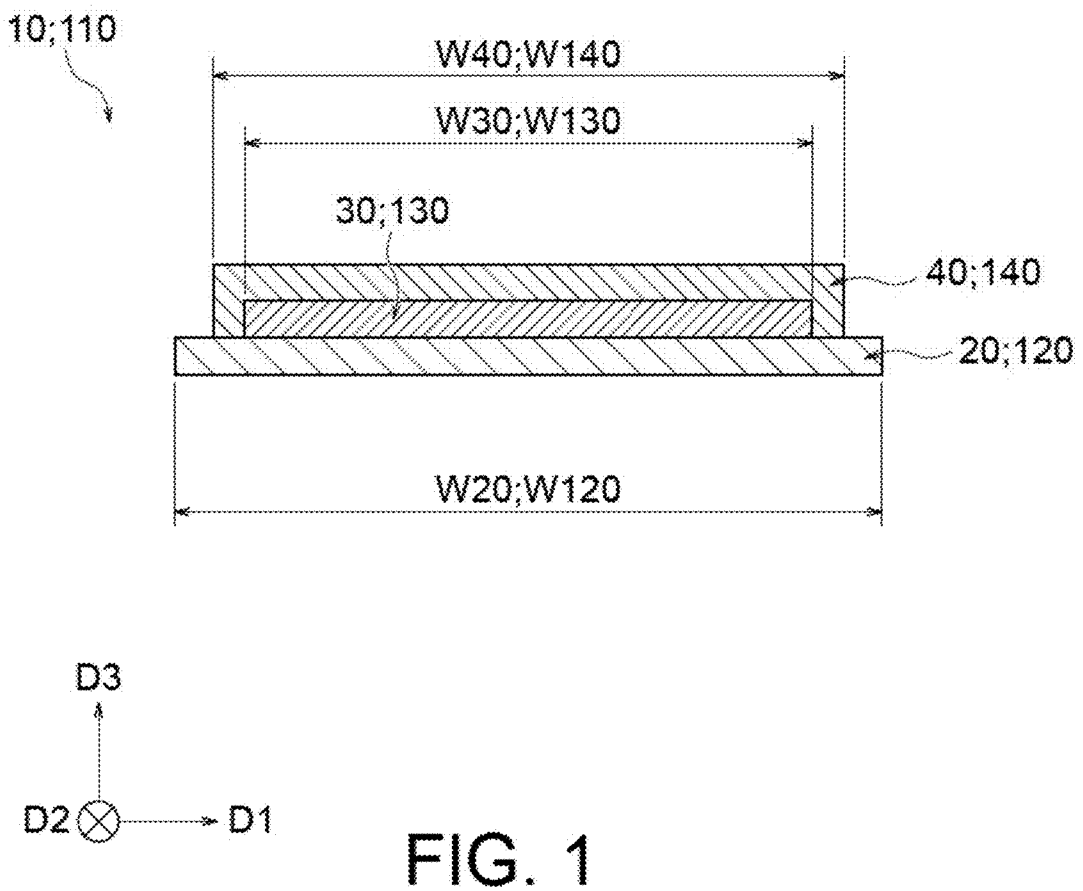
FIG. 1 is a diagram for illustrating first and second embodiments and is a longitudinal sectional view showing an example of a long phase difference film.

A long phase difference film according to the first disclosure is a long phase difference film having a longitudinal direction and a transverse direction, and includes:

substrate; and a phase difference layer superimposed to the substrate, wherein the phase difference layer includes a first region and a pair of second regions, the first region is located between the pair of second regions in the transverse direction, the phase difference layer contains cured material of a liquid crystal composition, the second region has a second slow axis, and a second orientation angle between the second slow axis and the longitudinal direction is larger than or equal to 0° and smaller than 10° or larger than 170° and smaller than 180°.

In the long phase difference film according to the first disclosure, the first region may have a first slow axis, and an absolute value of a value obtained by subtracting 90° from a first orientation angle between the first slow axis and the longitudinal direction may be smaller than an absolute value of a value obtained by subtracting 90° from the second orientation angle.

In the long phase difference film according to the first disclosure, the first orientation angle may be larger than or equal to 10° and smaller than or equal to 170°.

In the long phase difference film according to the first disclosure, the first orientation angle may be larger than or equal to 30° and smaller than or equal to 150°.

In the long phase difference film according to the first disclosure, the first region may include a center of the phase difference layer in the transverse direction.

In the long phase difference film according to the first disclosure, a length of the second region in the transverse direction may be larger than or equal to 1 mm and smaller than or equal to 100 mm.

In the long phase difference film according to the first disclosure, a length of the first region in the transverse direction may be larger than or equal to 12 times a length of the second region in the transverse direction.

In the long phase difference film according to the first disclosure, the phase difference layer may further include a pair of third regions, the pair of second regions may be located between the pair of third regions in the transverse direction, the first region may have a first slow axis, the third region may have a third slow axis, and an absolute value of a value obtained by subtracting 90° from a third orientation angle between the third slow axis and the longitudinal direction may be smaller than an absolute value of a value obtained by subtracting 90° from the second orientation angle.

In the long phase difference film according to the first disclosure, the third orientation angle may be larger than or equal to 40° and smaller than or equal to 140°.

In the long phase difference film according to the first disclosure, the third region may include an end of the phase difference layer in the transverse direction.

The long phase difference film according to the first disclosure may further include an alignment layer located between the substrate and the first and second regions, and the third region may be in contact with the substrate.

In the long phase difference film according to the first disclosure, the alignment layer may include a photo-alignment layer.

In the long phase difference film according to the first disclosure, the substrate may include a polyester film having a slow axis, and an angle between the slow axis of the polyester film and the longitudinal direction may be larger than or equal to 40° and smaller than or equal to 140°.

In the long phase difference film according to the first disclosure, a length of the third region in the transverse direction may be larger than or equal to 0.5 mm and smaller than or equal to 50 mm.

In the long phase difference film according to the first disclosure, an in-plane phase difference Re(450) in the first region of the phase difference layer at a wavelength of 450 nm may be smaller than an in-plane phase difference Re(550) in the first region of the phase difference layer at a wavelength of 550 nm, the in-plane phase difference Re(550) may be smaller than an in-plane phase difference Re(650) in the first region of the phase difference layer at a wavelength of 650 nm, and the in-plane phase difference Re(550) may be larger than or equal to 130 nm and smaller than or equal to 153 nm.

A long optical film according to the first disclosure is a long optical film having a longitudinal direction and a transverse direction, and includes:

a substrate, a bonding layer, and a phase difference layer in this order, wherein the phase difference layer includes a first region and a pair of second regions, the first region is located between the pair of second regions in the transverse direction, the phase difference layer contains cured material of a liquid crystal composition, the second region has a second slow axis, and a second orientation angle between the second slow axis and the longitudinal direction is larger than or equal to 0° and smaller than 10° or larger than 170° and smaller than 180°.

In the long optical film according to the first disclosure, the first region may have a first slow axis, and an absolute value of a value obtained by subtracting 90° from a first orientation angle between the first slow axis and the longitudinal direction may be smaller than an absolute value of a value obtained by subtracting 90° from the second orientation angle.

In the long optical film according to the first disclosure, the first orientation angle may be larger than or equal to 10° and smaller than or equal to 170°.

A long polarizing film according to the first disclosure is a long polarizing film having a longitudinal direction and a transverse direction, and includes:

a polarizing layer including a polarizer; and a phase difference layer superimposed to the polarizing layer, wherein the phase difference layer includes a first region and a pair of second regions, the first region is located between the pair of second regions in the transverse direction, the phase difference layer contains cured material of a liquid crystal composition, the second region has a second slow axis, and a second orientation angle between the second slow axis and the longitudinal direction is larger than or equal to 0° and smaller than 10° or larger than 170° and smaller than 180°.

In the long polarizing film according to the first disclosure, the first region may have a first slow axis, and an absolute value of a value obtained by subtracting 90° from a first orientation angle between the first slow axis and the longitudinal direction may be smaller than an absolute value of a value obtained by subtracting 90° from the second orientation angle.

In the long polarizing film according to the first disclosure, the first orientation angle may be larger than or equal to 10° and smaller than or equal to 170°.

In the long polarizing film according to the first disclosure, the first orientation angle may be larger than or equal to 30° and smaller than or equal to 150°.

In the long polarizing film according to the first disclosure, the second region may include an end of the phase difference layer in the transverse direction.

In the long polarizing film according to the first disclosure, the first region may include a center in the transverse direction.

In the long polarizing film according to the first disclosure, a length of the second region in the transverse direction may be larger than or equal to 1 mm and smaller than or equal to 100 mm.

In the long polarizing film according to the first disclosure, a length of the first region in the transverse direction may be larger than or equal to 12 times a length of the second region in the transverse direction.

In the long polarizing film according to the first disclosure, an in-plane phase difference Re(450) in the first region of the phase difference layer at a wavelength of 450 nm may be smaller than an in-plane phase difference Re(550) in the first region of the phase difference layer at a wavelength of 550 nm, the in-plane phase difference Re(550) may be smaller than an in-plane phase difference Re(650) in the first region of the phase difference layer at a wavelength of 650 nm, and the in-plane phase difference Re(550) may be larger than or equal to 130 nm and smaller than or equal to 153 nm.

A manufacturing method for a long phase difference film according to the first disclosure includes:

forming a first coating layer by applying an alignment layer formation composition onto a long substrate having a longitudinal direction and a transverse direction;

applying rays of polarized light, different in polarized state from each other, to an end region and a central region other than the end region of the first coating layer in the transverse direction to form an alignment layer in which the end region and the central region respectively have alignment control forces in orientation directions different from each other, from the first coating layer;

forming a second coating layer by applying a liquid crystal composition to an intermediate including the substrate and the alignment layer; and forming a phase difference layer containing cured material of the liquid crystal composition by curing the second coating layer, wherein the phase difference layer includes a first region facing the central region and a second region facing the end region, the second region has a second slow axis, and a second orientation angle between the second slow axis and the longitudinal direction is larger than or equal to 0° and smaller than 10° or larger than 170° and smaller than 180°.

In the manufacturing method for a long phase difference film according to the first disclosure, the first region may have a first slow axis, and an absolute value of a value obtained by subtracting 90° from a first orientation angle between the first slow axis and the longitudinal direction may be smaller than an absolute value of a value obtained by subtracting 90° from the second orientation angle.

In the manufacturing method for a long phase difference film according to the first disclosure, the first orientation angle may be larger than or equal to 10° and smaller than or equal to 170°.

In the manufacturing method for a long phase difference film according to the first disclosure, the first orientation angle may be larger than or equal to 30° and smaller than or equal to 150°.

In the manufacturing method for a long phase difference film according to the first disclosure, the first region may include a center in the transverse direction.

In the manufacturing method for a long phase difference film according to the first disclosure, a length of the second region in the transverse direction may be larger than or equal to 1 mm and smaller than or equal to 100 mm.

In the manufacturing method for a long phase difference film according to the first disclosure, a length of the first region in the transverse direction may be larger than or equal to 12 times a length of the second region in the transverse direction.

In the manufacturing method for a long phase difference film according to the first disclosure, the phase difference layer may further include a pair of third regions, the pair of second regions may be located between the pair of third regions in the transverse direction, the first region may have a first slow axis, the third region may have a third slow axis, and an absolute value of a value obtained by subtracting 90° from a third orientation angle between the third slow axis and the longitudinal direction may be smaller than an absolute value of a value obtained by subtracting 90° from the second orientation angle.

In the manufacturing method for a long phase difference film according to the first disclosure, the third orientation angle may be larger than or equal to 40° and smaller than or equal to 140°.

In the manufacturing method for a long phase difference film according to the first disclosure, the third region may include an end of the phase difference layer in the transverse direction.

In the manufacturing method for a long phase difference film according to the first disclosure, the third region may be in contact with the substrate.

In the manufacturing method for a long phase difference film according to the first disclosure, the substrate may include a polyester film having a slow axis, and an angle between the slow axis of the polyester film and the longitudinal direction may be larger than or equal to 40° and smaller than or equal to 140°.

In the manufacturing method for a long phase difference film according to the first disclosure, a length of the third region in the transverse direction may be larger than or equal to 0.5 mm and smaller than or equal to 50 mm.

In the manufacturing method for a long phase difference film according to the first disclosure, an in-plane phase difference Re(450) in the first region of the phase difference layer at a wavelength of 450 nm may be smaller than an in-plane phase difference Re(550) in the first region of the phase difference layer at a wavelength of 550 nm, the in-plane phase difference Re(550) may be smaller than an in-plane phase difference Re(650) in the first region of the phase difference layer at a wavelength of 650 nm, and the in-plane phase difference Re(550) may be larger than or equal to 130 nm and smaller than or equal to 153 nm.

A manufacturing method for a long optical film according to the first disclosure includes:

laminating the long phase difference film according to the first disclosure to a long receiving film including a bonding layer; and peeling the substrate from the long phase difference film bonded to the bonding layer.

In the manufacturing method for a long optical film according to the first disclosure, the long optical film may include the first region of the phase difference layer and part of the second region, and remaining part of the second region, other than the part of the second region of the phase difference layer, may remain on the substrate.

In the manufacturing method for a long optical film according to the first disclosure, in a state where the long phase difference film is laminated to the receiving film, the second region may face an end of the bonding layer in the transverse direction.

In the manufacturing method for a long optical film according to the first disclosure, the long optical film may include the first region of the phase difference layer and part of the second region, and the third region of the phase difference layer and remaining part of the second region, other than the part of the second region, may remain on the substrate.

In the manufacturing method for a long optical film according to the first disclosure, in a state where the long phase difference film is laminated to the receiving film, the second region may face an end of the bonding layer in the transverse direction, and the third region may be located on an outer side of the bonding layer in the transverse direction and face the substrate of the receiving film.

In the manufacturing method for a long optical film according to the first disclosure, the receiving film may include a polarizing layer containing a polarizer.

A long phase difference film according to the second disclosure is a long phase difference film having a longitudinal direction and a transverse direction, and includes:

a substrate; and a phase difference layer superimposed to the substrate, wherein the phase difference layer includes a first region, a pair of second regions, and a pair of third regions, the first region is located between the pair of second regions in the transverse direction, the pair of second regions is located between the pair of third regions in the transverse direction, the phase difference layer contains cured material of a liquid crystal composition, the second region has no orientation, and the third region is horizontally oriented, in other words, the third region has horizontal orientation.

In the long phase difference film according to the second disclosure, the third region may have a third slow axis, and a third orientation angle between the third slow axis and the longitudinal direction may be larger than or equal to 40° and smaller than or equal to 140°.

In the long phase difference film according to the second disclosure, the first region may have a first slow axis, and a first orientation angle between the first slow axis and the longitudinal direction may be larger than or equal to 10° and smaller than or equal to 80° or larger than or equal to 100° and smaller than or equal to 170°.

In the long phase difference film according to the second disclosure, the third region may include an end of the phase difference layer in the transverse direction.

In the long phase difference film according to the second disclosure, the first region may include a center of the phase difference layer in the transverse direction.

The long phase difference film according to the second disclosure may further include an alignment layer located between the substrate and the first and second regions, and the third region may be in contact with the substrate.

In the long phase difference film according to the second disclosure, the alignment layer may include a photo-alignment layer.

In the long phase difference film according to the second disclosure, the substrate may include a polyester film.

In the long phase difference film according to the second disclosure, the polyester film may have a slow axis, and an angle between the slow axis of the polyester film and the longitudinal direction may be larger than or equal to 40° and smaller than or equal to 140°.

In the long phase difference film according to the second disclosure, a length of the second region in the transverse direction may be larger than or equal to 1 mm and smaller than or equal to 200 mm.

In the long phase difference film according to the second disclosure, a length of the third region in the transverse direction may be larger than or equal to 0.5 mm and smaller than or equal to 50 mm.

In the long phase difference film according to the second disclosure, a length of the first region in the transverse direction may be larger than or equal to six times a length of the second region in the transverse direction.

In the long phase difference film according to the second disclosure, an in-plane phase difference Re(450) in the first region of the phase difference layer at a wavelength of 450 nm may be smaller than an in-plane phase difference Re(550) in the first region of the phase difference layer at a wavelength of 550 nm, the in-plane phase difference Re(550) may be smaller than an in-plane phase difference Re(650) in the first region of the phase difference layer at a wavelength of 650 nm, and the in-plane phase difference Re(550) may be larger than or equal to 130 nm and smaller than or equal to 153 nm.

A long optical film according to the second disclosure is a long optical film having a longitudinal direction and a transverse direction, and includes:

a substrate, a bonding layer, and a phase difference layer in this order, wherein the phase difference layer includes a first region and a pair of second regions, the first region is located between the pair of second regions in the transverse direction, the phase difference layer contains cured material of a liquid crystal composition, and the second region has no orientation.

A long polarizing film according to the second disclosure is a long polarizing film having a longitudinal direction and a transverse direction, and includes:

a polarizing layer including a polarizer; and a phase difference layer superimposed to the polarizing layer, wherein the phase difference layer includes a first region and a pair of second regions, the first region is located between the pair of second regions in the transverse direction, the phase difference layer contains cured material of a liquid crystal composition, and the second region has no orientation.

In the long polarizing film according to the second disclosure, the first region may have a first slow axis, and a first orientation angle between the first slow axis and the longitudinal direction may be larger than or equal to 10° and smaller than or equal to 80° or larger than or equal to 100° and smaller than or equal to 170°.

In the long polarizing film according to the second disclosure, the second region may include an end of the phase difference layer in the transverse direction.

In the long polarizing film according to the second disclosure, the first region may include a center of the phase difference layer in the transverse direction.

In the long polarizing film according to the second disclosure, a length of the second region in the transverse direction may be larger than or equal to 1 mm and smaller than or equal to 100 mm.

In the long polarizing film according to the second disclosure, a length of the first region in the transverse direction may be larger than or equal to 12 times a length of the second region in the transverse direction.

In the long polarizing film according to the second disclosure, an in-plane phase difference Re(450) in the first region of the phase difference layer at a wavelength of 450 nm may be smaller than an in-plane phase difference Re(550) in the first region of the phase difference layer at a wavelength of 550 nm, the in-plane phase difference Re(550) may be smaller than an in-plane phase difference Re(650) in the first region of the phase difference layer at a wavelength of 650 nm, and the in-plane phase difference Re(550) may be larger than or equal to 130 nm and smaller than or equal to 153 nm.

A manufacturing method for a long phase difference film according to the second disclosure includes:

forming a first coating layer by applying an alignment layer formation composition onto a long substrate having a longitudinal direction and a transverse direction;

applying polarized light to a central region, other than an end region, of the first coating layer in the transverse direction to form an alignment layer in which the central region has an alignment control force from the first coating layer;

forming a second coating layer by applying a liquid crystal composition to an intermediate including the substrate and the alignment layer; and forming a phase difference layer containing cured material of the liquid crystal composition by curing the second coating layer, wherein the phase difference layer includes a first region facing the central region, a second region facing the end region, and a third region facing the substrate on an outer side of the alignment layer in the transverse direction, and the third region is horizontally oriented, in other words, the third region has horizontal orientation.

In the manufacturing method for a long phase difference film according to the second disclosure, the third region may have a third slow axis, and a third orientation angle between the third slow axis and the longitudinal direction may be larger than or equal to 40° and smaller than or equal to 140°.

In the manufacturing method for a long phase difference film according to the second disclosure, the first region may have a first slow axis, and a first orientation angle between the first slow axis and the longitudinal direction may be larger than or equal to 10° and smaller than or equal to 80° or larger than or equal to 100° and smaller than or equal to 170°.

In the manufacturing method for a long phase difference film according to the second disclosure, the third region may include an end of the phase difference layer in the transverse direction.

In the manufacturing method for a long phase difference film according to the second disclosure, the first region may include a center of the phase difference layer in the transverse direction.

In the manufacturing method for a long phase difference film according to the second disclosure, the substrate may include a polyester film having a slow axis, and an angle between the slow axis of the polyester film and the longitudinal direction may be larger than or equal to 40° and smaller than or equal to 140°.

In the manufacturing method for a long phase difference film according to the second disclosure, a length of the second region in the transverse direction may be larger than or equal to 1 mm and smaller than or equal to 200 mm.

In the manufacturing method for a long phase difference film according to the second disclosure, a length of the third region in the transverse direction may be larger than or equal to 0.5 mm and smaller than or equal to 50 mm.

In the manufacturing method for a long phase difference film according to the second disclosure, a length of the first region in the transverse direction may be larger than or equal to six times a length of the second region in the transverse direction.

In the manufacturing method for a long phase difference film according to the second disclosure, an in-plane phase difference Re(450) in the first region of the phase difference layer at a wavelength of 450 nm may be smaller than an in-plane phase difference Re(550) in the first region of the phase difference layer at a wavelength of 550 nm, the in-plane phase difference Re(550) may be smaller than an in-plane phase difference Re(650) in the first region of the phase difference layer at a wavelength of 650 nm, and the in-plane phase difference Re(550) may be larger than or equal to 130 nm and smaller than or equal to 153 nm.

A manufacturing method for a long optical film according to the second disclosure includes:

laminating the long phase difference film according to the second disclosure to a long receiving film including a bonding layer; and peeling the substrate from the long phase difference film bonded to the bonding layer.

In the manufacturing method for a long optical film according to the second disclosure, the long optical film may include the first region of the phase difference layer and part of the second region, and the third region of the phase difference layer and remaining part of the second region, other than the part of the second region, may remain on the substrate.

In the manufacturing method for a long optical film according to the second disclosure, in a state where the long phase difference film is laminated to the receiving film, the second region may face an end of the bonding layer in the transverse direction, and the third region may be located on an outer side of the bonding layer in the transverse direction and face the substrate of the receiving film.

In the manufacturing method for a long optical film according to the second disclosure, the receiving film may include a polarizing layer containing a polarizer.

Hereinafter, the details of embodiments of the present disclosure will be described. In the drawings attached to the present specification, for the sake of easiness of illustration and understanding, the scale, dimensional aspect ratio, and the like are changed or exaggerated as needed from those of real ones.

In the specification, the terms such as “film”, “sheet”, and “plate” are not distinguished from one another by the difference in name only. For example, a “phase difference film” cannot be distinguished from a member or the like called a phase difference sheet or a phase difference plate by the difference in name only. A “polarizing film” cannot be distinguished from a member or the like called a polarizing sheet or a polarizing plate by the difference in name only.

A “film surface (a sheet surface or a plate surface)” indicates a surface that coincides with a planar direction of a film-like member (a sheet-like member or a plate-like member) that is a target in a case where a target film-like (sheet-like or plate-like) member is viewed from an overall and macro perspective. A normal direction to a film-like (sheet-like or plate-like) member indicates a normal direction to a film surface (a sheet surface or a plate surface) of the film-like (sheet-like or plate-like) member.

In the specification, when a plurality of upper limit candidates and a plurality of lower limit candidates are listed for a parameter, the numeric range of the parameter may be a combination of a selected one upper limit candidate and a selected one lower limit candidate. In an example, the sentence “Parameter B may be larger than or equal to A1, may be larger than or equal to A2, or may be larger than or equal to A3. Parameter B may be smaller than or equal to A4, may be smaller than or equal to A5, or may be smaller than or equal to A6.” will be discussed. In this example, the numeric range of parameter B may be larger than or equal to A1 and smaller than or equal to A4, may be larger than or equal to A1 and smaller than or equal to A5, may be larger than or equal to A1 and smaller than or equal to A6, may be larger than or equal to A2 and smaller than or equal to A4, may be larger than or equal to A2 and smaller than or equal to A5, may be larger than or equal to A2 and smaller than or equal to A6, may be larger than or equal to A3 and smaller than or equal to A4, may be larger than or equal to A3 and smaller than or equal to A5, or may be larger than or equal to A3 and smaller than or equal to A6.

To clarify the dimensional relationship among the drawings, some of the drawings show a common first direction D1, a common second direction D2, and a common third direction D3 with arrows indicated by common reference signs. The arrowhead sides are first sides of the directions. Opposite sides to the arrowhead sides are second sides of the directions. An arrow pointing backward from the sheet of a drawing along a direction perpendicular to the sheet is represented by, for example, a symbol in which a cross is drawn in a circle as shown in FIG. 1. An arrow pointing forward from the sheet of a drawing along a direction perpendicular to the sheet is represented by, for example, a symbol in which a dot is drawn in a circle as shown in FIG. 2.

Figure 20:
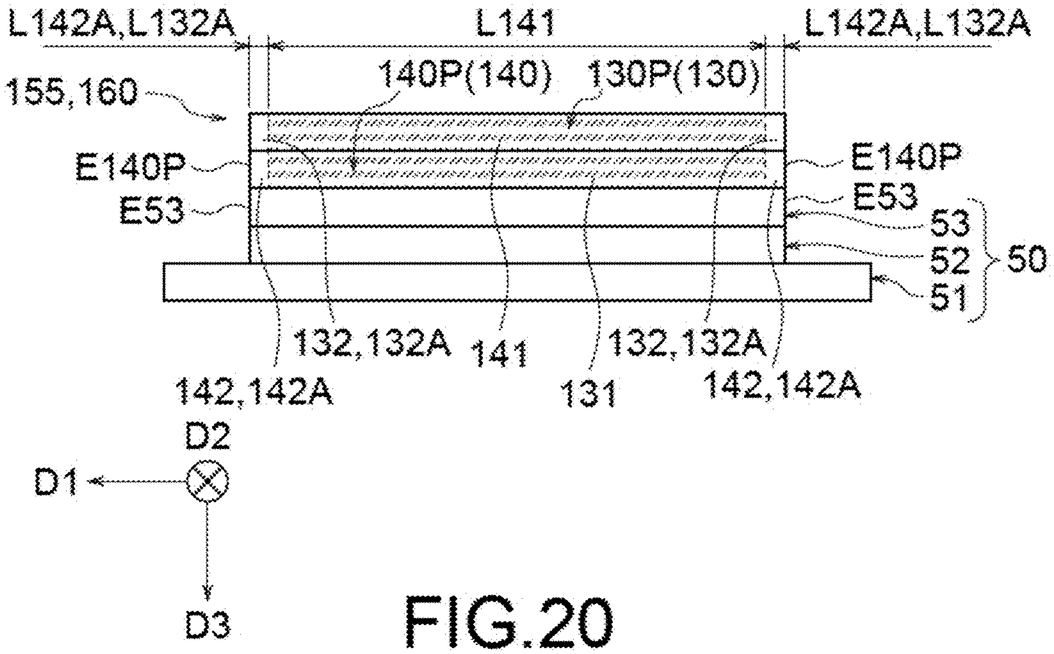
FIG. 20 is a longitudinal sectional view showing an example of a long optical film and a long polarizing film manufactured by using the long phase difference film of FIG. 12.
Figure 21:
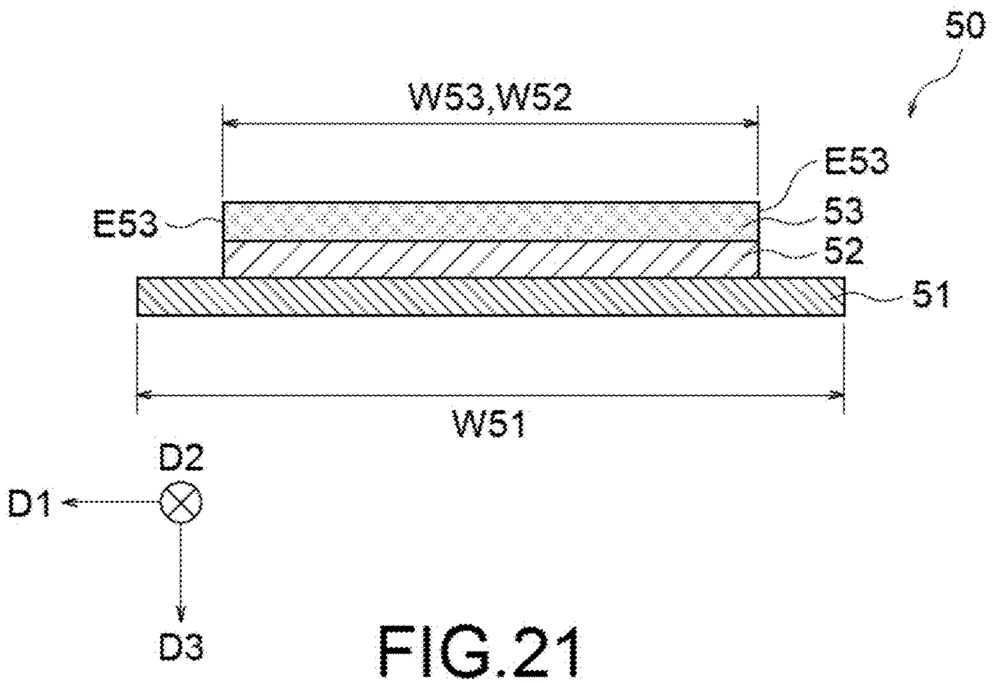
FIG. 21 is a longitudinal sectional view showing an example of a receiving film used to manufacture the long optical film and the long polarizing film of FIG. 19 and the long optical film and the long polarizing film of FIG. 20.

Hatching indicating a cross section is drawn in FIGS. 1 and 21. In the other drawings, hatching is omitted. Hatching indicating the alignment control force of an alignment layer 30; 130 and the oriented state of a phase difference layer 40; 140 is drawn in FIGS. 8 to 11, 16 to 20, 23, 24, 26, 27, and 30 to 34. The hatching drawn in FIGS. 8 to 11, 16 to 20, 23, 24, 26, 27, and 30 to 34 does not indicate a cross section.

<<Long Phase Difference Films 10, 110>>

Figure 2:
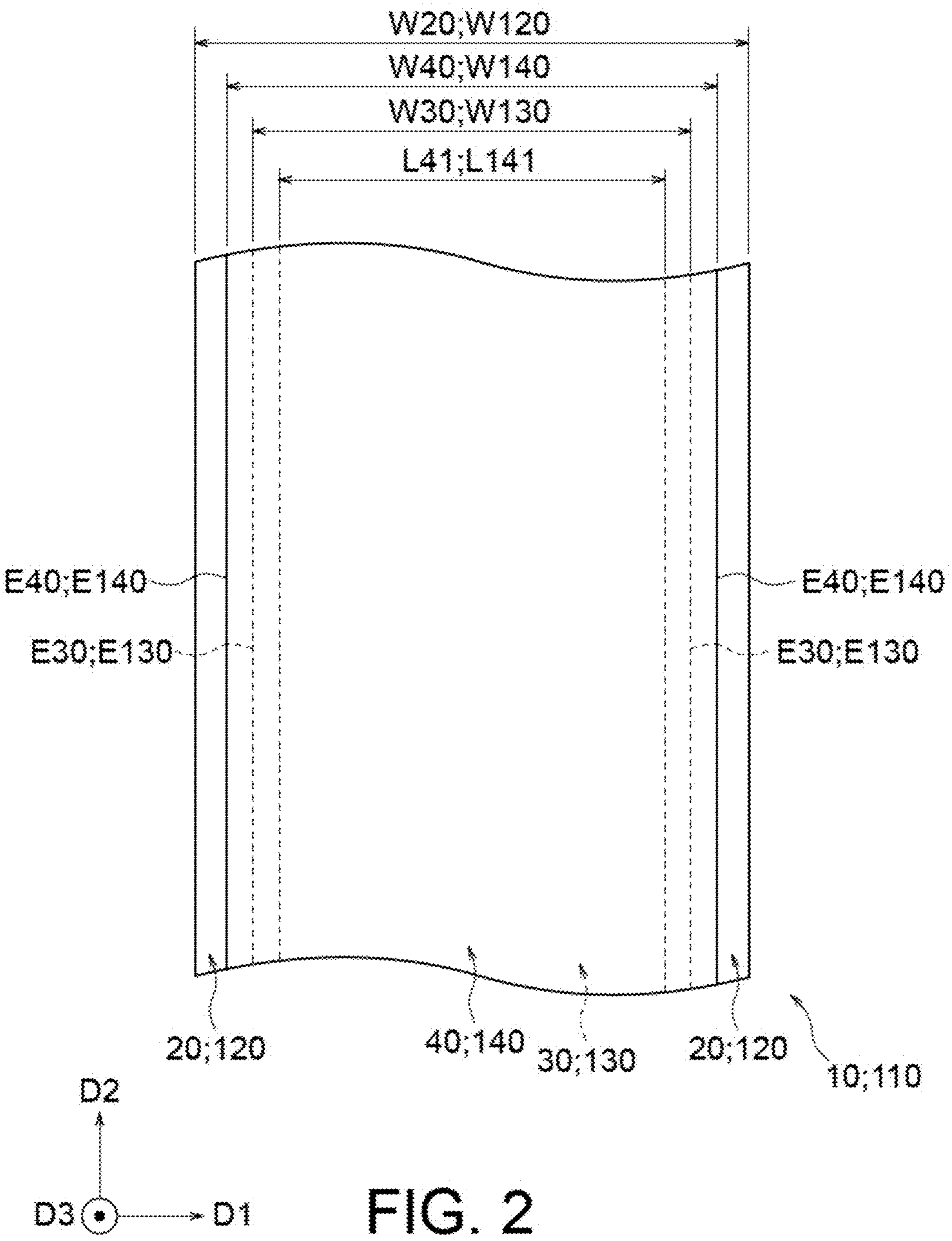
FIG. 2 is a plan view showing the example of the long phase difference film of FIG. 1.
Figure 3:
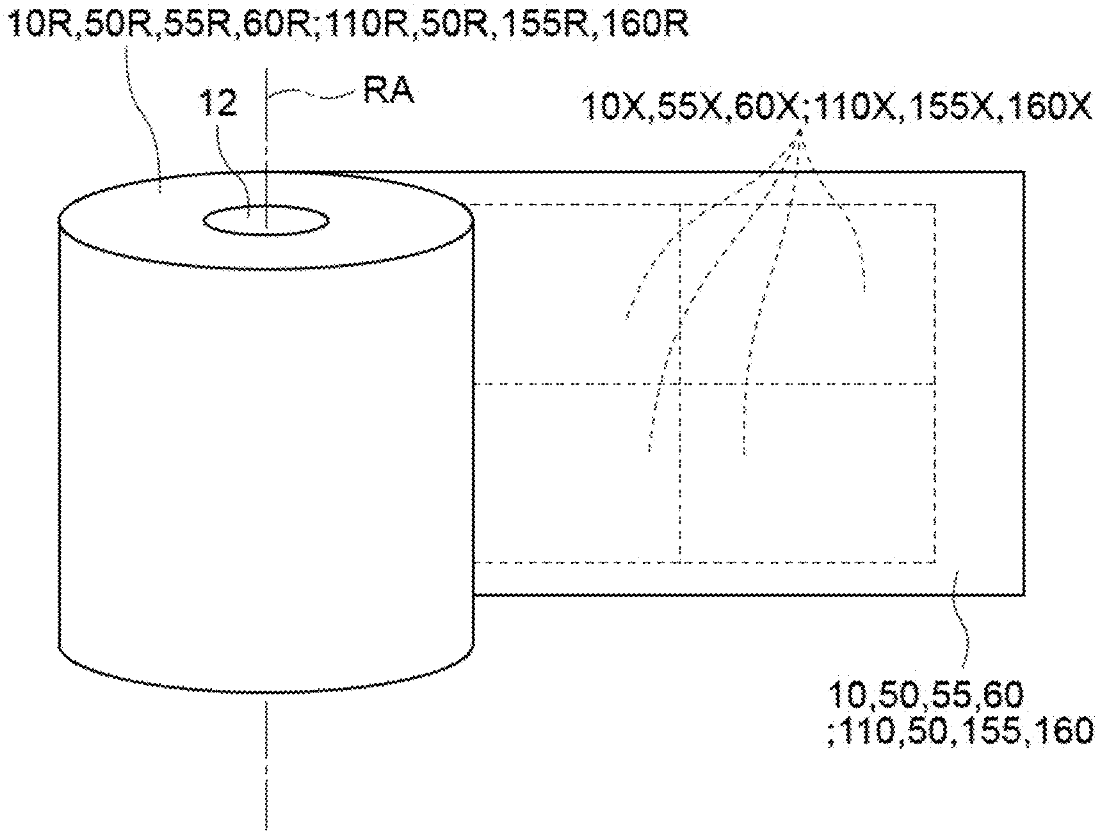
FIG. 3 is a perspective view showing an example of a long phase difference film, a receiving film, a long optical film, and a long polarizing film.

FIGS. 1 to 3 show an example of a long phase difference film 10 according to a first embodiment (described later) and a long phase difference film 110 according to a second embodiment (described later). As shown in FIGS. 1 and 2, the long phase difference film 10; 110 has a longitudinal direction and a transverse direction (lateral direction, shorter side direction). The transverse direction may be orthogonal to the longitudinal direction. In the drawings, the longitudinal direction of the long phase difference film 10; 110 is indicated as the second direction D2. The transverse direction of the long phase difference film 10; 110 is indicated as the first direction D1. The long phase difference film 10; 110 expands in the first direction D1 and in the second direction D2. The normal direction of the long phase difference film 10; 110 is indicated as the third direction D3. The third direction D3 is the thickness direction of the long phase difference films 10, 110. The first direction D1 and the second direction D2 may be orthogonal to each other. The third direction D3 may be orthogonal to the first direction D1. The third direction D3 may be orthogonal to the second direction D2.

As shown in FIG. 3, the long phase difference film 10; 110 can be handled as a rolled body 10R; 110R in which the long phase difference film 10; 110 is taken up with a take-up core 12 about a take-up axis RA. Thus, the handleability of the long phase difference film 10; 110 can be improved. As will be described later, the long phase difference film 10; 110 can be manufactured with a roll-to-roll manufacturing method. The long phase difference film 10; 110 is high in production efficiency and low in manufacturing cost.

Long Film 10 of First Embodiment

Figure 4:
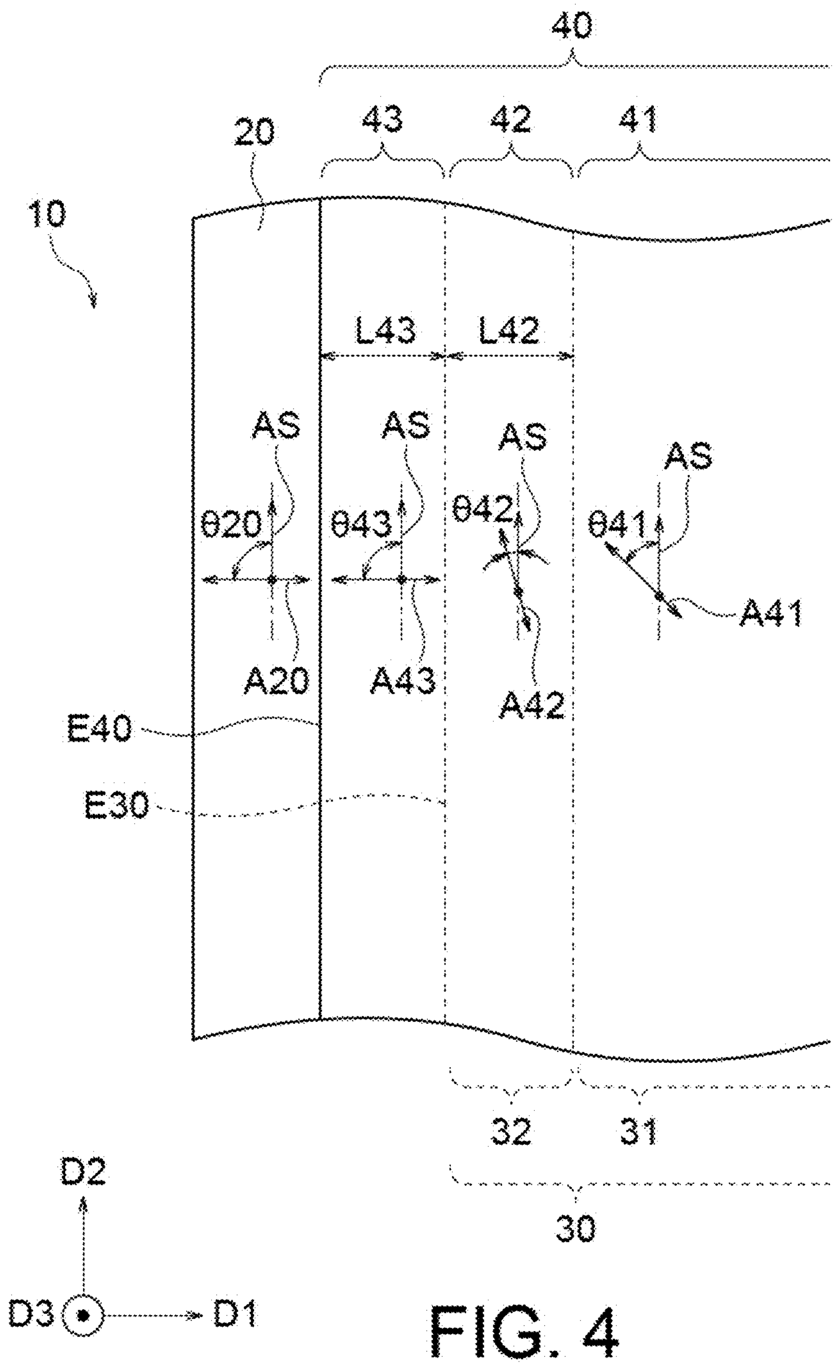
FIG. 4 is a diagram for illustrating the first embodiment and is a partially enlarged view of FIG. 2.

Hereinafter, the long phase difference film 10 according to the first embodiment of the present disclosure will be described in detail. The long phase difference film 10 according to the present embodiment includes a substrate 20 and a phase difference layer 40 superimposed to the substrate 20 as shown in FIG. 4. The substrate 20 is long. The phase difference layer 40 is long. The phase difference layer 40 includes a first region 41 and a pair of second regions 42. In the illustrated example, the phase difference layer 40 further includes a pair of third regions 43. The first region 41 is located between the pair of second regions 42 in the transverse direction. The pair of second regions 42 is located between the pair of third regions 43 in the transverse direction. The phase difference layer 40 contains cured material of a liquid crystal composition. The second region 42 has a horizontal orientation. The second region 42 has a second slow axis A42, and a second orientation angle θ42 between the second slow axis A42 and the longitudinal direction is larger than or equal to 0° and smaller than 10° or larger than 170° and smaller than 180°.

In the specification, the word “long” means that a target object, such as a film, has a length of 5 m or larger, may have a length of 10 m or larger, or may have a length of 100 m or larger in an expanded state. In the specification, the word “longitudinal direction” means a direction along the longest edge in a state where a target object, such as a film, is expanded. In the specification, the word “transverse direction” means a direction in which the shortest length is obtained in a state where a target object, such as a film, is expanded.

As will be described later, the long phase difference film 10 is laminated to a long receiving film 50 including a bonding layer 53, and then the substrate 20 is peeled off from the long phase difference film 10 bonded to the bonding layer 53, thus making it possible to transfer the phase difference layer 40 onto the receiving film 50. At this time, it is possible to suppress occurrence of burrs at ends in the transverse direction of the phase difference layer 40 transferred onto the receiving film 50.

In the illustrated example, the long phase difference film 10 further includes an alignment layer (alignment film) 30. The alignment layer 30 is located between the substrate 20 and the phase difference layer 40 in the third direction D3. The alignment layer 30 is long. Hereinafter, the layers of the long phase difference film 10 will be described with reference to the drawings.

<Phase Difference Layer 40>

The phase difference layer 40 contains cured material of a liquid crystal composition. The liquid crystal composition contains a liquid crystal compound. The liquid crystal composition may be a liquid crystal composition that performs a polymerization reaction, that is, a polymerizable liquid crystal composition. The liquid crystal composition may contain a polymerizable liquid crystal compound. The phase difference layer 40 may contain a polymerizable liquid crystal compound. The phase difference layer 40 can be obtained by applying a liquid crystal composition to form a coating layer (coating film) and then curing the liquid crystal composition. The oriented state of the liquid crystal compound in the coating layer may be adjusted to horizontal orientation, vertical orientation, tilt orientation, twist orientation, hybrid orientation, or the like. The optical characteristics of each region in the phase difference layer 40 can be controlled by adjusting the orientation of the liquid crystal compound in the coating layer. The orientation of the liquid crystal compound in each region of the phase difference layer 40 will be described later.

The polymerizable liquid crystal compound is not limited. The polymerizable liquid crystal compound may be a polymerizable liquid crystal compound used to form a birefringent layer. The polymerizable liquid crystal compound is selected as needed according to a retardation value, wavelength dispersion, orientation, solubility, and the like, desired for the phase difference layer 40.

The polymerizable liquid crystal compound is a liquid crystal compound having a polymerizable group. The polymerizable liquid crystal compound includes a polymerizable functional group in a molecule. With the polymerizable functional group, a liquid crystal compound can be polymerized to be fixed, so it is high in orientation stability and possible to reduce a temporal change in phase difference. The polymerizable liquid crystal compound may be a monofunctional liquid crystal compound including a single polymerizable functional group. The polymerizable liquid crystal compound may be a multifunctional liquid crystal compound including two or more polymerizable functional groups. Since two or more polymerizable functional groups are included, a three-dimensional orientation of a liquid crystal compound becomes further stable, and a temporal change in phase difference can be further reduced. The polymerizable liquid crystal compound may be a multifunctional liquid crystal compound including three polymerizable functional groups. The polymerizable liquid crystal compound may be a multifunctional liquid crystal compound including two polymerizable functional groups. The polymerizable functional group may be polymerized by using ionizing radiation, such as ultra violet radiation and electron beam. The polymerizable functional group may be polymerized by the agency of heat. The polymerizable liquid crystal compound may be a low-molecular liquid crystal compound. The polymerizable liquid crystal compound may be a polymer liquid crystal compound.

The polymerizable functional group may be a radical polymerizable functional group. Examples of the radical polymerizable functional group include a functional group having at least one addition-polymerizable ethylenic unsaturated double bond. Specific examples of the polymerizable functional group include a vinyl group, an acrylate group (a generic name for an acryloyl group, a methacryloyl group, an acryloyl group and a methacryloyloxy group), and the like having or not having a substituent.

The polymerizable functional group may be a cation polymerizable functional group. Specific example of the polymerizable functional group include an alicyclic ether group (such as an epoxy group and an oxetanyl group), a cyclic acetal group, a cyclic lactone group, a cyclic imino ether group, a cyclic thioether group, a spiroorthoester group, and a vinyloxy group.

The polymerizable liquid crystal composition may contain a single polymerizable liquid crystal compound. The polymerizable liquid crystal composition may contain two or more polymerizable liquid crystal compounds. It is possible to adjust a retardation value, wavelength dispersion, orientation, solubility, phase transition temperature, and the like by combining two or more polymerizable liquid crystal compounds.

The polymerizable liquid crystal composition may contain at least one or more materials of a non-liquid-crystalline polymerizable compound, a photopolymerization initiator, a sensitizer, a leveling agent, an antioxidant, and a light stabilizer.

The wavelength dispersion of the phase difference layer 40 may be reverse dispersion. Reverse dispersion means wavelength dispersion such that the in-plane phase difference (in-plane phase retardation) Re increases from a shorter wavelength side toward a longer wavelength side. When the wavelength dispersion of the phase difference layer 40 is set to reverse dispersion, it is possible to suppress fluctuations in the in-plane phase difference Re according to a wavelength, and it is excellent in color representation. Examples of the polymerizable liquid crystal compound that exhibits reverse dispersion include compounds expressed by the general formula (1) of JP 2019-073712 A and compounds expressed by the general formula (II) of International Publication No. WO 2017/043438.

The phase difference layer 40 having reverse dispersion may have the following optical characteristics regarding an in-plane phase difference (in-plane phase retardation value) in the first region 41.

$Re(450)<Re(550)$ $Re(550)<Re(650)$

Re(450) is an in-plane phase difference in the first region 41 of the phase difference layer 40 at a wavelength of 450 nm. Re(550) is an in-plane phase difference in the first region 41 of the phase difference layer 40 at a wavelength of 550 nm. Re(650) is an in-plane phase difference in the first region 41 of the phase difference layer 40 at a wavelength of 650 nm.

Re(450), Re(550), and Re(650) in the first region 41 of the phase difference layer 40 are not limited. In an example in which the first region 41 of the phase difference layer 40 is set to a λ/4 phase difference layer, Re(450), Re(550), and Re(650) may be larger than or equal to 90 nm, may be larger than or equal to 100 nm, or may be larger than or equal to 110 nm. In an example in which the first region 41 of the phase difference layer 40 is set to a λ/4 phase difference layer, Re(450), Re(550), and Re(650) may be smaller than or equal to 180 nm, may be smaller than or equal to 160 nm, or may be smaller than or equal to 150 nm. In an example in which the first region 41 of the phase difference layer 40 is set to a λ/4 phase difference layer, the in-plane phase difference Re(550) may be larger than or equal to 130 nm, may be larger than or equal to 133 nm, or may be larger than or equal to 136 nm. In an example in which the first region 41 of the phase difference layer 40 is set to a λ/4 phase difference layer, the in-plane phase difference Re(550) may be smaller than or equal to 153 nm, may be smaller than or equal to 150 nm, or may be smaller than or equal to 147 nm. By setting the in-plane phase differences in the first region 41 of the phase difference layer 40 in this way, the first region 41 of the phase difference layer 40 can be used as a circularly polarizing plate in combination with a polarizer.

The thickness of the phase difference layer 40 in the third direction D3 may be larger than or equal to 0.1 μm, may be larger than or equal to 0.5 μm, or may be larger than or equal to 1.5 μm. The thickness of the phase difference layer 40 may be smaller than or equal to 5.0 μm, may be smaller than or equal to 4.0 μm, or may be smaller than or equal to 3.0 μm. By setting the thickness of the phase difference layer 40 in this way, the appropriate in-plane phase difference can be imparted to the first region 41 of the phase difference layer 40 as a λ/4 phase difference layer.

The thicknesses of component elements of the phase difference layer 40 and the long phase difference film 10 and the thicknesses of component elements of the receiving film 50 and a long optical film 55 (described later) are assumed as the average values of measured values at 20 points in an observation image of the long phase difference film 10, the receiving film 50, and the like with a scanning transmission electron microscope (STEM). The thicknesses of component elements of a phase difference layer 140 and a long phase difference film 110 according to the second embodiment (described later) and the thicknesses of component elements of a long optical film 155 are also assumed as the average values of measured values at 20 points in an observation image of the long phase difference film 110 and the like with a scanning transmission electron microscope (STEM).

In the specification, an in-plane phase difference is assumed as the average value of measured values at 16 points. Sixteen measurement points are set to 16 points of intersections as the center of measurement when a 1 cm region from an outer edge of a measurement sample is assumed as a margin and lines are drawn to divide a region inside the margin into five in a vertical direction and a horizontal direction. When the measurement sample has a quadrangular shape, the in-plane phase difference of the measurement sample is determined by setting a 1 cm region from the outer edge of a quadrangle as a margin, performing measurement mainly at 16 points of intersections of lines dividing a region inside the margin into five in the vertical direction and the horizontal direction, and calculating the average values thereof. When the measurement sample has a shape other than a quadrangular shape, such as a circular shape, an elliptical shape, a triangular shape, and a pentagonal shape, a square or rectangle having the maximum area, inscribing these shapes, is determined, measurement at 16 points is performed with the above method for the square or rectangle. The in-plane phase difference is measured with the product named "RETS-100" made by Otsuka Electronics Co., Ltd.

In the specification, the in-plane phase difference Re is measured with the RETS-100 in accordance with the following procedure (A1) to (A4).

(A1) Initially, to stabilize a light source of the RETS-100, the light source is turned on and left standing for 60 minutes or longer. After that, a rotating analyzer method is selected, and a θ mode is selected. When the θ mode is selected, a stage becomes a tilt and rotation stage.

(A2) Subsequently, the following measurement conditions are input to the RETS-100.

(Measurement Conditions)

Retardation measurement range: rotating analyzer method
Measurement Spot Diameter: ϕ5 mm
Tilt angle range: 0°
Measurement wavelength range: 400 nm to 800 nm
Average refractive index of measuring object layer (for example, in the case of a PET film, N=1.617)
Thickness: a thickness separately measured with a STEM (A3) Subsequently, background data is obtained without mounting a sample in this apparatus. The apparatus is a closed system and performs this operation each time the light source is turned on.

(A4) After that, a sample is mounted on the stage in the apparatus and is measured.

When the measuring object of the in-plane phase difference does not have a sufficient size because of the reasons, such as a narrow width, a measurement sample having a sufficient size in conditions equivalent to those of the measuring object is prepared, the in-plane phase difference measured for the measurement sample is used as a measuring object in-plane phase difference.

<Substrate 20>

The substrate 20 supports the phase difference layer 40. In the illustrated example, the substrate 20 also supports the alignment layer 30. The substrate 20 may be transparent. In the specification, transparency means that a total light transmittance compliant with JIS K7361-1:1997 is higher than or equal to 50%, may be higher than or equal to 70%, may be higher than or equal to 80%, or may be higher than or 90%. In manufacturing the long phase difference film 10 with a roll-to-roll process, the substrate 20 may have flexibility such that the substrate 20 is allowed to be taken up in a rolled shape.

A resin may be used as the material of the substrate 20. The substrate 20 made of resin has flexibility and is suitable for a roll-to-roll manufacturing method. Examples of the material of the substrate 20 include polyesters (for example, polyethylene terephthalate and polyethylene naphthalate), polyurethane, polyimide, polyamide, polycarbonate, polymethyl methacrylate, and polymethyl acrylate.

A biaxially-stretched polyester film is high in transparency and high in mechanical characteristics. A biaxially-stretched polyester film can be birefringent. A birefringent biaxially-stretched polyester film can exercise alignment control force to a liquid crystal compound contained in a liquid crystal composition for forming the phase difference layer 40, as will be described later. In many resin substrates, such as polyester films, the stretching axis is a slow axis. In many resin substrates, such as biaxially-stretched polyester films, the stretching direction in which a stretching ratio is the largest is a slow axis. A resin film is ordinarily stretched in a longitudinal direction and in a transverse direction orthogonal to the longitudinal direction. The stretching ratio in the transverse direction is larger than the stretching ratio in the longitudinal direction.

In the illustrated example, the absolute value of a value obtained by subtracting 90° from an orientation angle θ20 that the slow axis A20 of the biaxially-stretched resin substrate 20 forms with the longitudinal direction (second direction D2) is smaller than the absolute value of a value obtained by subtracting 90° from the second orientation angle θ42. The orientation angle θ20 may be larger than or equal to 40°, may be larger than or equal to 50°, may be larger than or equal to 60°, may be larger than or equal to 70°, or may be larger than or equal to 80°. The orientation angle θ20 may be smaller than or equal to 140°, may be smaller than or equal to 130°, may be smaller than or equal to 120°, may be smaller than or equal to 110°, or may be smaller than or equal to 100°. The orientation angle θ20 may be 90°. As shown in FIG. 4, the orientation angle is the magnitude of angle between the slow axis and the longitudinal direction (second direction D2). The orientation angle is the magnitude of an angle that, where an axis extending toward one side in the longitudinal direction is a reference axis AS, the slow axis forms with the reference axis AS in a counterclockwise direction. The orientation angle is determined as an angle larger than or equal to 0° and smaller than 180°. In the example shown in FIG. 4, the reference axis AS is oriented toward the first side in the second direction D2.

The substrate 20 may contain at least one of a fire retardant, an anti-blocking agent, an antioxidant, a light stabilizer, a tackifier, and an antistatic agent, in a binder resin made of the above-described material.

The thickness of the substrate 20 in the third direction D3 may be larger than or equal to 10 μm, may be larger than or equal to 25 μm, or may be larger than or equal to 30 μm. The thickness of the substrate 20 may be smaller than or equal to 1000 μm, may be smaller than or equal to 200 μm, or may be smaller than or equal to 150 μm.

The surface of the substrate 20, facing the alignment layer 30 and the phase difference layer 40, does not need to be subjected to surface treatment. When the phase difference layer 40 is transferred onto the receiving film 50 as will be described later, the substrate 20 having a non-treated surface can be easily peeled off from the long phase difference film 10. The surface of the substrate 20, not facing the alignment layer 30 or the phase difference layer 40, may be subjected to surface treatment.

<Alignment Layer 30>

As shown in FIGS. 1 and 2, the long phase difference film 10 includes the alignment layer (alignment film) 30 between the substrate 20 and the phase difference layer 40. The alignment layer 30 has an alignment control force. The alignment layer 30 adjusts the orientation of the phase difference layer 40. The alignment layer 30 arranges the liquid crystal compound contained in the phase difference layer 40 in a certain direction.

The alignment layer 30 exercises alignment control force for the liquid crystal compound as described below. The alignment layer may be a rubbing alignment layer. A rubbing alignment layer is imparted with an alignment control force through a rubbing process. An alignment layer formation composition is applied onto the substrate 20 to form a coating layer (coating film) on the substrate 20, and the coating layer is subjected to rubbing process with a rubbing roll or the like, with the result that a rubbing alignment layer is obtained. The alignment layer 30 is more preferably a photo-alignment layer. A photo-alignment layer is imparted with an alignment control force when irradiated with polarized light.

The material of the alignment layer is not limited according to the above description. Materials used as the material of a rubbing alignment layer or the material of a photo-alignment layer may be used. Examples of the material of the rubbing alignment layer include polyvinyl alcohol resins, polyimide resins, and polyamide resins.

More preferably, a photo-alignment material that provides alignment control force by applying polarized light is used as the material of the photo-alignment layer. The material of the photo-alignment layer may be any one of a photodimerization material and a photoisomerization material. A photo-alignment material is applied onto the substrate 20 to form a coating layer on the substrate 20, and the coating layer is cured by applying polarized light to the coating layer made of a photo-alignment material, with the result that the photo-alignment layer is obtained.

The thickness of the alignment layer 30 in the third direction D3 may be larger than or equal to 1 nm or may be larger than or equal to 60 nm. The thickness of the alignment layer 30 may be smaller than or equal to 1000 nm or may be smaller than or equal to 500 nm.

<Optical Characteristics of Phase Difference Layer 40>

In the long phase difference film 10 according to the present embodiment, the phase difference layer 40 includes the first region 41, the pair of second regions 42, and the pair of third regions 43. The first region 41 is located between the pair of second regions 42 in the transverse direction. The pair of second regions 42 is located between the pair of third regions 43 in the transverse direction.

The first region 41 is cut from the long phase difference film 10 and is used as a phase difference film 10X (see FIG. 3). The first region 41 is imparted with a desired phase difference according to the use of the phase difference film 10X. In the first region 41, the liquid crystal compound may be horizontally oriented. In the specification, horizontal orientation means that a liquid crystal compound is arranged along the sheet surface of the phase difference layer 40 (in the case of the second embodiment (described later), the sheet surface of the phase difference layer 140). In the first region 41, the liquid crystal compound may be arranged so as to extend in one direction along a plane defined by the first direction D1 and the second direction D2. In this example, the first region 41 can be in-plane birefringent. The first region 41 can have a first slow axis A41 in the plane. The orientation of the liquid crystal compound in the first region 41 can be adjusted by the alignment control force imparted to the alignment layer 30.

In the illustrated example, a first orientation angle θ41 between the first slow axis A41 of the first region 41 and the longitudinal direction (second direction D2) is larger than or equal to 10° and smaller than or equal to 170°. In an example, the first orientation angle θ41 may be larger than or equal to 10°, may be larger than or equal to 20°, or may be larger than or equal to 30°. In this example, the first orientation angle θ41 may be smaller than or equal to 80°, may be smaller than or equal to 70°, or may be smaller than or equal to 60°. In another example, the first orientation angle θ41 may be larger than or equal to 100°, may be larger than or equal to 110°, or may be larger than or equal to 120°. In this another example, the first orientation angle θ41 may be smaller than or equal to 170°, may be smaller than or equal to 160°, or may be smaller than or equal to 150°.

In the example shown in FIG. 4, the first region 41 may be used as a λ/4 phase difference layer. The first region 41 of the phase difference layer 40 may be laminated with a polarizing layer having a transmission axis in any one of the first direction D1 and the second direction D2 to make up a circularly polarizing plate. In this example, the first orientation angle θ41 between the first slow axis A41 of the first region 41 and the longitudinal direction (second direction D2) may be larger than or equal to 30°, may be larger than or equal to 35°, may be larger than or equal to 40°, or may be larger than or equal to 42°. In this example, the first orientation angle θ41 may be smaller than or equal to 90°, may be smaller than or equal to 80°, may be smaller than or equal to 70°, may be smaller than or equal to 60°, may be smaller than or equal to 55°, may be smaller than or equal to 50°, or may be smaller than or equal to 48°. In this example, the first orientation angle θ41 may be 45°.

In another example in which the first region 41 is used as a λ/4 phase difference layer, the first orientation angle θ41 may be larger than or equal to 125°, may be larger than or equal to 130°, or may be larger than or equal to 132°. In this another example, the first orientation angle θ41 may be smaller than or equal to 145°, may be smaller than or equal to 140°, or may be smaller than or equal to 138°. In this another example, the first orientation angle θ41 may be 135°.

As has been already described, the orientation angle is the magnitude of angle between the slow axis and the longitudinal direction (second direction D2). The orientation angle is the magnitude of an angle that, where an axis extending toward one side in the longitudinal direction is a reference axis AS, the slow axis forms with the reference axis AS in a counterclockwise direction. The orientation angle is determined as an angle larger than or equal to 0° and smaller than 180°.

As shown in FIG. 4, in the second region 42, the liquid crystal compound may be horizontally oriented. The second region 42 has horizontal orientation. In other words, in the second region 42, the liquid crystal compound may be oriented in the plane of the phase difference layer 40. Furthermore, in other words, in the second region 42, the liquid crystal compound may be arranged so as to extend in one direction along a plane defined by the first direction D1 and the second direction D2. In this example, the second region 42 can be in-plane birefringent. The second region 42 can have a second slow axis A42 in the plane. The orientation of the liquid crystal compound in the second region 42 can be adjusted by the alignment control force imparted to the alignment layer 30. A second orientation angle θ42 between the second slow axis A42 and the longitudinal direction (second direction D2) is larger than or equal to 0° and smaller than 10° or larger than 170° and smaller than 180°. In an example, the second orientation angle θ42 may be smaller than 10°, may be smaller than or equal to 8°, may be smaller than or equal to 5°, or may be 0°. The second orientation angle θ42 may be larger than 170°, may be larger than or equal to 172°, or may be larger than or equal to 175°. The absolute value of a value obtained by subtracting 90° from the second orientation angle θ42 may be larger than the absolute value of a value obtained by subtracting 90° from the first orientation angle θ41. In other words, the absolute value of a value obtained by subtracting 90° from the first orientation angle θ41 may be smaller than the absolute value of a value obtained by subtracting 90° from the second orientation angle θ42.

As shown in FIG. 4, the third region 43 has a third slow axis A43. In the third region 43, the liquid crystal compound may be horizontally oriented. The third region 43 has horizontal orientation. In other words, in the third region 43, the liquid crystal compound may be oriented in the plane of the phase difference layer 40. Furthermore, in other words, in the third region 43, the liquid crystal compound may be arranged so as to extend in one direction along a plane defined by the first direction D1 and the second direction D2. In this example, the third region 43 can be in-plane birefringent. The third region 43 can have a third slow axis A43 in the plane. The absolute value of a value obtained by subtracting 90° from a third orientation angle θ43 between the third slow axis A43 and the longitudinal direction (second direction D2) may be smaller than the absolute value of a value obtained by subtracting 90° from the second orientation angle θ42. In other words, the absolute value of a value obtained by subtracting 90° from the second orientation angle θ42 may be larger than the absolute value of a value obtained by subtracting 90° from the third orientation angle θ43. In the illustrated example, the third orientation angle θ43 is larger than or equal to 40° and smaller than or equal to 140°. In an example, the third orientation angle θ43 may be larger than or equal to 40°, may be larger than or equal to 50°, may be larger than or equal to 60°, may be larger than or equal to 70°, or may be larger than or equal to 80°. The third orientation angle θ43 may be smaller than or equal to 140°, may be smaller than or equal to 130°, may be smaller than or equal to 120°, may be smaller than or equal to 110°, or may be smaller than or equal to 100°. The third orientation angle θ43 may be 90°.

The orientation of the liquid crystal compound in the third region 43 may be adjusted by the alignment control force imparted to the alignment layer 30. The orientation of the liquid crystal compound in the third region 43 may be adjusted due to the alignment control force of the substrate 20 imparted with the slow axis by stretching.

The phase difference layer of the long phase difference film can be transferred onto a long receiving film and used. In the phase difference layer of an existing long phase difference film, a liquid crystal compound is oriented in a certain direction over the entire surface. When the phase difference layer of the existing long phase difference film is transferred onto a receiving film and the substrate is peeled in the longitudinal direction from the long phase difference film, burrs can occur at ends of the phase difference layer in the transverse direction (width direction). Manufactured products, such as a phase difference film to which burrs are attached and an optical film manufactured by using the phase difference film to which burrs are attached, cannot be used as products. When burrs occur, the burrs contaminate a manufacturing line in which the long phase difference film is handled. If the manufacturing line is contaminated with burrs, the burrs can also adhere to manufactured products to be manufactured in the manufacturing line thereafter. In other words, the yield of manufactured products related to the long phase difference film can be significantly decreased.

The inventors of the present disclosure made a study of occurrence of burrs and found that occurrence of burrs comes under the influence of the relationship between a direction in which a substrate is peeled from a long phase difference film and the slow axis of a liquid crystal compound in a phase difference layer.

Figure 26:
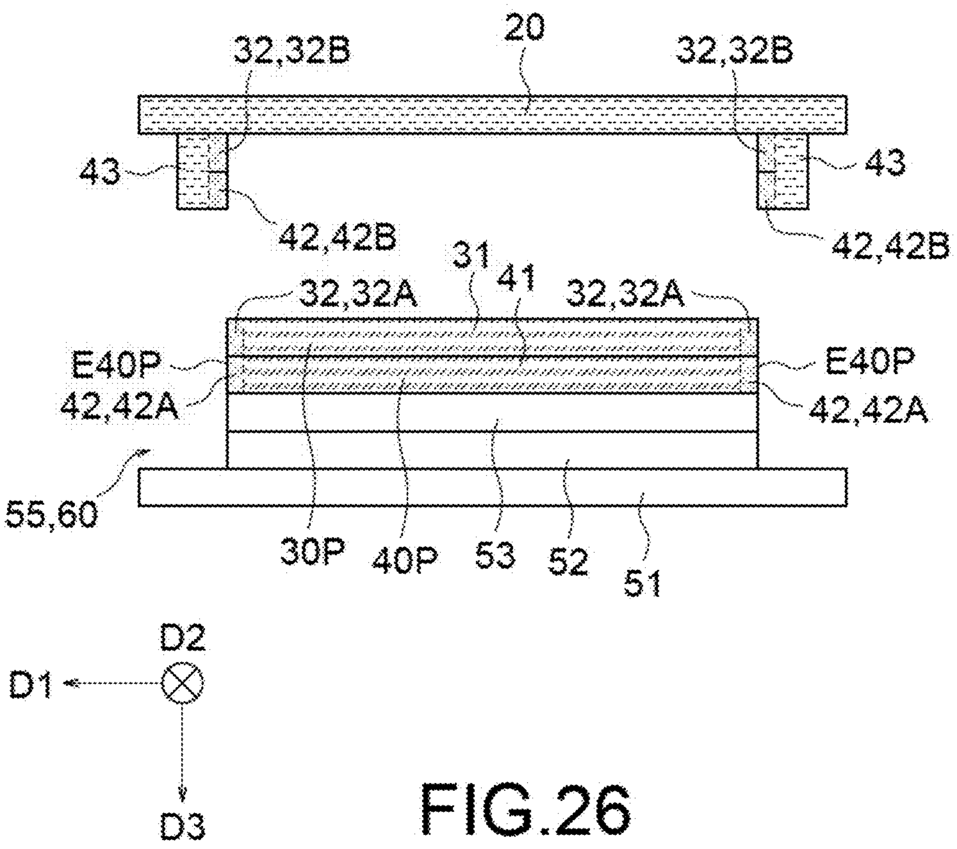
FIG. 26 is a diagram illustrating the manufacturing method of FIG. 22.

Initially, as shown in FIG. 26 that will be referenced later, when a phase difference layer is transferred onto a receiving film, both end parts of the phase difference layer are torn from the other part and remain on the substrate. In other words, only a center part of the phase difference layer is transferred onto the receiving film. Then, it was observed that, when the phase difference layer was torn, the phase difference layer was more easily torn along its slow axis. The orientation angle of the slow axis in the long phase difference film is ordinarily other than 0° and is often larger than or equal to 10° and smaller than or equal to 80° or larger than or equal to 100° and smaller than or equal to 170°, and is, for example, 45° or 135°. As for the phase difference layer of which the orientation angle was 45° or 135°, burrs easily occurred.

From such a phenomenon, it is estimated that the phase difference layer can be stably torn in the longitudinal direction (second direction D2) that is a direction in which the substrate is peeled off when an orientation axis is aligned in the longitudinal direction, that is, when the absolute value of a value obtained by subtracting 90° from the orientation angle is increased.

Based on such a study, in the present embodiment, the orientations of liquid crystal compounds respectively in the regions 41, 42, 43 of the phase difference layer 40 are adjusted. In the present embodiment, the second region 42 and the third region 43 are not intended to be cut out from the long phase difference film 10 and used as the phase difference film 10X. The second region 42 is a region scheduled to tear the phase difference layer 40 when the substrate 20 is peeled off from the long phase difference film 10. The third region 43 is a region intended to remain on the substrate 20 peeled off from the long phase difference film 10.

Initially, in the present embodiment, in the second region 42 of the phase difference layer 40, the orientation angle θ42 of the slow axis A42 is larger than or equal to 0° and smaller than 10° or larger than 170° and smaller than 180°. Therefore, in the second region 42, the phase difference layer 40 is easily torn in the longitudinal direction (second direction D2). Thus, the phase difference layer 40 can be torn linearly in the second region 42 in the longitudinal direction (second direction D2) that is the direction in which the substrate 20 is peeled off. As a result, it is possible to reduce burrs to occur at ends E40P in the transverse direction (first direction D1) of a phase difference layer 40P transferred onto the receiving film 50.

According to the findings obtained by the inventors of the subject application, when the orientation axis of the phase difference layer 40 forms a large angle with the direction in which the phase difference layer 40 is torn, that is, when the absolute value of a value obtained by subtracting 90° from the orientation angle of the phase difference layer 40 reduces, the phase difference layer 40 is difficult to be torn in the tearing direction. Based on such findings, in the illustrated example, the phase difference layer 40 is configured such that the absolute value of a value obtained by subtracting 90° from the orientation angle θ41 of the slow axis A41 in the first region 41 is smaller than the absolute value of a value obtained by subtracting 90° from the orientation angle θ42 of the slow axis A42 in the second region 42. Therefore, the first region 41 is more difficult to be torn in the longitudinal direction than the second region 42. Thus, when the substrate 20 is peeled off from the long phase difference film 10 in the longitudinal direction (second direction D2), linear tearing in the second region 42 in the direction in which the substrate 20 is peeled off is facilitated. In the illustrated example, the orientation angle θ42 of the slow axis A42 in the second region 42 is larger than or equal to 0° and smaller than 10° or larger than 170° and smaller than 180°, while the orientation angle θ41 of the slow axis A41 in the first region 41 is larger than or equal to 30° and smaller than or equal to 150°. Therefore, the first region 41 is remarkably more difficult to be torn in the longitudinal direction than the second region 42. Thus, when the substrate 20 is peeled off from the long phase difference film 10, linear tearing in the second region 42 in the direction in which the substrate 20 is peeled off is effectively facilitated.

In the illustrated example, the phase difference layer 40 is configured such that the absolute value of a value obtained by subtracting 90° from the orientation angle θ43 of the slow axis A43 in the third region 43 is smaller than the absolute value of a value obtained by subtracting 90° from the orientation angle θ42 of the slow axis A42 in the second region 42. Therefore, the third region 43 is more difficult to be torn in the longitudinal direction than the second region 42. Thus, when the substrate 20 is peeled off from the long phase difference film 10, tearing of the phase difference layer 40 in the second region 42 is facilitated. In the illustrated example, the orientation angle θ42 of the slow axis A42 in the second region 42 is larger than or equal to 0° and smaller than 10° or larger than 170° and smaller than 180°, while the orientation angle θ43 of the slow axis A43 in the third region 43 is larger than or equal to 40° and smaller than or equal to 140°. Therefore, the third region 43 is remarkably more difficult to be torn in the longitudinal direction than the second region 42. Thus, when the substrate 20 is peeled off from the long phase difference film 10, linear tearing in the second region 42 in the direction in which the substrate 20 is peeled off is effectively facilitated. In addition, since the second region 42 is placed between the first region 41 and the third region 43 that are more difficult to be torn in the longitudinal direction than the second region 42, the second region 42 can be further reliably torn linearly.

As shown in FIGS. 2 and 4, in the illustrated long phase difference film 10, the first region 41 of the phase difference layer 40 includes a center position of the long phase difference film 10 in the transverse direction (first direction D1). The first region 41 of the phase difference layer 40 includes a center position of the phase difference layer 40 in the transverse direction (first direction D1). The third region 43 includes an end E40 of the phase difference layer 40 in the transverse direction (first direction D1). Therefore, a large area can be ensured for the first region 41 intended to be used as the phase difference film 10X. On the other hand, the area of the third region 43 intended to remain on the substrate 20 can be reduced. As a result, the yield at the time of manufacturing manufactured products from the long phase difference film 10 can be sufficiently increased.

In the illustrated example, the first region 41 and the second region 42 are adjacent to each other in the first direction D1. The second region 42 and the third region 43 are adjacent to each other in the first direction D1. Therefore, the yield at the time of manufacturing manufactured products from the long phase difference film 10 can be sufficiently increased.

From the viewpoint of increasing the yield at the time of manufacturing manufactured products from the long phase difference film and the viewpoint of implementing stable transfer of the phase difference layer 40, the dimensions of the regions 41, 42, 43 may be determined as follows. The length L42 (see FIG. 4) of the second region 42 in the transverse direction (first direction D1) may be larger than or equal to 1 mm, may be larger than or equal to 5 mm, or may be larger than or equal to 10 mm. The length L42 of the second region 42 in the transverse direction (first direction D1) may be smaller than or equal to 200 mm, may be smaller than or equal to 100 mm, or may be smaller than or equal to 50 mm. The length L43 (see FIG. 4) of the third region 43 in the transverse direction (first direction D1) may be larger than or equal to 0.5 mm, may be larger than or equal to 1 mm, or may be larger than or equal to 1.5 mm. The length L43 of the third region 43 in the transverse direction (first direction D1) may be smaller than or equal to 50 mm, may be smaller than or equal to 40 mm, or may be smaller than or equal to 30 mm. The length L41 (see FIG. 2) of the first region 41 in the transverse direction (first direction D1) may be larger than or equal to six times, may be larger than or equal to 12 times, or may be larger than or equal to 20 times the length L42 (see FIG. 4) of the second region 42 in the transverse direction (first direction D1). The length L41 (see FIG. 2) of the first region 41 in the transverse direction (first direction D1) may be smaller than or equal to 250 times the length L42 (see FIG. 4) of the second region 42 in the transverse direction (first direction D1).

The illustrated long phase difference film 10 includes the alignment layer (alignment film) 30 located between the substrate 20 and the first region 41 and second regions 42 of the phase difference layer 40. The first region 41 and the second region 42 are in contact with the alignment layer 30. The alignment layer 30 is not located between the third region 43 and the substrate 20 in the third direction D3. The third region 43 is in contact with the substrate 20. According to this example, the orientation of the liquid crystal compound in the first region 41 and the second region 42 can be adjusted by the alignment layer 30. The orientation of the liquid crystal compound in the third region 43 can be adjusted by the substrate 20. For example, the orientation of the liquid crystal compound in the third region 43 can be controlled with the surface texture of the substrate 20, a substrate orientation angle θ20 of the substrate slow axis A20 of the substrate 20, or the like. In other words, the orientations of the three regions 41, 42, 43 of the phase difference layer 40 can be controlled with a high degree of flexibility.

In the illustrated example, the alignment layer 30 includes a central region 31 and a pair of end regions 32. The central region 31 faces the first region 41 of the phase difference layer 40 in the third direction D3. The central region 31 includes the center of the long phase difference film 10 in the transverse direction (first direction D1). The central region 31 includes the center of the alignment layer 30 in the transverse direction (first direction D1). The central region 31 has an alignment control force. In the first region 41 of the phase difference layer 40, the liquid crystal compound is oriented so as to extend in one direction corresponding to the alignment control force of the central region 31. Each end region 32 faces the second region 42 of the phase difference layer 40 in the third direction D3. The end region 32 includes an end E30 in the transverse direction (first direction D1).

Each end region 32 has an alignment control force. In the second region 42 of the phase difference layer 40, the liquid crystal compound is oriented so as to extend in one direction corresponding to the alignment control force of the facing end region 32. In the illustrated example, the central region 31 also has an alignment control force. In the first region 41 of the phase difference layer 40, the liquid crystal compound is oriented so as to extend in one direction corresponding to the alignment control force of the facing central region 31. In the illustrated example, the end region 32 may be formed such that the orientation direction of the liquid crystal compound, adjusted due to the alignment control force, is different from the orientation direction of the liquid crystal compound, adjusted due to the alignment control force of the central region 31. In this case, in the second region 42 of the phase difference layer 40, the liquid crystal compound is oriented so as to extend in a direction different from the direction in which the liquid crystal compound extends in the first region 41.

In this example, the alignment layer 30 may be a photo-alignment layer. With the photo-alignment layer, the alignment control force in each region of the alignment layer 30 can be easily adjusted independently of the other regions.

In this example, the substrate 20 may include a biaxially-stretched polyester film. The substrate orientation angle θ20 of the substrate slow axis A20 of the biaxially-stretched polyester film is ordinarily larger than or equal to 40° and smaller than or equal to 140°. When the third region 43 of the phase difference layer 40 is formed on the biaxially-stretched polyester film, the third orientation angle θ43 of the third slow axis A43 of the third region 43 is larger than or equal to 40° and smaller than or equal to 140°. In other words, the third region 43 that is difficult to be torn in the longitudinal direction can be easily formed.

The width W20 (see FIGS. 1 and 2) of the substrate 20 in the transverse direction (first direction D1) may be larger than or equal to 1000 mm, may be larger than or equal to 1150 mm, or may be larger than or equal to 1200 mm. The width W20 of the substrate 20 in the transverse direction (first direction D1) may be smaller than or equal to 2000 mm, may be smaller than or equal to 1800 mm, or may be smaller than or equal to 1600 mm. The width W30 (see FIGS. 1 and 2) of the alignment layer 30 in the transverse direction (first direction D1) may be larger than or equal to 950 mm, may be larger than or equal to 1100 mm, or may be larger than or equal to 1150 mm. The width W30 of the alignment layer 30 in the transverse direction (first direction D1) may be smaller than or equal to 1950 mm, may be smaller than or equal to 1750 mm, or may be smaller than or equal to 1550 mm. The width W40 (see FIGS. 1 and 2) of the phase difference layer 40 in the transverse direction (first direction D1) may be larger than or equal to 970 mm, may be larger than or equal to 1120 mm, or may be larger than or equal to 1170 mm. The width W40 of the phase difference layer 40 in the transverse direction (first direction D1) may be smaller than or equal to 1970 mm, may be smaller than or equal to 1770 mm, or may be smaller than or equal to 1570 mm. The width W40 of the phase difference layer 40 in the transverse direction (first direction D1) may be larger than the width W30 of the alignment layer 30 in the transverse direction (first direction D1). The width W40 of the phase difference layer 40 in the transverse direction (first direction D1) may be smaller than the width W30 of the alignment layer 30 in the transverse direction (first direction D1). The length of the long phase difference film 10 in the longitudinal direction (second direction D2) may be larger than or equal to 5 m, may be larger than or equal to 10 m, or may be larger than or equal to 100 m. The length of the long phase difference film 10 in the longitudinal direction (second direction D2) may be smaller than or equal to 10000 m, may be smaller than or equal to 8000 m, or may be smaller than or equal to 6000 m.

<Manufacturing Method for Long Phase Difference Film 10>

Next, an example of a manufacturing method for the long phase difference film 10 will be described. In the following description, the long phase difference film 10 shown in FIGS. 1 to 4 is manufactured with a roll-to-roll manufacturing method.

Figure 5:
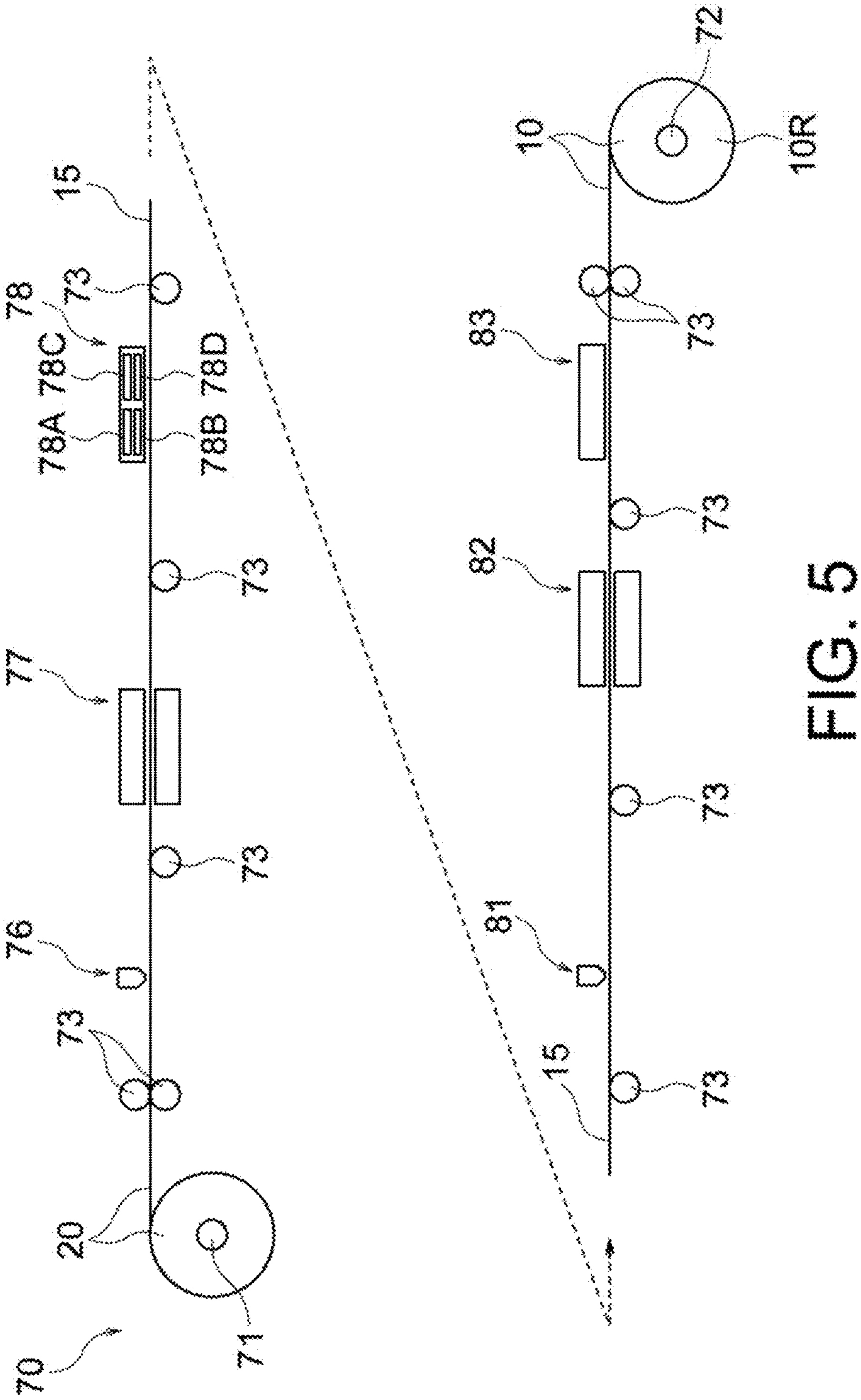
FIG. 5 is a diagram illustrating an example of a manufacturing method for the long phase difference film of FIG. 4.

FIG. 5 shows an example of the manufacturing method for the long phase difference film 10 and an example of a manufacturing apparatus 70 for the long phase difference film 10. The manufacturing apparatus 70 includes a supply core 71 with which the long substrate 20 is taken up, a take-up core 72 that takes up the long phase difference film 10 manufactured, and conveyance rolls 73 that guide the substrate 20 and the long phase difference film 10 from the supply core 71 to the take-up core 72. The manufacturing apparatus 70 includes a first supply apparatus 76, a first drying apparatus 77, and a first curing apparatus 78 as apparatuses for forming the alignment layer 30 on the substrate 20. The manufacturing apparatus 70 includes a second supply apparatus 81, a second drying apparatus 82, and a second curing apparatus 83 as apparatuses for forming the phase difference layer 40.

Figure 6:
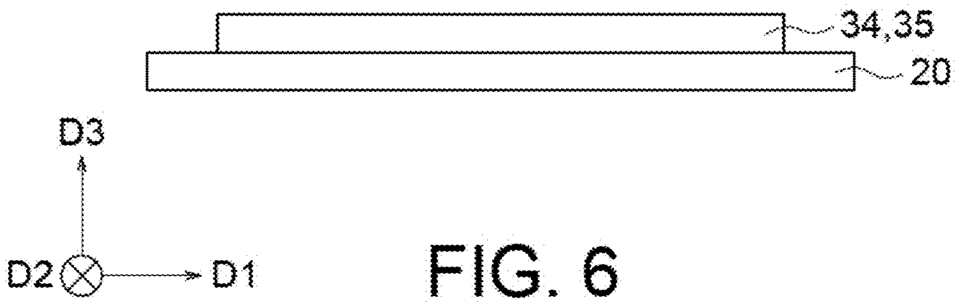
FIG. 6 is a diagram illustrating the manufacturing method of FIG. 5.

Initially, the substrate 20 taken up with the supply core 71 is supplied. The substrate 20 conveyed by the conveyance rolls 73 passes through a position facing the first supply apparatus 76. The first supply apparatus 76 applies an alignment layer formation composition 34 containing a photo-alignment material on one surface of the substrate 20. As shown in FIG. 6, a first coating layer (first coating film) 35 of the alignment layer formation composition 34 is formed on one surface of the substrate 20.

The substrate 20 conveyed by the conveyance rolls 73 passes through a position facing the first drying apparatus 77. The first drying apparatus 77 dries the first coating layer 35 of the alignment layer formation composition 34. In an example, the first drying apparatus 77 supplies high-temperature, dry gas to the first coating layer 35 of the alignment layer formation composition 34.

The substrate 20 conveyed by the conveyance rolls 73 passes through a position facing the first curing apparatus 78. The first curing apparatus 78 has components corresponding to a process of curing the first coating layer 35 of the alignment layer formation composition 34. As shown in FIG. 5, the first curing apparatus 78 may include a first exposure apparatus 78A, a first mask 78B, a second exposure apparatus 78C, and a second mask 78D. The first mask 78B is located between the first exposure apparatus 78A and the substrate 20. The second mask 78D is located between the second exposure apparatus 78C and the substrate 20. In the first curing apparatus 78, the first exposure apparatus 78A and the second exposure apparatus 78C are arranged in the traveling direction of the substrate 20. In the first curing apparatus 78, the first mask 78B and the second mask 78D are arranged in the traveling direction of the substrate 20. In the illustrated example, the second exposure apparatus 78C and the second mask 78D are disposed downstream of the first exposure apparatus 78A and the first mask 78B in the traveling direction of the substrate 20.

Figure 7:
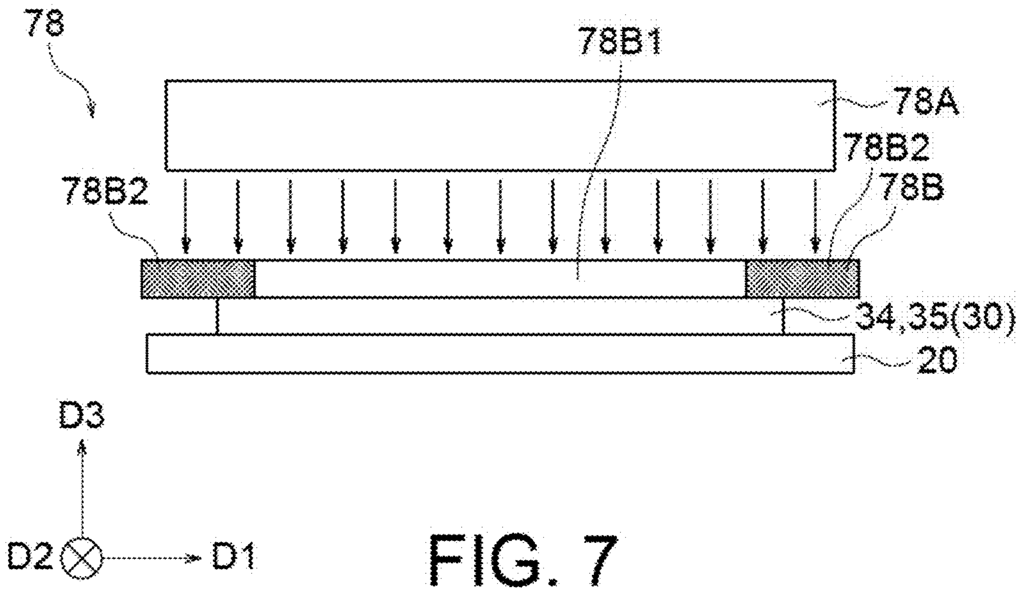
FIG. 7 is a diagram illustrating the manufacturing method of FIG. 5.
Figure 8:
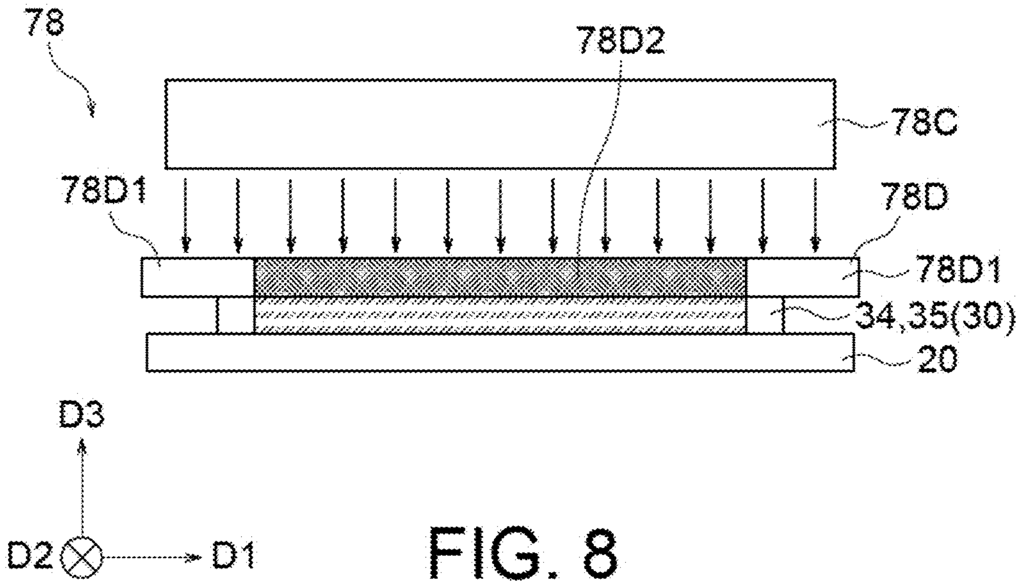
FIG. 8 is a diagram illustrating the manufacturing method of FIG. 5.

In the illustrated example, the first exposure apparatus 78A emits polarized light to the first coating layer 35 of the alignment layer formation composition 34. As shown in FIG. 7, the first mask 78B includes a first transmission region 78B1 and a pair of first shading regions 78B2. The first transmission region 78B1 is located between the pair of first shading regions 78B2 in the transverse direction D1 of the substrate 20 facing the first mask 78B. Polarized light emitted from the first exposure apparatus 78A penetrates through the first transmission region 78B1. Polarized light emitted from the first exposure apparatus 78A is shaded by the first shading regions 78B2. As shown in FIG. 8, the second mask 78D includes a pair of second transmission regions 78D1 and a second shading region 78D2. The second shading region 78D2 is located between the pair of second transmission regions 78D1 in the transverse direction D1 of the substrate 20 facing the second mask 78D. Polarized light emitted from the second exposure apparatus 78C penetrates through the second transmission regions 78D1. Polarized light emitted from the second exposure apparatus 78C is shaded by the second shading region 78D2.

As shown in FIG. 7, the first coating layer 35 of the alignment layer formation composition 34 is irradiated with polarized light in the region facing the first transmission region 78B1. As shown in FIG. 8, the first coating layer 35 is irradiated with polarized light in the regions facing the second transmission regions 78D1. The first coating layer 35 is imparted with an alignment control force according to polarized light through exposure using polarized light. In the illustrated example, in the first coating layer 35, the region facing the first transmission region 78B1 and the regions facing the second transmission regions 78D1 are irradiated with rays of polarized light different in polarized state from each other. For this reason, in the first coating layer 35, the region facing the first transmission region 78B1 and the regions facing the second transmission regions 78D1 provide alignment control forces in different orientation directions. In the illustrated example, the region facing the first transmission region 78B1 is the central region 31 of the alignment layer 30. The regions facing the second transmission regions 78D1 are the end regions 32 of the alignment layer 30. The orientation direction of the liquid crystal compound, adjusted due to the alignment control force of the end region 32, is different from the orientation direction of the liquid crystal compound, adjusted due to the alignment control force of the central region 31.

In the illustrated example, the second exposure apparatus 78C and the second mask 78D are disposed downstream of the first exposure apparatus 78A and the first mask 78B in the traveling direction of the substrate 20; however, the configuration is not limited thereto. The second exposure apparatus 78C and the second mask 78D may be disposed upstream of the first exposure apparatus 78A and the first mask 78B in the traveling direction of the substrate 20. In other words, the central region 31 of the alignment layer 30 may be irradiated with polarized light from the first exposure apparatus 78A earlier than the end regions 32 or the end regions 32 may be irradiated with polarized light from the second exposure apparatus 78C earlier than the central region 31.

Figure 9:
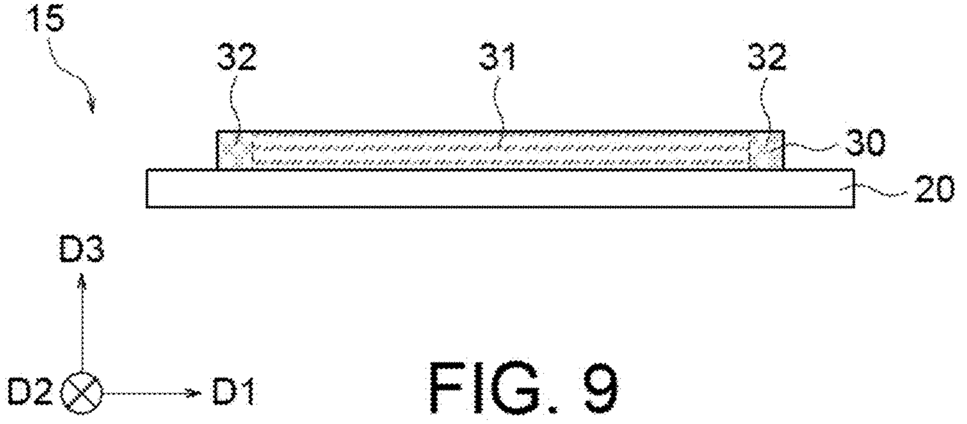
FIG. 9 is a diagram illustrating the manufacturing method of FIG. 5.

Thus, as shown in FIG. 9, an intermediate 15 including the substrate 20 and the alignment layer 30 is obtained. In the intermediate 15, the alignment layer 30 includes the central region 31 and the end regions 32. In the alignment layer 30, the central region 31 and the end region 32 have alignment control forces in orientation directions different from each other.

Hatching according to the alignment control force of the alignment layer 30 and the oriented state of the phase difference layer 40 is drawn in FIGS. 8 and 9, and FIGS. 10, 11, 19, 23, and 26 (described later). Hatching drawn in FIGS. 8, 9, 10, 11, 19, 23, and 26 does not indicate a cross section. In FIGS. 8, 9, 10, 11, 19, 23, and 26, no pattern is drawn in regions in which the liquid crystal compound has no regular orientation in the phase difference layer 40.

Figure 10:
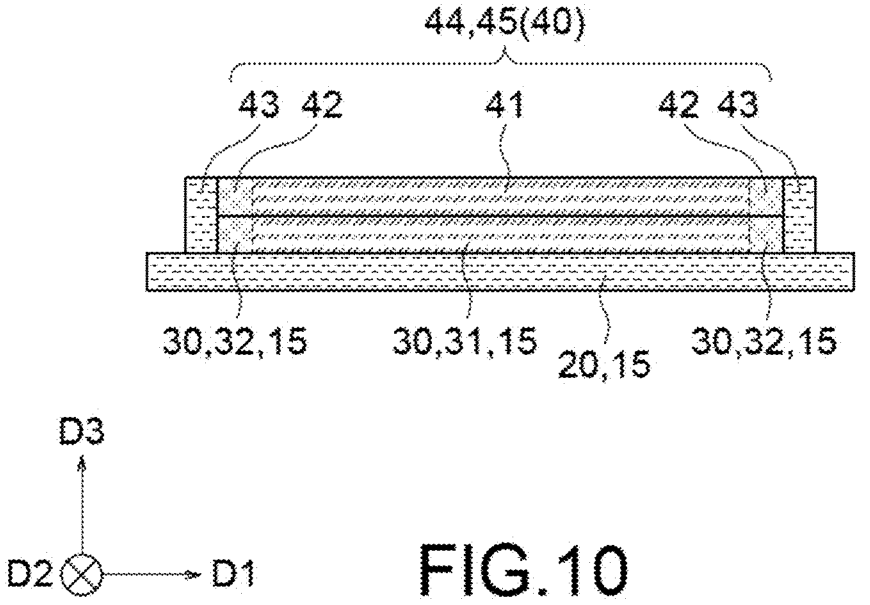
FIG. 10 is a diagram illustrating the manufacturing method of FIG. 5.

As shown in FIG. 5, the intermediate 15 is conveyed by the conveyance rolls 73 and passes through a position facing the second supply apparatus 81. The second supply apparatus 81 applies a liquid crystal composition 44 containing a liquid crystal compound on one surface of the intermediate 15. As shown in FIG. 10, a second coating layer (second coating film) 45 is formed on one surface of the substrate 20 and the alignment layer 30. The second coating layer 45 is not cured, and the liquid crystal compound in the second coating layer 45 can be changed in its arrangement.

Unique to Subject Application

In the regions of the second coating layer 45, facing in the third direction D3 the end regions 32 of the alignment layer 30, the liquid crystal compound is oriented so as to extend in a certain direction due to the alignment control forces of the end regions 32. The second regions 42 of the phase difference layer 40 are formed in the regions of the second coating layer 45, facing in the third direction D3 the end regions 32 of the alignment layer 30. In manufacturing the long phase difference film 10 shown in FIG. 4, the liquid crystal compound in the second regions 42 can be oriented such that the second orientation angle θ42 is larger than or equal to 0° and smaller than 10° or larger than 170° and smaller than 180°.

In the region of the second coating layer 45, facing in the third direction D3 the central region 31 of the alignment layer 30, the liquid crystal compound is oriented so as to extend in a certain direction due to the alignment control force of the central region 31. The first region 41 of the phase difference layer 40 is formed in the region of the second coating layer 45, facing in the third direction D3 the central region 31 of the alignment layer 30. In manufacturing the long phase difference film 10 shown in FIG. 4, the liquid crystal compound in the first region 41 can be oriented such that the absolute value of a value obtained by subtracting 90° from the first orientation angle θ41 is smaller than the absolute value of a value obtained by subtracting 90° from the second orientation angle θ42.

In the example shown in FIG. 10, the second coating layer 45 extends to an outer side of the alignment layer 30 in the transverse direction (first direction D1). In the specification, the word "outer side" in the transverse direction means a side opposite to a center in the transverse direction. In the specification, the word "inner side" in the transverse direction means a center side in the transverse direction. End regions of the second coating layer 45 in the transverse direction (first direction D1) face the substrate 20 in the third direction D3. The end regions of the second coating layer 45 in the transverse direction (first direction D1) are located on the substrate 20. In the end regions of the second coating layer 45 in the transverse direction (first direction D1), the liquid crystal compound receives alignment control force from the substrate 20. A resin substrate ordinarily provides alignment control force in a direction in which the stretching ratio is the highest. A stretched resin substrate ordinarily provides alignment control force in a direction parallel to the slow axis. A stretched polyester substrate provides alignment control force in a direction parallel to the slow axis. The third regions 43 of the phase difference layer 40 are formed in the regions of the second coating layer 45, which are in contact with the substrate 20 in the third direction D3. In manufacturing the long phase difference film 10 shown in FIG. 4, the liquid crystal compound in the third regions 43 can be oriented such that the absolute value of a value obtained by subtracting 90° from the third orientation angle θ43 is smaller than the absolute value of a value obtained by subtracting 90° from the second orientation angle θ42.

The intermediate 15 conveyed by the conveyance rolls 73 passes through a position facing the second drying apparatus 82. The second drying apparatus 82 dries the second coating layer 45 of the liquid crystal composition 44. In an example, the second drying apparatus 82 supplies high-temperature, dry gas to the second coating layer 45 of the liquid crystal composition 44.

Figure 11:
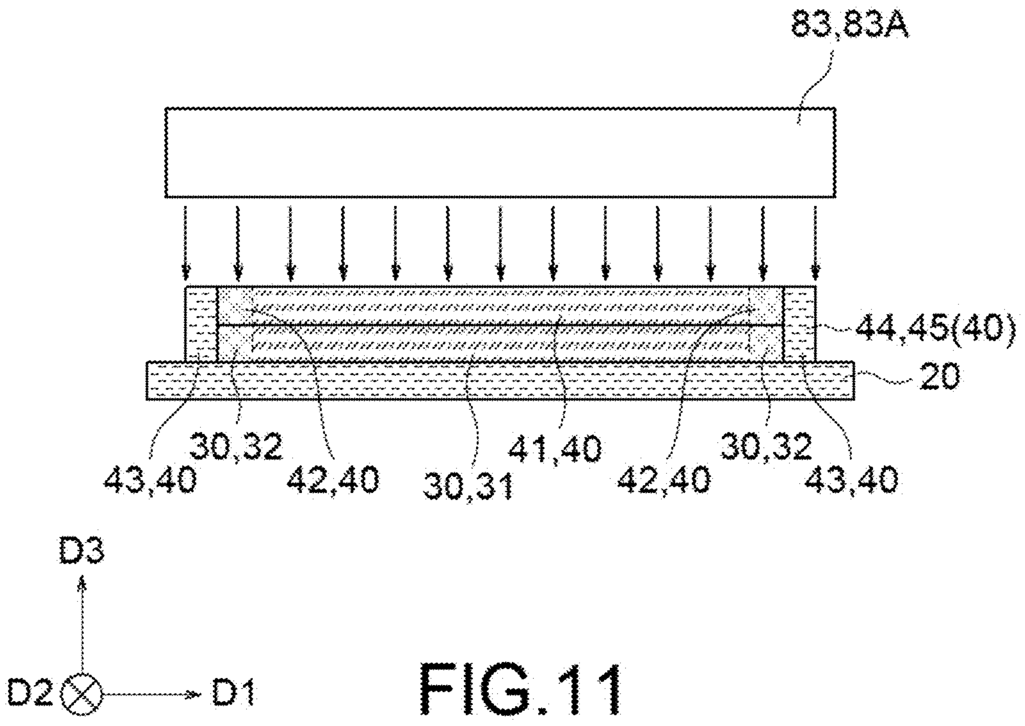
FIG. 11 is a diagram illustrating the manufacturing method of FIG. 5.

The intermediate 15 conveyed by the conveyance rolls 73 passes through a position facing the second curing apparatus 83. The second curing apparatus 83 has components corresponding to a process of curing the second coating layer 45 of the liquid crystal composition 44. As shown in FIG. 11, the second curing apparatus 83 may include an exposure apparatus 83A. In the illustrated example, the exposure apparatus 83A emits ionizing radiation to the second coating layer 45 of the liquid crystal composition 44. The second coating layer 45 of the liquid crystal composition 44 is irradiated with ionizing radiation from the second curing apparatus 83 to be cured. During a curing process, the second coating layer 45 is cured while the liquid crystal compound maintains its arrangement. In each of the first region 41, the second regions 42, and the third regions 43 of the phase difference layer 40, the liquid crystal compound is horizontally oriented. In the illustrated example, in the second region 42, the liquid crystal compound is arranged such that the second orientation angle θ42 is larger than or equal to 0° and smaller than 10° or larger than 170° and smaller than 180°. In the first region 41, the liquid crystal compound is arranged such that the absolute value of a value obtained by subtracting 90° from the first orientation angle θ41 is smaller than the absolute value of a value obtained by subtracting 90° from the second orientation angle θ42. In the third region 43, the liquid crystal compound is arranged such that the absolute value of a value obtained by subtracting 90° from the third orientation angle θ43 is smaller than the absolute value of a value obtained by subtracting 90° from the second orientation angle θ42.

Thus, the long phase difference film 10 is manufactured. The manufactured long phase difference film 10 has a longitudinal direction and a transverse direction. The long phase difference film 10 includes the substrate 20, the alignment layer 30, and the phase difference layer 40. Each of the substrate 20, the alignment layer 30, and the phase difference layer 40 has a longitudinal direction parallel to the longitudinal direction of the long phase difference film 10. Each of the substrate 20, the alignment layer 30, and the phase difference layer 40 has a transverse direction parallel to the transverse direction of the long phase difference film 10.

Long Phase Difference Film 110 of Second Embodiment

Next, the long phase difference film 110 according to the second embodiment of the present disclosure will be described in detail. The long phase difference film 110 shown in FIG. 12 differs from the long phase difference film 10 shown in FIG. 4 in that the phase difference layer 140 includes a region having no orientation. The long phase difference film 110 shown in FIG. 12 differs from the long phase difference film 10 shown in FIG. 4 in that the alignment layer 130 includes a region not imparted with an alignment control force. The remaining configuration is substantially the same as that of the long phase difference film 10 shown in FIG. 4. In the second embodiment shown in FIG. 12, like reference signs denote portions similar to those of the long phase difference film 10 shown in FIG. 4, and the detailed description thereof is omitted.

<<Long Phase Difference Film 110>>

Figure 12:
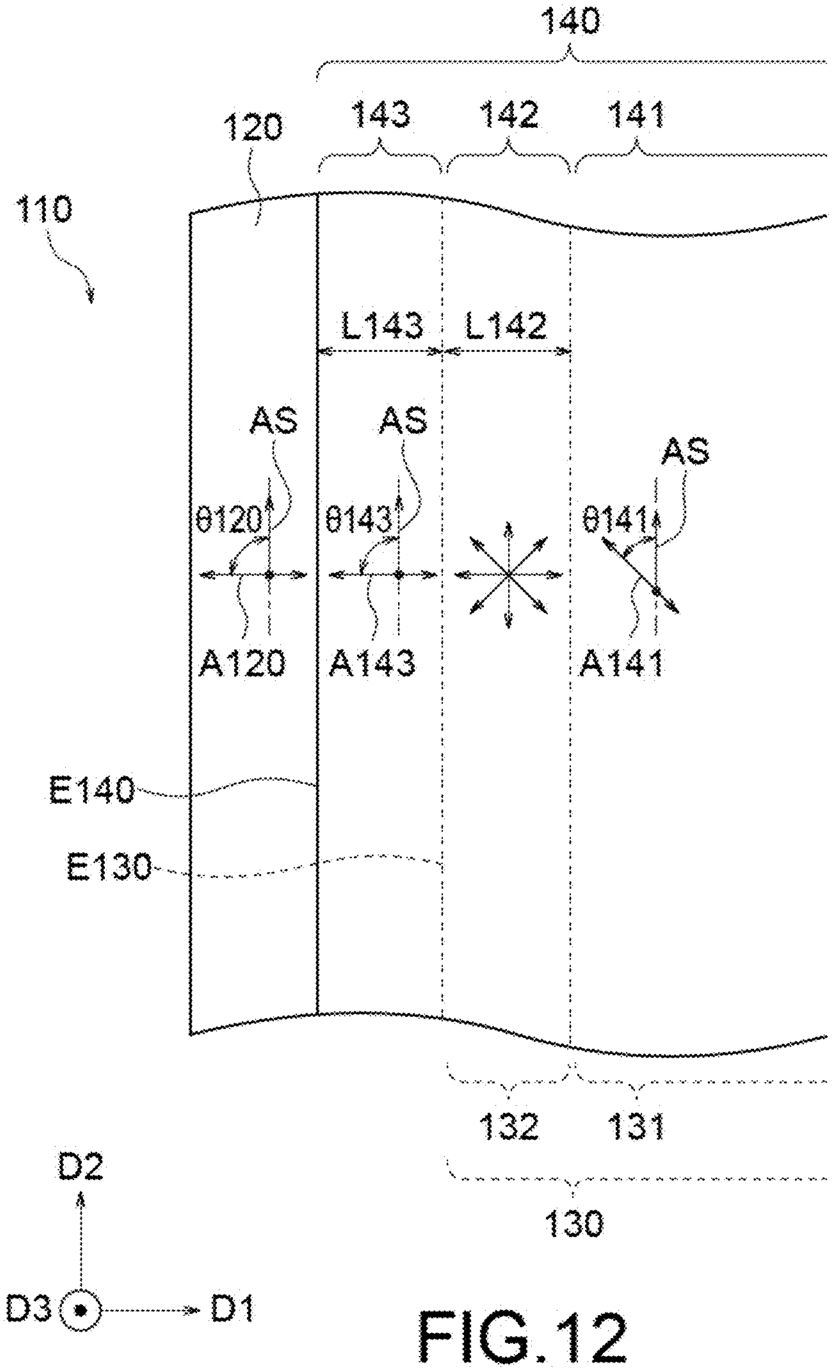
FIG. 12 is a diagram for illustrating the second embodiment and is a partially enlarged view of FIG. 2.

The long phase difference film 110 according to the present embodiment includes a substrate 120 and a phase difference layer 140 superimposed to the substrate 120 as shown in FIG. 12. The substrate 120 is long. The phase difference layer 140 is long. The phase difference layer 140 includes a first region 141, a pair of second regions 142, and a pair of third regions 143. The first region 141 is located between the pair of second regions 142 in the transverse direction. The pair of second regions 142 is located between the pair of third regions 143 in the transverse direction. The phase difference layer 140 contains cured material of a liquid crystal composition. The second region 142 has no orientation. The third region 143 has a horizontal orientation.

As will be described later, the long phase difference film 110 is laminated on a long receiving film 50 including a bonding layer 53, and then the substrate 120 is peeled off from the long phase difference film 110 bonded to the bonding layer 53, thus making it possible to transfer a phase difference layer 140P onto the receiving film 50. At this time, it is possible to suppress occurrence of burrs at ends E140P in the transverse direction of the phase difference layer 140P, transferred onto the receiving film 50.

In the illustrated example, the long phase difference film 110 further includes an alignment layer (alignment film) 130. The alignment layer 130 is located between the substrate 120 and the phase difference layer 140 in the third direction D3. The alignment layer 130 is long. Hereinafter, the layers of the long phase difference film 110 will be described with reference to the drawings.

<Phase Difference Layer 140>

The phase difference layer 140 contains cured material of a liquid crystal composition. The liquid crystal composition may be a liquid crystal composition similar to the liquid crystal composition contained in the phase difference layer 140 according to the first embodiment. When the phase difference layer 140 contains a polymerizable liquid crystal compound, the polymerizable liquid crystal compound is selected as needed according to a retardation value, wavelength dispersion, orientation, solubility, and the like, desired for the phase difference layer 140. The phase difference layer 140 can be obtained by applying a liquid crystal composition to form a coating layer and then curing the liquid crystal composition. The oriented state of the liquid crystal compound in the coating layer may be adjusted to horizontal orientation, vertical orientation, tilt orientation, twist orientation, hybrid orientation, or the like. The optical characteristics of each region in the phase difference layer 140 can be controlled by adjusting the orientation of the liquid crystal compound in the coating layer (coating film). The orientation of the liquid crystal compound in each region of the phase difference layer 140 will be described later.

The wavelength dispersion of the phase difference layer 140 may be reverse dispersion. In this case, the phase difference layer 140 may have the following optical characteristics regarding an in-plane phase difference (in-plane phase retardation value) in the first region 141.

Re(450)<Re(550)

Re(550)<Re(650)

Re(450) is an in-plane phase difference in the first region 141 of the phase difference layer 140 at a wavelength of 450 nm. Re(550) is an in-plane phase difference in the first region 141 of the phase difference layer 140 at a wavelength of 550 nm. Re(650) is an in-plane phase difference in the first region 141 of the phase difference layer 140 at a wavelength of 650 nm.

Re(450), Re(550), and Re(650) in the first region 141 of the phase difference layer 140 are not limited. In an example in which the first region 141 of the phase difference layer 140 is set to a λ/4 phase difference layer, Re(450), Re(550), and Re(650) each may be larger than or equal to 90 nm, may be larger than or equal to 100 nm, or may be larger than or equal to 110 nm. In an example in which the first region 141 of the phase difference layer 140 is set to a λ/4 phase difference layer, Re(450), Re(550), and Re(650) each may be smaller than or equal to 180 nm, may be smaller than or equal to 160 nm, or may be smaller than or equal to 150 nm. In an example in which the first region 141 of the phase difference layer 140 is set to a λ/4 phase difference layer, the in-plane phase difference Re(550) may be larger than or equal to 130 nm, may be larger than or equal to 133 nm, or may be larger than or equal to 136 nm. In an example in which the first region 141 of the phase difference layer 140 is set to a λ/4 phase difference layer, the in-plane phase difference Re(550) may be smaller than or equal to 153 nm, may be smaller than or equal to 150 nm, or may be smaller than or equal to 147 nm. By setting the in-plane phase differences in the first region 141 of the phase difference layer 140 in this way, the first region 141 of the phase difference layer 140 can be used as a circularly polarizing plate in combination with a polarizer.

The thickness of the phase difference layer 140 in the third direction D3 may be larger than or equal to 0.1 μm, may be larger than or equal to 0.5 μm, or may be larger than or equal to 1.5 μm. The thickness of the phase difference layer 140 may be smaller than or equal to 5.0 μm, may be smaller than or equal to 4.0 μm, or may be smaller than or equal to 3.0 μm. By setting the thickness of the phase difference layer 140 in this way, the appropriate in-plane phase difference can be imparted to the first region 141 of the phase difference layer 140 as a λ/4 phase difference layer.

<Substrate 120>

The substrate 120 supports the phase difference layer 140. In the illustrated example, the substrate 120 also supports the alignment layer 130. The substrate 120 may be transparent. In manufacturing the long phase difference film 110 with a roll-to-roll process, the substrate 120 may have flexibility such that the substrate 120 is allowed to be taken up in a rolled shape.

The material of the substrate 120 may be a material similar to the material of the substrate 20 according to the first embodiment. The thickness of the substrate 120 in the third direction D3 may be set to a range similar to that of the thickness of the substrate 20 according to the first embodiment.

A resin substrate, such as a biaxially-stretched polyester film, can be adopted as the substrate 120 as in the case of the substrate 20 according to the first embodiment. A birefringent biaxially-stretched polyester film can exercise alignment control force to a liquid crystal compound contained in a liquid crystal composition for forming the phase difference layer 140, as will be described later. An orientation angle θ120 that the slow axis A120 of the biaxially-stretched resin substrate 120 forms with the longitudinal direction (second direction D2) may be larger than or equal to 40°, may be larger than or equal to 50°, may be larger than or equal to 60°, may be larger than or equal to 70°, or may be larger than or equal to 80°. The orientation angle θ120 may be smaller than or equal to 140°, may be smaller than or equal to 130°, may be smaller than or equal to 120°, may be smaller than or equal to 110°, or may be smaller than or equal to 100°. The orientation angle θ120 may be 90°. As shown in FIG. 12, the orientation angle is the magnitude of angle between the slow axis and the longitudinal direction (second direction D2). The orientation angle is the magnitude of an angle that, where an axis extending toward one side in the longitudinal direction is a reference axis AS, the slow axis forms with the reference axis AS in a counterclockwise direction. The orientation angle is determined as an angle larger than or equal to 0° and smaller than 180°. In the example shown in FIG. 12, the reference axis AS is oriented toward the first side in the second direction D2.

The surface of the substrate 120, facing the alignment layer 130 and the phase difference layer 140, does not need to be subjected to surface treatment. When the phase difference layer 140 is transferred onto the receiving film 50 as will be described later, the substrate 120 having a non-treated surface can be easily peeled off from the long phase difference film 110. The surface of the substrate 120, not facing the alignment layer 130 or the phase difference layer 140, may be subjected to surface treatment.

<Alignment Layer 130>

As shown in FIGS. 1 and 2, the long phase difference film 110 includes the alignment layer (alignment film) 130 between the substrate 120 and the phase difference layer 140. The alignment layer 130 has an alignment control force. The alignment layer 130 adjusts the orientation of the phase difference layer 140. The alignment layer 130 arranges the liquid crystal compound contained in the phase difference layer 140 in a certain direction.

The alignment layer 130 exercises alignment control force for the liquid crystal compound as described below. As in the case of the first embodiment, the alignment layer may be a rubbing alignment layer. An alignment layer formation composition is applied onto the substrate 120 to form a coating layer (coating film) on the substrate 120, and the coating layer is subjected to rubbing process with a rubbing roll or the like, with the result that a rubbing alignment layer is obtained. As in the case of the first embodiment, the alignment layer 130 is more preferably a photo-alignment layer.

The material of the alignment layer is not limited according to the above description. As in the case of the first embodiment, materials used as the material of a rubbing alignment layer or the material of a photo-alignment layer may be used.

As in the case of the first embodiment, a photo-alignment material is more preferably used as the material of the photo-alignment layer. A photo-alignment material is applied onto the substrate 120 to form a coating layer on the substrate 120, and the coating layer is cured by applying polarized light to the coating layer made of a photo-alignment material, with the result that the photo-alignment layer is obtained.

The thickness of the alignment layer 130 in the third direction D3 may be set to a range similar to that of the thickness of the alignment layer 30 in the third direction D3 according to the first embodiment.

<Optical Characteristics of Phase Difference Layer 140>

In the long phase difference film 110 according to the present embodiment, the phase difference layer 140 includes the first region 141, the pair of second regions 142, and the pair of third regions 143. The first region 141 is located between the pair of second regions 142 in the transverse direction. The pair of second regions 142 is located between the pair of third regions 143 in the transverse direction.

As in the case of the first embodiment, the first region 141 is cut from the long phase difference film 110 and is used as a phase difference film 110X (see FIG. 3). The first region 141 is imparted with a desired phase difference according to the use of the phase difference film 110X. As in the case of the first embodiment, in the first region 141, a liquid crystal compound may be horizontally oriented. The first region 141 has horizontal orientation. In the first region 141, the liquid crystal compound may be arranged so as to extend in one direction along a plane defined by the first direction D1 and the second direction D2. In this example, the first region 141 can be in-plane birefringent. The first region 141 can have a first slow axis A141 in the plane. The orientation of the liquid crystal compound in the first region 141 can be adjusted by the alignment control force imparted to the alignment layer 130.

In an example, the first orientation angle θ141 between the first slow axis A141 of the first region 141 and the longitudinal direction (second direction D2) may be larger than or equal to 10°, may be larger than or equal to 20°, or may be larger than or equal to 30°. In this example, the first orientation angle θ141 may be smaller than or equal to 80°, may be smaller than or equal to 70°, or may be smaller than or equal to 60°.

In another example, the first orientation angle θ141 may be larger than or equal to 100°, may be larger than or equal to 110°, or may be larger than or equal to 120°. In this another example, the first orientation angle θ141 may be smaller than or equal to 170°, may be smaller than or equal to 160°, or may be smaller than or equal to 150°.

In the example shown in FIG. 12, the first region 141 may be used as a λ/4 phase difference layer. The first region 141 of the phase difference layer 140 may be laminated with a polarizing layer having a transmission axis in any one of the first direction D1 and the second direction D2 to make up a circularly polarizing plate. In this example, the first orientation angle θ141 between the first slow axis A141 of the first region 141 and the longitudinal direction (second direction D2) may be larger than or equal to 35°, may be larger than or equal to 40°, or may be larger than or equal to 42°. In this example, the first orientation angle θ141 may be smaller than or equal to 55°, may be smaller than or equal to 50°, or may be smaller than or equal to 48°. In this example, the first orientation angle θ141 may be 45°.

In another example in which the first region 141 is used as a λ/4 phase difference layer, the first orientation angle θ141 may be larger than or equal to 125°, may be larger than or equal to 130°, or may be larger than or equal to 132°. In this another example, the first orientation angle θ141 may be smaller than or equal to 145°, may be smaller than or equal to 140°, or may be smaller than or equal to 138°. In this another example, the first orientation angle θ141 may be 135°.

As shown in FIG. 12, in the second region 142, the orientation of the polymerizable liquid crystal compound contained in the cured material of the polymerizable liquid crystal composition is not regulated and is irregular. In an example, non-orientation of the second region 142 can be implemented by forming the second region 142 on the alignment layer 30 not imparted with an alignment control force. In another example, non-orientation of the second region 142 can be implemented by forming the second region 142 on an optically isotropic substrate, for example, by forming the second region 142 on a non-stretched substrate.

As shown in FIG. 12, the third region 143 has a third slow axis A143. In the third region 143, the liquid crystal compound may be horizontally oriented. As described above, horizontal orientation means that a liquid crystal compound is arranged along the sheet surface of the phase difference layer 140. In the third region 143, the liquid crystal compound may be arranged so as to extend in one direction along a plane defined by the first direction D1 and the second direction D2. In this example, the third region 143 can be in-plane birefringent. The third region 143 can have a third slow axis A143 in the plane. The third orientation angle θ143 between the third slow axis A143 and the longitudinal direction (second direction D2) may be larger than or equal to 40°, may be larger than or equal to 50°, may be larger than or equal to 60°, may be larger than or equal to 70°, or may be larger than or equal to 80°. The third orientation angle θ143 may be smaller than or equal to 140°, may be smaller than or equal to 130°, may be smaller than or equal to 120°, may be smaller than or equal to 110°, or may be smaller than or equal to 100°. The third orientation angle θ143 may be 90°.

The orientation of the liquid crystal compound in the third region 143 may be adjusted by the alignment control force imparted to the alignment layer 130. The orientation of the liquid crystal compound in the third region 143 may be adjusted due to the alignment control force of the substrate 120 imparted with the slow axis by stretching.

As described above, the phase difference layer can be stably torn in the longitudinal direction (second direction D2) that is the direction in which the substrate is peeled off, by reducing the orientation angle of the phase difference layer. However, the orientation angle of a long phase difference film is determined according to the use of a phase difference film obtained from the long phase difference film. Therefore, it is presumable to impart an orientation different from the other regions to only a region in which a phase difference layer is torn. On the other hand, simplification of manufacturing steps is desired.

Based on such a study, in the present embodiment, the orientations of liquid crystal compounds respectively in the regions 141, 142, 143 of the phase difference layer 140 are adjusted. In the present embodiment, the second region 142 and the third region 143 are not intended to be cut from the long phase difference film 110 and used as the phase difference film 110X. The second region 142 is a region in which the phase difference layer 140 is scheduled to be torn when the substrate 120 is peeled off from the long phase difference film 110. The third region 143 is a region intended to remain on the substrate 120 peeled off from the long phase difference film 110.

Initially, in the present embodiment, the phase difference layer 140 has no orientation in the second region 142. In other words, the arrangement of the liquid crystal compound has no regularity. Therefore, in the second region 142, there is no direction in which the phase difference layer 140 is easily torn. Thus, the phase difference layer 140 can be torn linearly in the second region 142 linearly in the longitudinal direction (second direction D2) that is the direction in which the substrate 120 is peeled off.

However, it was observed that the adhesion of the phase difference layer decreased in the region having no orientation. Then, when the non-orientation region with decreased adhesion expands to ends of the phase difference layer in the first direction D1, the phase difference layer could not be stably torn. Specifically, there were cases where, when the phase difference layer was attempted to be torn, the phase difference layer could not be linearly torn at an intended position. Also, there were cases where the phase difference layer was not torn but the phase difference layer was peeled off from the substrate in the entire region in the first direction D1. For example, there were cases where, when the phase difference layer was transferred apart from the substrate up to the end region in the first direction D1, burrs due to a crack or the like of the end region occurred as in the case of comparative examples (described later) and, therefore, the manufacturing line was contaminated. When these phenomena occur, a manufactured product cannot be used as a product even when no burrs due to poor tearing of the phase difference layer have occurred.

On the other hand, in the present embodiment, the liquid crystal compound in the third region 143 of the phase difference layer 140 is horizontally oriented. The third region 143 in which the liquid crystal compound is horizontally oriented has higher adhesion properties to the substrate 120 than the non-oriented second region 142. Therefore, the adhesion properties of the third region 143 to an adjacent layer are improved. Thus, when the substrate 120 is peeled off from the long phase difference film 110, linear tearing in the second region 142 in the direction in which the substrate 120 is peeled off is facilitated.

Thus, it is possible to reduce burrs to occur at ends E140P in the transverse direction (first direction D1) of the phase difference layer 140P transferred onto the receiving film 50.

From the viewpoint of reducing burrs to occur at the ends E140P of the transferred phase difference layer 140P, it is effective to set the range of the third orientation angle θ143. When the slow axis A140 of the phase difference layer 140 formed a large angle with the direction in which the phase difference layer 140 is torn, the phase difference layer 140 had high adhesion properties against tearing. For this reason, the third orientation angle θ143 may be larger than or equal to 40° and smaller than or equal to 140°. Furthermore, the third orientation angle θ143 may be larger than or equal to 50°, may be larger than or equal to 60°, may be larger than or equal to 70°, or may be larger than or equal to 80°. The third orientation angle θ143 may be smaller than or equal to 130°, may be smaller than or equal to 120°, may be smaller than or equal to 110°, or may be smaller than or equal to 100°. The third orientation angle θ143 may be 90°.

The first orientation angle θ141 of the first slow axis A141 of the first region 141 is subjected to constraints according to the use of the long phase difference film 110. The third orientation angle θ143 can be determined for the purpose of reducing occurrence of burrs. It is effective to bring the third orientation angle θ143 closer to 90° than the first orientation angle θ141. Thus, when the first orientation angle θ141 is set so as to be larger than or equal to 10° and smaller than or equal to 80° or larger than or equal to 100° and smaller than or equal to 170°, or when the first orientation angle θ141 is set so as to be larger than or equal to 35° and smaller than or equal to 55° or larger than or equal to 125° and smaller than or equal to 145°, it is possible to reduce burrs to occur at the ends E140P in the transverse direction (first direction D1) of the phase difference layer 140P transferred onto the receiving film 50.

As shown in FIGS. 2 and 12, in the illustrated long phase difference film 110, the first region 141 of the phase difference layer 140 includes a center position of the long phase difference film 110 in the transverse direction (first direction D1). The first region 141 of the phase difference layer 140 includes a center position of the phase difference layer 140 in the transverse direction (first direction D1). The third region 143 includes an end E140 of the phase difference layer 140 in the transverse direction (first direction D1). Therefore, a large area can be ensured for the first region 141 intended to be used as the phase difference film 110X. On the other hand, the area of the third region 143 intended to remain on the substrate 120 can be reduced. As a result, the yield at the time of manufacturing a manufactured product from the long phase difference film 110 can be sufficiently increased.

In the illustrated example, the first region 141 and the second region 142 are adjacent to each other in the first direction D1. The second region 142 and the third region 143 are adjacent to each other in the first direction D1. Therefore, the yield at the time of manufacturing a manufactured product from the long phase difference film 110 can be sufficiently increased.

From the viewpoint of increasing the yield at the time of manufacturing a manufactured product from the long phase difference film and the viewpoint of implementing stable transfer of the phase difference layer 140, the dimensions of the regions 141, 142, 143 may be determined as follows. The length L142 (see FIG. 12) of the second region 142 in the transverse direction (first direction D1) may be larger than or equal to 1 mm, may be larger than or equal to 5 mm, or may be larger than or equal to 10 mm. The length L142 of the second region 142 in the transverse direction (first direction D1) may be smaller than or equal to 200 mm, may be smaller than or equal to 100 mm, or may be smaller than or equal to 50 mm. The length L143 (see FIG. 12) of the third region 143 in the transverse direction (first direction D1) may be larger than or equal to 0.5 mm, may be larger than or equal to 1 mm, or may be larger than or equal to 1.5 mm. The length L143 of the third region 143 in the transverse direction (first direction D1) may be smaller than or equal to 50 mm, may be smaller than or equal to 40 mm, or may be smaller than or equal to 30 mm. The length L141 (see FIG. 2) of the first region 141 in the transverse direction (first direction D1) may be larger than or equal to six times, may be larger than or equal to 12 times, or may be larger than or equal to 20 times the length L142 (see FIG. 12) of the second region 142 in the transverse direction (first direction D1). The length L141 (see FIG. 2) of the first region 141 in the transverse direction (first direction D1) may be smaller than or equal to 250 times the length L142 (see FIG. 12) of the second region 142 in the transverse direction (first direction D1).

The illustrated long phase difference film 110 includes the alignment layer 130 located between the substrate 120 and the first region 141 and second regions 142 of the phase difference layer 140. The first region 141 and the second region 142 are in contact with the alignment layer 130. The alignment layer 130 is not located between the third region 143 and the substrate 120 in the third direction D3. The third region 143 is in contact with the substrate 120. According to this example, the orientation of the liquid crystal compound in the first region 141 and the second region 142 can be adjusted by the alignment layer 130. The orientation of the liquid crystal compound in the third region 143 can be adjusted by the substrate 120. For example, the orientation of the liquid crystal compound in the third region 143 can be controlled with the surface texture of the substrate 120, a substrate orientation angle θ120 of the substrate slow axis A120 of the substrate 120, or the like. In other words, the orientations of the three regions 141, 142, 143 of the phase difference layer 140 can be controlled with a high degree of flexibility.

In the illustrated example, the alignment layer 130 includes a central region 131 and a pair of end regions 132. The central region 131 faces the first region 141 of the phase difference layer 140 in the third direction D3. The central region 131 includes the center of the long phase difference film 110 in the transverse direction (first direction D1). The central region 131 includes the center of the alignment layer 130 in the transverse direction (first direction D1). The central region 131 has an alignment control force. In the first region 141 of the phase difference layer 140, the liquid crystal compound is oriented so as to extend in one direction corresponding to the alignment control force of the central region 131. Each end region 132 faces the second region 142 of the phase difference layer 140 in the third direction D3. The end region 132 includes an end E130 in the transverse direction (first direction D1). The end region 132 has no alignment control force. In the second region 142 of the phase difference layer 140, the liquid crystal compound is irregularly dispersed.

In this example, the alignment layer 130 may be a photo-alignment layer. With the photo-alignment layer, the alignment control force in each region of the alignment layer 130 can be easily adjusted independently of the other regions.

In this example, the substrate 120 may include a biaxially-stretched polyester film. The substrate orientation angle θ120 of the substrate slow axis A120 of the biaxially-stretched polyester film is ordinarily larger than or equal to 40° and smaller than or equal to 140°. When the third region 143 of the phase difference layer 140 is formed on the biaxially-stretched polyester film, the third orientation angle θ143 of the third slow axis A143 of the third region 143 is larger than or equal to 40° and smaller than or equal to 140°. In other words, the third region 143 remarkably high in adhesion properties to the substrate 120 can be easily formed.

The width W120 (see FIGS. 1 and 2) of the substrate 120 in the transverse direction (first direction D1) may be set to a range similar to that of the width W20 of the substrate 20 in the transverse direction (first direction D1) according to the first embodiment. The width W130 (see FIGS. 1 and 2) of the alignment layer 130 in the transverse direction (first direction D1) may be set to a range similar to that of the width W30 of the alignment layer 30 in the transverse direction (first direction D1) according to the first embodiment. The width W140 (see FIGS. 1 and 2) of the phase difference layer 140 in the transverse direction (first direction D1) may be set to a range similar to that of the width W40 of the phase difference layer 40 in the transverse direction (first direction D1) according to the first embodiment. The width W140 of the phase difference layer 140 in the transverse direction (first direction D1) may be larger than the width W130 of the alignment layer 130 in the transverse direction (first direction D1). The length of the long phase difference film 110 in the longitudinal direction (second direction D2) may also be set to a range similar to that of the length of the long phase difference film 10 in the longitudinal direction (second direction D2) according to the first embodiment.

<Manufacturing Method for Long Phase Difference Film 110>

Next, an example of a manufacturing method for the long phase difference film 110 will be described. In the following description, the long phase difference film 110 shown in FIGS. 1 to 3 and 12 is manufactured with a roll-to-roll manufacturing method.

Figure 13:
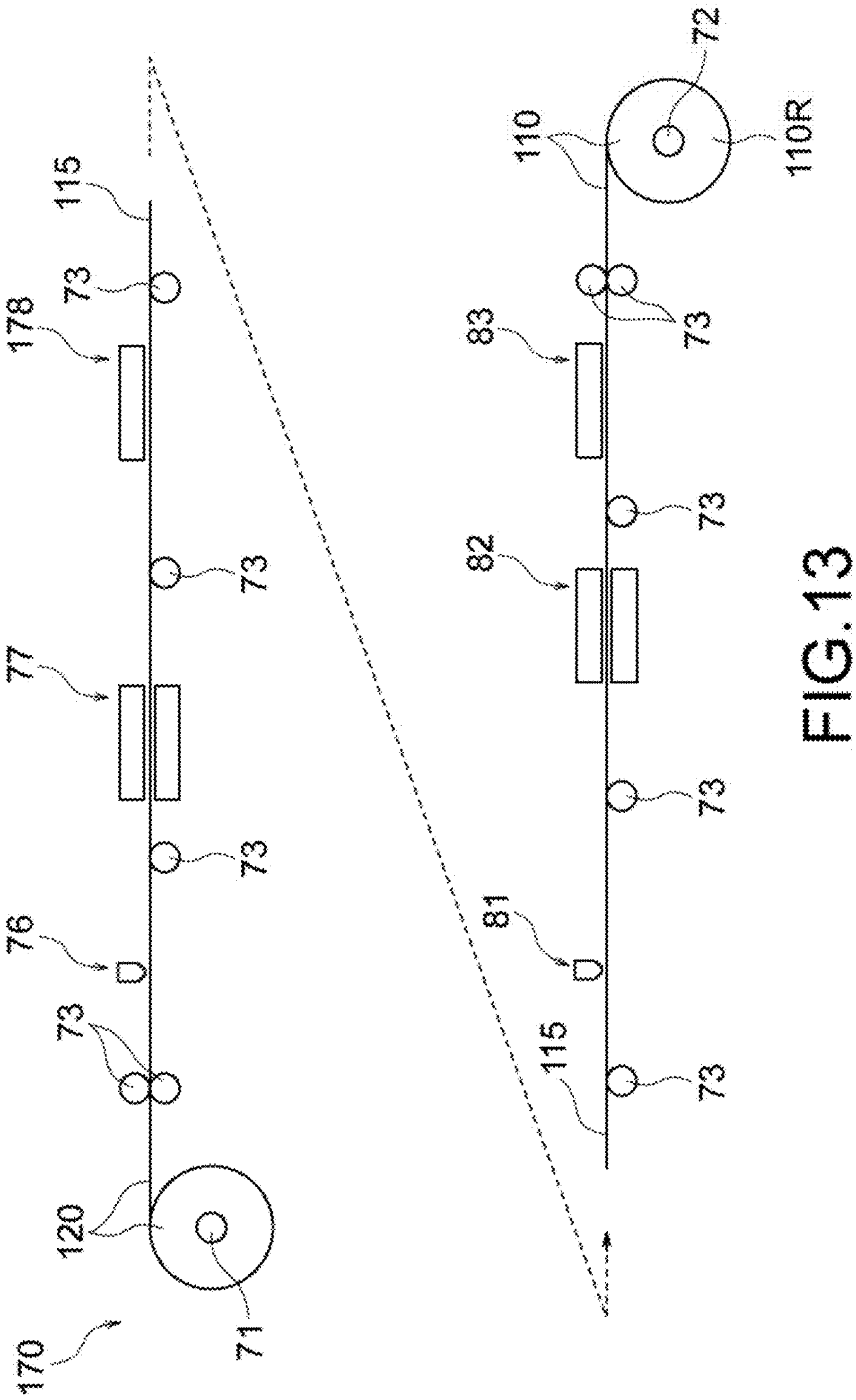
FIG. 13 is a diagram illustrating an example of a manufacturing method for the long phase difference film of FIG. 12.

FIG. 13 shows an example of the manufacturing method for the long phase difference film 110 and an example of a manufacturing apparatus 170 for the long phase difference film 110. The manufacturing apparatus 170 differs from the manufacturing apparatus 70 shown in FIG. 5 in that a first curing apparatus 178 does not include the second exposure apparatus 78C and the second mask 78D. The remaining configuration is substantially the same as that of the manufacturing apparatus 70 shown in FIG. 5. In the manufacturing apparatus 170 according to the second embodiment shown in FIG. 13, like reference signs denote portions similar to those of the manufacturing apparatus 70 shown in FIG. 5, and the detailed description thereof is omitted.

As shown in FIG. 13, the manufacturing apparatus 170 includes a supply core 71, a take-up core 72, and conveyance rolls 73. The manufacturing apparatus 170 includes a first supply apparatus 76, a first drying apparatus 77, and a first curing apparatus 178 as apparatuses for forming the alignment layer 130 on the substrate 120. The manufacturing apparatus 170 includes a second supply apparatus 81, a second drying apparatus 82, and a second curing apparatus 83 as apparatuses for forming the phase difference layer 140.

Figure 14:
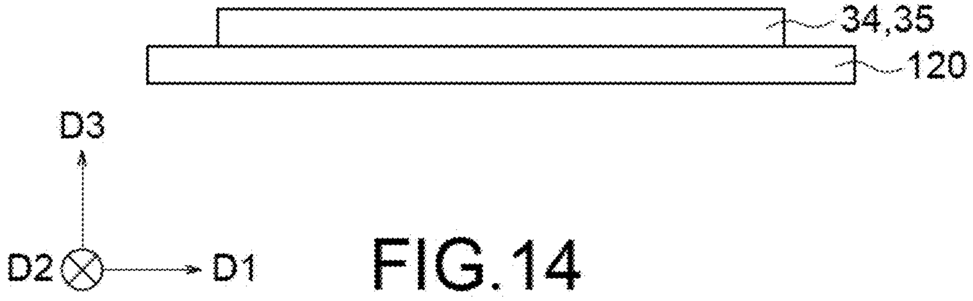
FIG. 14 is a diagram illustrating the manufacturing method of FIG. 13.

Initially, the substrate 120 supplied from the supply core 71 is conveyed by the conveyance rolls 73 and passes through a position facing the first supply apparatus 76. As shown in FIG. 14, the first supply apparatus 76 forms a first coating layer (first coating film) 35 of an alignment layer formation composition 34 on one surface of the substrate 120.

The substrate 120 conveyed by the conveyance rolls 73 passes through a position facing the first drying apparatus 77. The first drying apparatus 77 dries the first coating layer 35 of the alignment layer formation composition 34.

Figure 15:
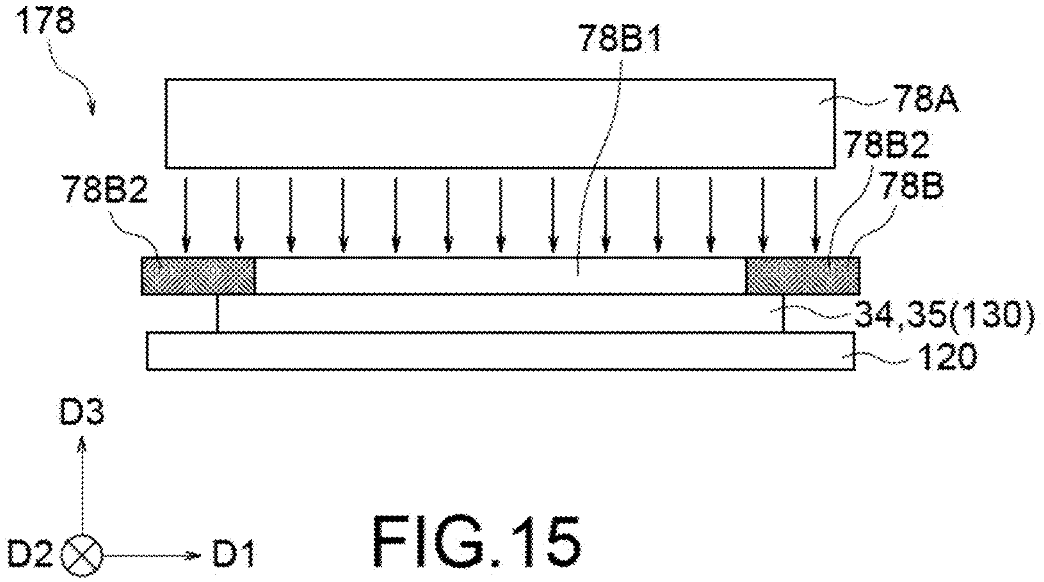
FIG. 15 is a diagram illustrating the manufacturing method of FIG. 13.

The substrate 120 conveyed by the conveyance rolls 73 passes through a position facing the first curing apparatus 178. As shown in FIG. 15, the first curing apparatus 178 may include a first exposure apparatus 78A and a mask 78B. In the illustrated example, the first exposure apparatus 78A emits polarized light to the first coating layer 35 of the alignment layer formation composition 34. Polarized light emitted from the first exposure apparatus 78A penetrates through a transmission region 78B1 of the mask 78B. Polarized light emitted from the first exposure apparatus 78A is shaded by shading regions 78B2 of the mask 78B.

As shown in FIG. 15, the first coating layer 35 of the alignment layer formation composition 34 is irradiated with polarized light in the region facing the first transmission region 78B1. The first coating layer 35 is imparted with an alignment control force according to polarized light through exposure using polarized light. The exposed region of the first coating layer 35 is the central region 131 of the alignment layer 130. The first coating layer 35 of the alignment layer formation composition 34 is not irradiated with polarized light in the regions facing the shading regions 78B2. The non-exposed regions of the first coating layer 35 are the end regions 132 of the alignment layer 130. The end regions 132 have no alignment control force.

Figure 16:
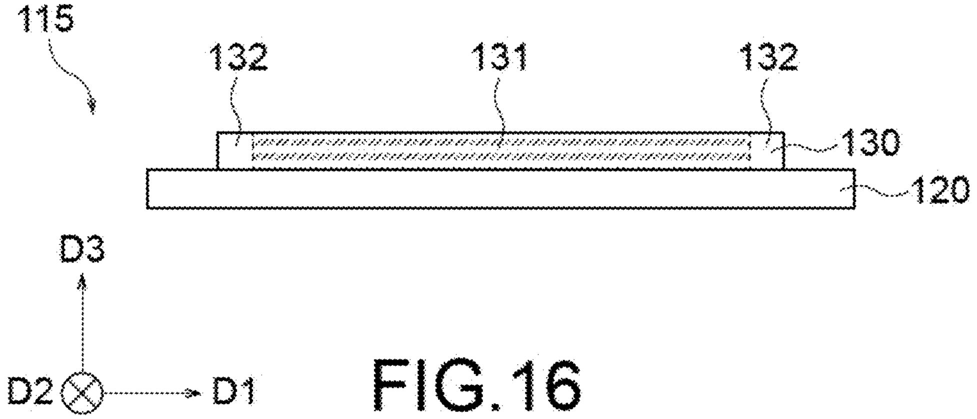
FIG. 16 is a diagram illustrating the manufacturing method of FIG. 13.

Thus, as shown in FIG. 16, an intermediate 115 including the substrate 120 and the alignment layer 130 is obtained. In the intermediate 115, the alignment layer 130 includes the central region 131 and the end regions 132. The alignment layer 130 has an alignment control force only in the central region 131.

Hatching according to the alignment control force of the alignment layer 130 and the oriented state of the phase difference layer 140 is drawn in FIG. 16, and FIGS. 17, 18, 20, 24, and 27 (described later). Hatching drawn in FIGS. 16, 17, 18, 20, 24, and 27 does not indicate a cross section. In FIGS. 16, 17, 18, 20, 24, and 27, no pattern is drawn in regions in which there is no alignment control force of the alignment layer 130 and regions in which the liquid crystal compound does not have a regular orientation in the phase difference layer 140.

Figure 17:
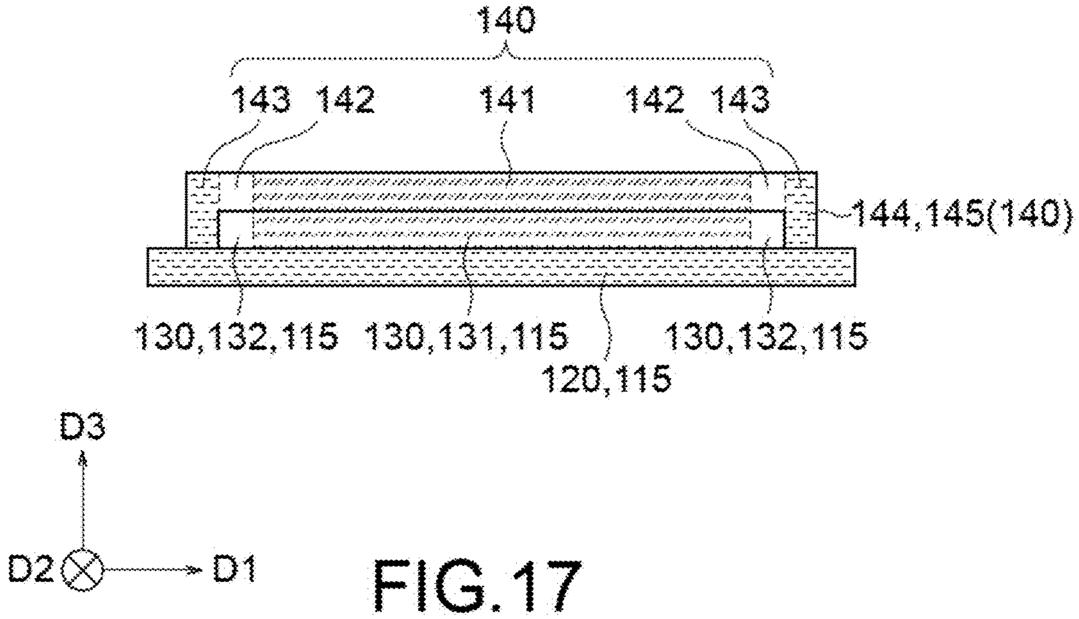
FIG. 17 is a diagram illustrating the manufacturing method of FIG. 13.
Figure 18:
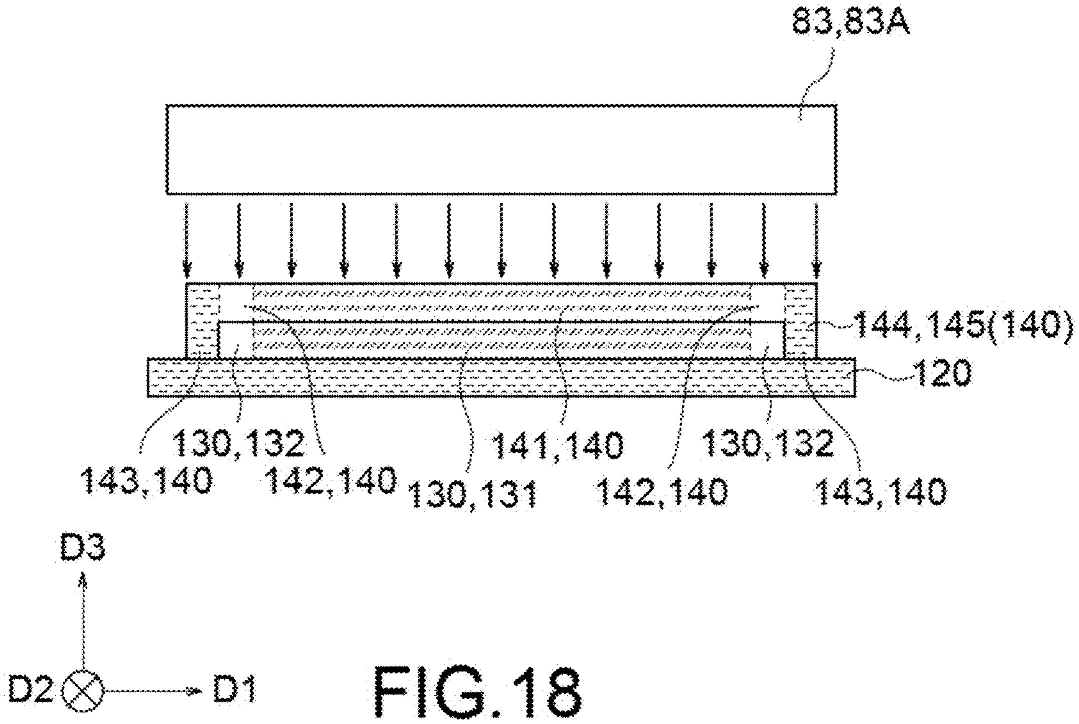
FIG. 18 is a diagram illustrating the manufacturing method of FIG. 13.

As shown in FIG. 13, the intermediate 115 is conveyed by the conveyance rolls 73 and passes through a position facing the second supply apparatus 81. The second supply apparatus 81 applies a liquid crystal composition 144 containing a liquid crystal compound on one surface of the intermediate 115. As shown in FIG. 17, a second coating layer (second coating film) 145 is formed on one surface of the substrate 120 and the alignment layer 130. The second coating layer 145 is not cured, and the liquid crystal compound in the second coating layer 45 can be changed in its arrangement.

In the region of the second coating layer 145, facing in the third direction D3 the central region 131 of the alignment layer 130, the liquid crystal compound is oriented so as to extend in a certain direction due to the alignment control force of the central region 131. The first region 141 of the phase difference layer 140 is formed in the region of the second coating layer 145, facing in the third direction D3 the central region 131 of the alignment layer 130. In manufacturing the long phase difference film 110 shown in FIG. 12, the liquid crystal compound in the first region 141 is oriented such that the first orientation angle θ141 is 45°.

The end region 132 of the alignment layer 130 has no alignment control force. In the region of the second coating layer 145, facing in the third direction D3 the end region 132 of the alignment layer 130, the orientation of the liquid crystal compound is not regulated by the alignment layer 130. In the region facing the end region 132, the liquid crystal compound has no regularity in arrangement. The second regions 142 of the phase difference layer 140 are formed in the regions of the second coating layer 145, facing in the third direction D3 the end regions 132 of the alignment layer 130. In manufacturing the long phase difference film 110 shown in FIG. 12, the second region 142 has no orientation.

As shown in FIG. 17, the second coating layer 145 extends to an outer side of the alignment layer 130 in the transverse direction (first direction D1). An end region of the second coating layer 145 in the transverse direction (first direction D1) faces the substrate 120 in the third direction D3. The end region of the second coating layer 145 in the transverse direction (first direction D1) is located on the substrate 120. In the end region of the second coating layer 145 in the transverse direction (first direction D1), the liquid crystal compound receives alignment control force from the substrate 120. The third regions 143 of the phase difference layer 140 are formed in the regions of the second coating layer 145, which are in contact with the substrate 120 in the third direction D3. In manufacturing the long phase difference film 110 shown in FIG. 12, the liquid crystal compound in the third region 143 is oriented such that the third orientation angle θ143 is larger than or equal to 40° and smaller than or equal to 140°.

The intermediate 115 conveyed by the conveyance rolls 73 passes through a position facing the second drying apparatus 82. The second drying apparatus 82 dries the second coating layer 145 of the liquid crystal composition 144.

The intermediate 115 conveyed by the conveyance rolls 73 passes through a position facing the second curing apparatus 83. The second coating layer 145 of the liquid crystal composition 144 is irradiated with ionizing radiation from the second curing apparatus 83 to be cured. During a curing process, the second coating layer 145 is cured while the liquid crystal compound maintains its arrangement. In each of the first region 141 and the third regions 143 of the phase difference layer 140, the liquid crystal compound is horizontally oriented. In the second region 142, the liquid crystal compound is irregularly arranged.

Thus, the long phase difference film 110 is manufactured. The manufactured long phase difference film 110 has a longitudinal direction and a transverse direction. The long phase difference film 110 includes the substrate 120, the alignment layer 130, and the phase difference layer 140. Each of the substrate 120, the alignment layer 130, and the phase difference layer 140 has a longitudinal direction parallel to the longitudinal direction of the long phase difference film 110. Each of the substrate 120, the alignment layer 130, and the phase difference layer 140 has a transverse direction parallel to the transverse direction of the long phase difference film 110.

Long Optical Film 55; 155 and Long Polarizing Film 60; 160 of First and Second Embodiments Next, the long optical film 55 and a long polarizing film 60 according to the first embodiment and the long optical film 155 and a long polarizing film 160 according to the second embodiment will be described in detail.

Figure 19:
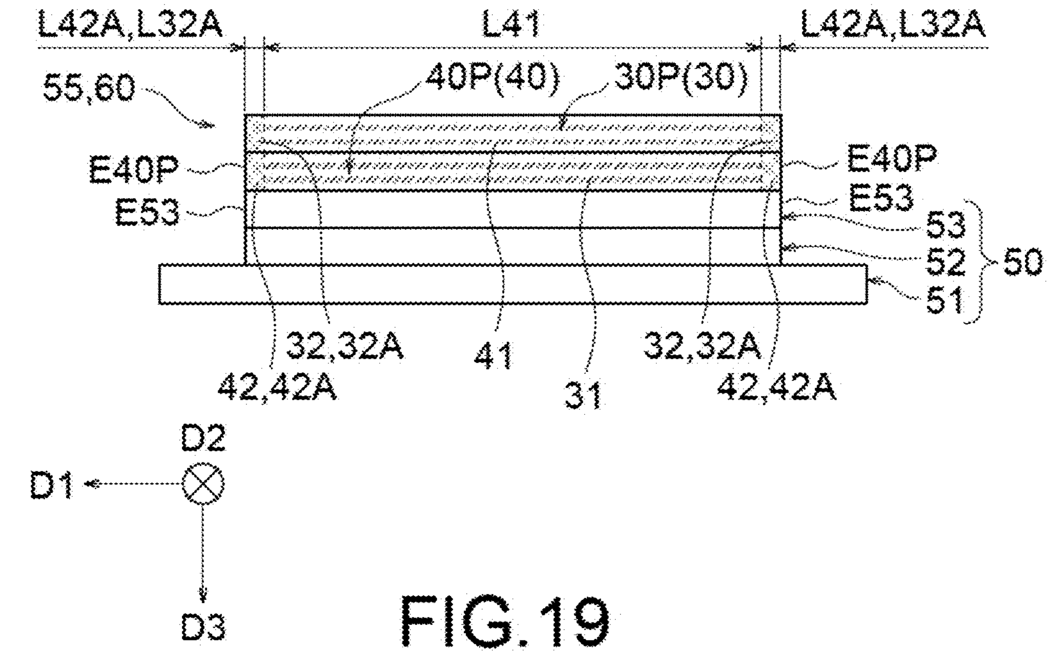
FIG. 19 is a longitudinal sectional view showing an example of a long optical film and a long polarizing film manufactured by using the long phase difference film of FIG. 4.

The long optical film 55; 155 is manufactured by using the above-described long phase difference film 10; 110. The long optical film 55; 155 includes the long receiving film 50; 150 and the long phase difference layer 40P, 140P transferred from the long phase difference film 10; 110. FIG. 19 is a sectional view showing an example of the long optical film 55 according to the first embodiment. FIG. 20 is a sectional view showing an example of the long optical film 155 according to the second embodiment. The long optical film 55; 155 shown in FIGS. 19 and 20 is manufactured by transferring the phase difference layer 40; 140 of the long phase difference film 10; 110 shown in FIGS. 1 to 18 onto the receiving film 50 shown in FIG. 21.

The receiving film 50 shown in FIG. 21 includes a long polarizing layer 52. The polarizing layer 52 transmits a polarization component that vibrates in a specific direction and shades a polarization component that vibrates in a direction orthogonal to the specific direction. The long optical film 55; 155 shown in FIGS. 19 and 20 functions as a circularly polarizing plate with a combination of the polarizing layer 52 and the first region 41; 141 of the phase difference layer 40P; 140P that functions as a λ/4 phase difference layer. In other words, in this example, the long optical film 55; 155 becomes the long polarizing film 60; 160.

Strictly, the long polarizing film 60; 160 functions as a circularly polarizing plate for light with a wavelength and the long polarizing film 60; 160 ordinarily functions as an elliptically polarizing plate for light with the other wavelengths. A polarizing plate that functions as a circularly polarizing plate for light with a wavelength larger than or equal to 400 nm and smaller than or equal to 800 nm is called a circularly polarizing plate.

The receiving film 50 and the long optical film 55; 155 will be further described in detail with reference to the specific examples shown in FIGS. 21, 19, and 20.

The receiving film 50 and the long optical film 55; 155 are long and have a longitudinal direction and a transverse direction. Each of the layers that are component elements of the receiving film 50 and the long optical film 55; 155 is also long and has a longitudinal direction and a transverse direction. The longitudinal direction of the receiving film 50 is parallel to the longitudinal direction of the component elements of the receiving film 50. The transverse direction of the receiving film 50 is parallel to the transverse direction of the component elements of the receiving film 50. The longitudinal direction of the long optical film 55; 155 is parallel to the longitudinal direction of the component elements of the long optical film 55; 155. The transverse direction of the long optical film 55; 155 is parallel to the transverse direction of the component elements of the long optical film 55; 155.

The receiving film 50 includes a substrate 51 and the bonding layer 53. The receiving film 50 shown in FIG. 21 includes the substrate 51, the polarizing layer 52, and the bonding layer 53 in this order in the third direction D3. The substrate 51 of the receiving film 50 is not limited. The substrate 51 of the receiving film 50 may be the same as the substrate 20; 120 of the above-described long phase difference film 10; 110. From the viewpoint that a roll-to-roll manufacturing method is applicable, the material of the substrate 51 may be resin. Examples of the material of the substrate 51 include a polyester film, a polycarbonate film, a cycloolefin polymer film, a cellulose triacetate film, and an acrylic film. The thickness of the substrate 51 in the third direction D3 can be set to a range similar to that of the thickness of the substrate 20; 120 of the long phase difference film 10; 110 in the third direction D3.

The bonding layer 53 is not limited. The bonding layer 53 may contain an adhesive material or may contain a bonding material. The material of the bonding layer 53 is not limited. The material of the bonding layer 53 may be a PVA bonding material or an acrylic adhesive material. The thickness of the bonding layer 53 in the third direction D3 may be larger than or equal to 1 μm, may be larger than or equal to 1.5 μm, or may be larger than or equal to 2 μm. The thickness of the bonding layer 53 may be smaller than or equal to 200 μm, may be smaller than or equal to 160 μm, or may be smaller than or equal to 120 μm.

The polarizing layer 52 may contain an absorbing polarizer. The absorbing polarizer has an absorption axis and a transmission axis. The absorbing polarizer transmits a linear polarized light component that vibrates in a direction parallel to the transmission axis and absorbs a linear polarized light component in a direction parallel to the absorption axis. The polarizing layer 52 may contain a reflective polarizer. The reflective polarizer has a reflection axis and a transmission axis. The reflective polarizer transmits a linear polarized light component that vibrates in a direction parallel to the transmission axis and reflects a linear polarized light component that vibrates in a direction parallel to the reflection axis.

The polarizer of the polarizing layer 52 may be a polyvinyl alcohol film, a polyvinyl formal film, a polyvinyl acetal film, or an ethylene-vinyl acetate copolymer saponified film, dyed with iodine or the like and stretched. The polarizer of the polarizing layer 52 may be a coating polarizer on which a dichroic guest-host material. The polarizer of the polarizing layer 52 may be a multilayer thin film polarizer. The thickness of the polarizing layer 52 in the third direction D3 may be larger than or equal to 0.5 μm, may be larger than or equal to 1 μm, or may be larger than or equal to 2 μm. The thickness of the polarizing layer 52 may be smaller than or equal to 150 μm, may be smaller than or equal to 120 μm, or may be smaller than or equal to 80 μm.

An end E53 of the bonding layer 53 in the transverse direction (first direction D1) may face the second region 42; 142 of the phase difference layer 40; 140 included in the long phase difference film 10; 110. Thus, when the phase difference layer 40; 140 is transferred, it is possible to tear the phase difference layer 40; 140 in the second region 42; 142. The second region 42 of the phase difference layer 40 according to the first embodiment is a region that is easily torn in the longitudinal direction (second direction D2) of the phase difference layer 40. The second region 142 of the phase difference layer 140 according to the second embodiment has no orientation. When the phase difference layer 140 is torn in the second region 142, it is possible to reduce the influence of the phase difference layer on the tearing direction.

Since the end E53 of the bonding layer 53 faces the second region 42; 142, the width of each layer in the transverse direction (first direction D1) may be set as follows. The width W53 (see FIG. 21) of the bonding layer 53 in the transverse direction (first direction D1) may be smaller than the width W40; W140 of the phase difference layer 40; 140 in the transverse direction (first direction D1), included in the long phase difference film 10; 110. The width W53 (see FIG. 21) of the bonding layer 53 in the transverse direction (first direction D1) may be smaller than the total length L42+L41+L42; L142+L141+L142 of the first region 41; 141 and the pair of second regions 42; 142 of the phase difference layer 40; 140 in the transverse direction (first direction D1), included in the long phase difference film 10; 110. The width W53 (see FIG. 21) of the bonding layer 53 in the transverse direction (first direction D1) may be larger than the length L41; L141 of the first region 41; 141 of the phase difference layer 40; 140 in the transverse direction (first direction D1), included in the long phase difference film 10; 110.

The width W53 of the bonding layer 53 in the transverse direction (first direction D1) may be larger than or equal to 940 mm, may be larger than or equal to 1090 mm, or may be larger than or equal to 1140 mm. The width W53 of the bonding layer 53 in the transverse direction (first direction D1) may be smaller than or equal to 1940 mm, may be smaller than or equal to 1740 mm, or may be smaller than or equal to 1540 mm.

The width W51 (see FIG. 21) of the substrate 51 in the transverse direction (first direction D1) may be larger than the width W53 of the bonding layer 53 in the transverse direction (first direction D1). The width W51 of the substrate 51 in the transverse direction (first direction D1) may be set to a range similar to that of the width W20; W120 of the substrate 20; 120 in the transverse direction (first direction D1).

The width W52 of the polarizing layer 52 in the transverse direction (first direction D1) may be larger than or equal to the width W53 of the bonding layer 53 in the transverse direction (first direction D1). The width W52 of the polarizing layer 52 in the transverse direction (first direction D1) may be smaller than or equal to the width W51 of the substrate 51 in the transverse direction (first direction D1). By setting the width of the polarizing layer 52 in this way, variations in the thickness of the receiving film 50 in a region in which the bonding layer 53 is provided can be suppressed. Thus, it is possible to stably transfer the phase difference layer 40P; 140P of the long phase difference film 10; 110 onto the receiving film 50.

The length of the receiving film 50 in the longitudinal direction (second direction D2) may be set to a range similar to that of the length of the long phase difference film 10; 110 in the longitudinal direction (second direction D2).

Figure 27:
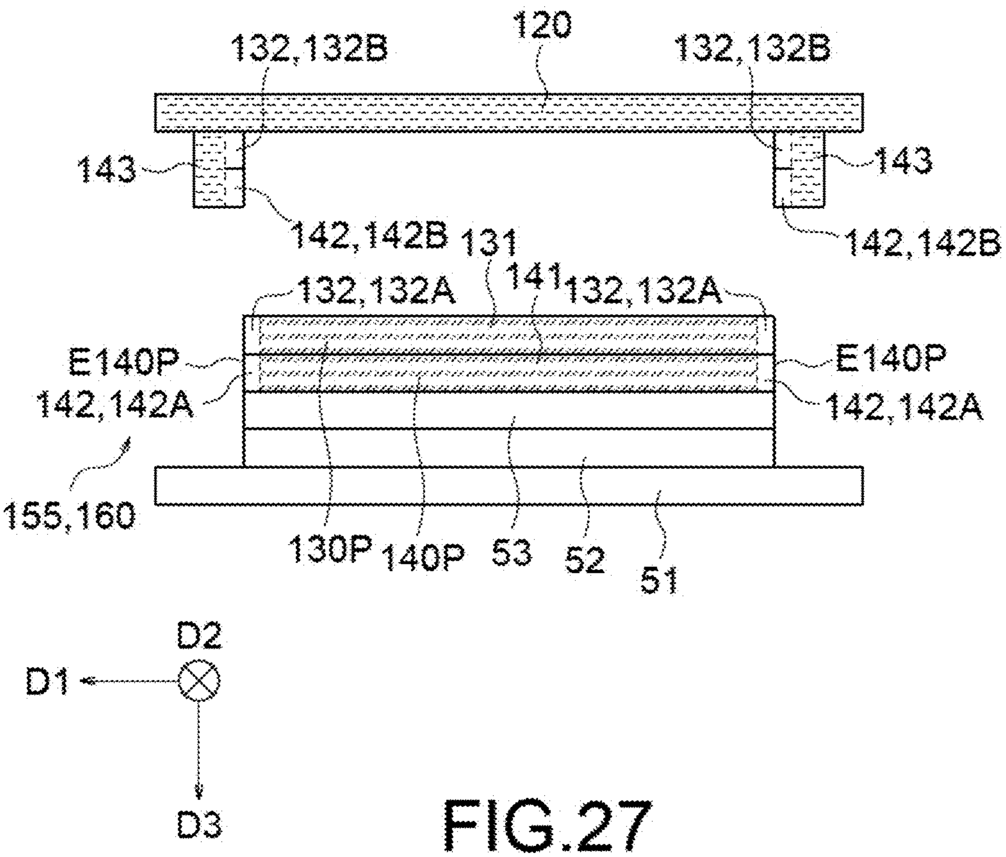
FIG. 27 is a diagram illustrating the manufacturing method of FIG. 22.

As shown in FIGS. 19 and 20, the long optical film 55; 155 includes the receiving film 50 and the phase difference layer 40P; 140P. The phase difference layer 40P; 140P is part of the phase difference layer 40; 140 included in the long phase difference film 10; 110. The phase difference layer 40P; 140P of the long optical film 55; 155 includes the first region 41; 141 of the phase difference layer 40; 140 included in the long phase difference film 10; 110 and part (first part) 42A; 142A of each of the pair of second regions 42; 142. The phase difference layer 40P; 140P of the long optical film 55; 155 does not include remaining part (second part) 42B; 142B, other than the part 42A; 142A, of each of the pair of second regions 42; 142 of the phase difference layer 40; 140, included in the long phase difference film 10; 110, and the phase difference layer 40P; 140P of the long optical film 55; 155 does not include the pair of third regions 43; 143. As shown in FIGS. 26 and 27 referenced later, an inner-side part of each of the second regions 42; 142 of the phase difference layer 40; 140 in the transverse direction (first direction D1) is transferred onto the receiving film 50. An outer-side part of each of the second regions 42; 142 of the phase difference layer 40; 140 in the transverse direction (first direction D1) remains on the substrate 20; 120 together with the third regions 43; 143. The inner-side part of the second region 42; 142 is the part 42A; 142A of the second region 42; 142. The outer-side part of the second region 42; 142 is the remaining part 42B; 142B of the second region 42; 142.

In the example shown in FIGS. 19 and 20, the long optical film 55; 155 includes the substrate 51, the polarizing layer 52, the bonding layer 53, the phase difference layer 40P; 140P, and the alignment layer 30P; 130P in this order in the third direction D3. The alignment layer 30P; 130P is part of the alignment layer 30; 130 included in the long phase difference film 10; 110. The alignment layer 30P; 130P is a part of the alignment layer 30; 130 included in the long phase difference film 10; 110 and faces in the third direction D3 the phase difference layer 40P; 140P. The alignment layer 30P; 130P of the long optical film 55; 155 includes the central region 31; 131 of the alignment layer 30; 130 included in the long phase difference film 10; 110 and part (first part) 32A; 132A of each of the pair of end regions 32; 132. The alignment layer 30P; 130P of the long optical film 55; 155 does not include remaining part (second part) 32B; 132B, other than the part 32A; 132A, of each of the pair of end regions 32; 132 of the alignment layer 30; 130 included in the long phase difference film 10; 110. An inner-side part of each of the end regions 32; 132 of the alignment layer 30; 130 in the transverse direction (first direction D1) is transferred onto the receiving film 50. An outer-side part of each of the end regions 32; 132 of the alignment layer 30; 130 in the transverse direction (first direction D1) remains on the substrate 20; 120. The inner-side part of the end region 32; 132 is the part 32A; 132A of the end region 32; 132. The outer-side part of the end region 32; 132 is the remaining part 32B; 132B of the end region 32; 132.

The long optical film 55; 155 shown in FIGS. 19 and 20 functions as the long polarizing film 60; 160. In this use, the phase difference layer 40P; 140P functions as a λ/4 phase difference layer. The magnitude of the angle between the first slow axis A41; A141 of the first region 41; 141 of the phase difference layer 40P; 140 and the transmission axis of the polarizing layer 52 may be larger than or equal to 35°, may be larger than or equal to 40°, or may be larger than or equal to 42°. The magnitude of the angle between the first slow axis A41; A141 of the phase difference layer 40P; 140P and the transmission axis of the polarizing layer 52 may be smaller than or equal to 55°, may be smaller than or equal to 50°, or may be smaller than or equal to 48°. The angle between the first slow axis A41; A141 of the phase difference layer 40P; 140P and the transmission axis of the polarizing layer 52 may be 45°.

An example of a manufacturing method for the long optical film 55; 155 will be described. In the following description, the long polarizing film 60; 160 shown in FIGS. 19 and 20 is manufactured as an example of the long optical film 55; 155 with a roll-to-roll manufacturing method.

Figure 22:
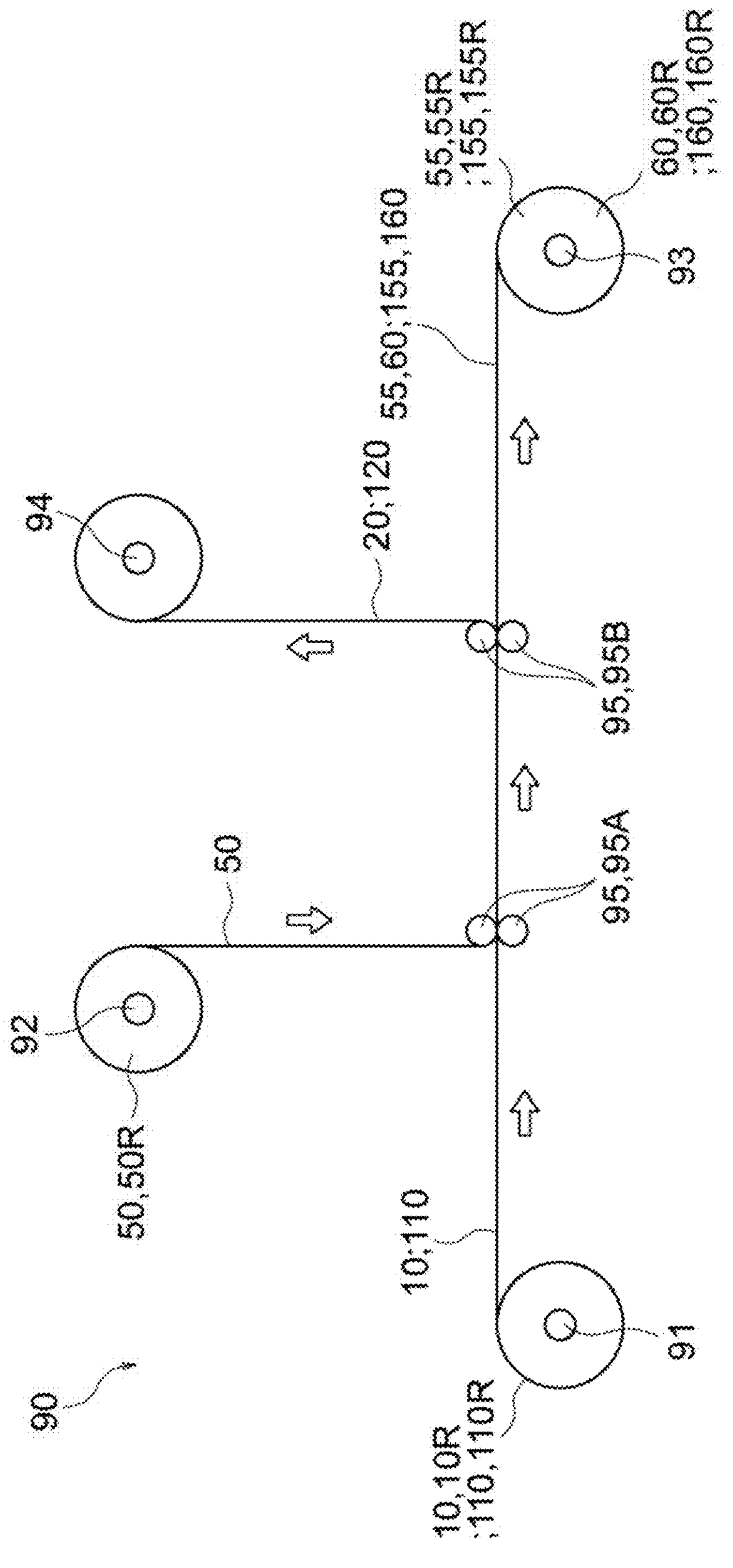
FIG. 22 is a diagram illustrating an example of a manufacturing method for the long optical film and the long polarizing film of FIG. 19 and the long optical film and the long polarizing film of FIG. 20.

FIG. 22 shows an example of a manufacturing method for the long optical film 55; 155 and an example of a manufacturing apparatus 90 for the long optical film 55; 155. The manufacturing apparatus 90 includes a first supply core 91, a second supply core 92, a first take-up core 93, a second take-up core 94, and conveyance rolls 95. The first supply core 91 dispenses (supplies) the long phase difference film 10; 110. The long phase difference film 10; 110 may be manufactured in advance and taken up by the first supply core 91. Instead of the illustrated example, the long phase difference film 10; 110 may be continuously manufactured and delivered to the conveyance rolls 95. The second supply core 92 dispenses (supplies) the long receiving film 50. The long receiving film 50 may be manufactured in advance and taken up by the second supply core 92. Instead of the illustrated example, the long receiving film 50 may be continuously manufactured and delivered to the conveyance rolls 95. The first take-up core 93 takes up the manufactured long optical film 55; 155. The second take-up core 94 takes up the long substrate 20; 120. The conveyance rolls 95 include first conveyance rolls 95A and second conveyance rolls 95B.

Figure 23:
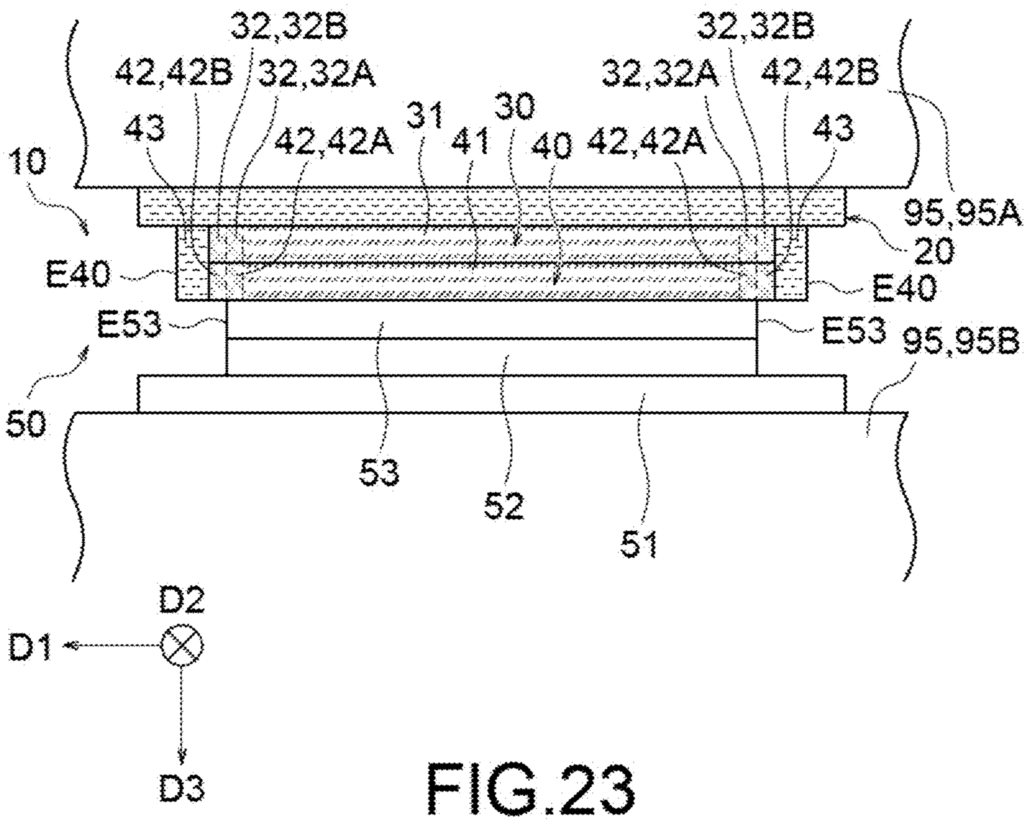
FIG. 23 is a diagram illustrating the manufacturing method of FIG. 22.
Figure 24:
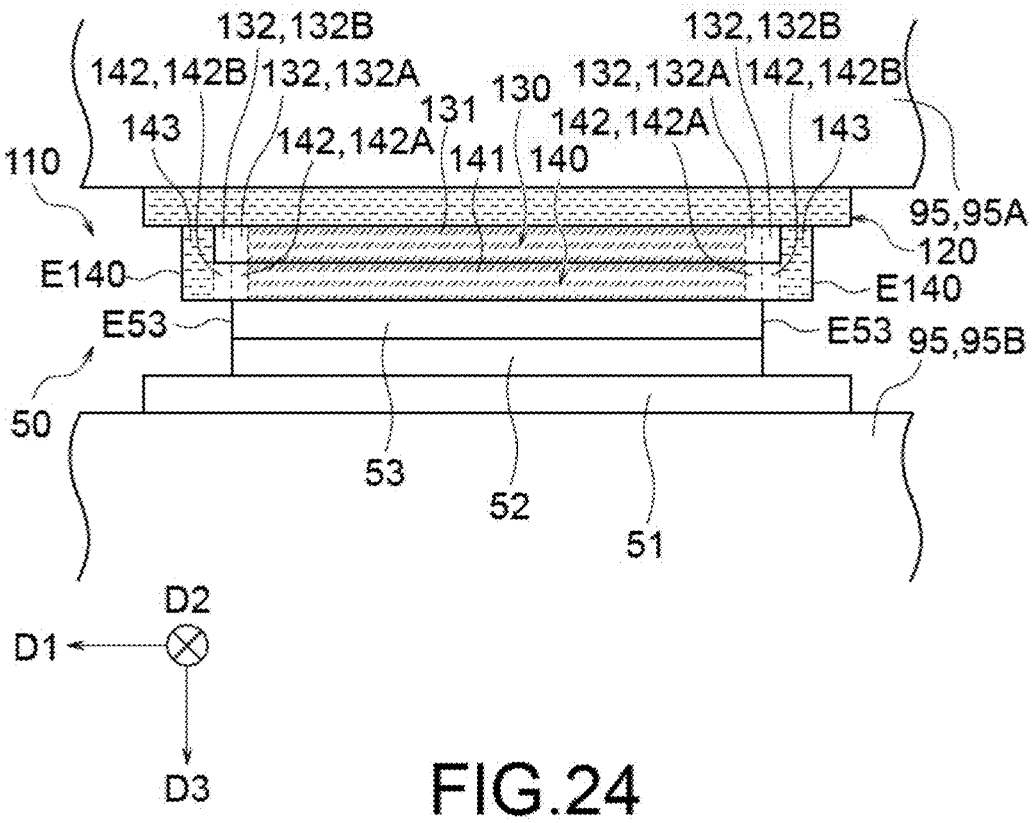
FIG. 24 is a diagram illustrating the manufacturing method of FIG. 22.

The long phase difference film 10; 110 is supplied from the first supply core 91 toward the first conveyance rolls 95A. In parallel with supply of the long phase difference film 10; 110, the receiving film 50 is supplied from the second supply core 92 toward the first conveyance rolls 95A. As shown in FIGS. 23 and 24, the long phase difference film 10; 110 and the receiving film 50 are supplied to between the pair of first conveyance rolls 95A. The long phase difference film 10; 110 and the receiving film 50 are laminated between the pair of first conveyance rolls 95A. The phase difference layer 40 of the long phase difference film 10; 110 and the bonding layer 53 of the receiving film 50 are brought into contact with each other. The pair of first conveyance rolls 95A presses the long phase difference film 10; 110 and the receiving film 50 against each other. Thus, the phase difference layer 40; 140 is bonded to the bonding layer 53.

As shown in FIGS. 23 and 24, both ends E53 of the bonding layer 53 respectively face the second regions 42; 142 of the phase difference layer 40; 140 in the third direction D3. In other words, the bonding layer 53 is bonded to the first region 41; 141 of the phase difference layer 40; 140 and parts 42A; 142A that are inner-side parts of the pair of second regions 42; 142 in the first direction D1. The bonding layer 53 does not face in the third direction D3 the pair of third regions 43; 143 of the phase difference layer 40; 140 and the remaining parts 42B; 142B that are other than the parts 42A; 142A and are outer-side parts of the pair of second regions 42; 142 in the first direction D1. In a state where the long phase difference film 10; 110 is laminated on the receiving film 50, the third regions 43; 143 and the remaining parts 42B; 142B of the second regions 42; 142 are located outside the bonding layer 53 in the transverse direction (first direction D1).

Figure 25:
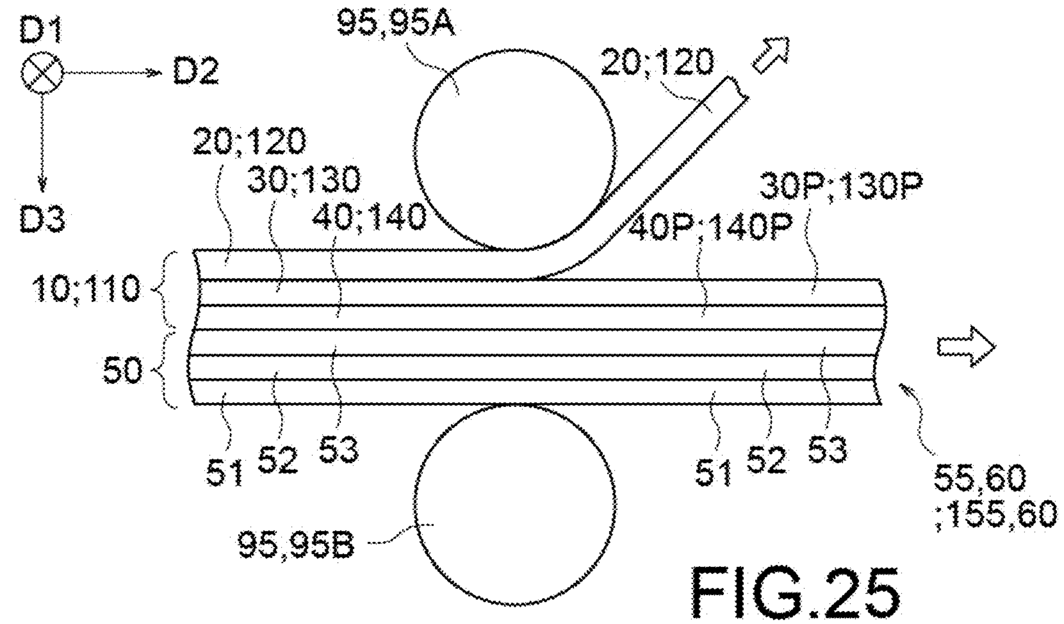
FIG. 25 is a diagram illustrating the manufacturing method of FIG. 22.

Subsequently, as shown in FIG. 22, the laminated long phase difference film 10; 110 and receiving film 50 are supplied to between the second conveyance rolls 95B. As shown in FIGS. 22 and 25, after the long phase difference film 10; 110 passes through between the pair of second conveyance rolls 95B, the substrate 20; 120 is peeled off from the long phase difference film 10; 110. In the roll-to-roll manufacturing method, the substrate 20; 120 is peeled off in the second direction D2 that is the longitudinal direction.

As shown in FIGS. 26 and 27, a part of the phase difference layer 40; 140, bonded to the bonding layer 53, is maintained so as to remain bonded to the bonding layer 53 as the phase difference layer 40P; 140P and is transferred onto the receiving film 50. A part of the alignment layer 30; 130, facing the phase difference layer 40P; 140P in the third direction D3, is also transferred onto the receiving film 50 as the alignment layer 30P; 130P. As shown in FIGS. 26 and 27, the phase difference layer 40; 140 is torn at positions in the second regions 42; 142, facing the ends E53 of the bonding layer 53 in the third direction D3. Similarly, the alignment layer 30; 130 is torn at positions in the end regions 32; 132, facing the ends E53 of the bonding layer 53 in the third direction D3.

In other words, the first region 41; 141 of the phase difference layer 40; 140 and the parts 42A; 142A that are inner-side parts of the second regions 42; 142 of the phase difference layer 40; 140 in the first direction D1 are transferred onto the receiving film 50 as the phase difference layer 40P; 140P. The third regions 43; 143 of the phase difference layer 40; 140 and the remaining parts 42B; 142B that are outer-side parts of the second regions 42; 142 of the phase difference layer 40; 140 in the first direction D1 remain adherent to the substrate 20; 120. The central region 31; 131 of the alignment layer 30; 130 and the parts 32A; 132A that are inner-side parts of the end regions 32; 132 of the alignment layer 30; 130 in the first direction D1 are transferred onto the receiving film 50 as the alignment layer 30P; 130P. The remaining parts 32B; 132B that are outer-side parts of the end regions 32; 132 of the alignment layer 30; 130 in the first direction D1 remain bonded to the substrate 20; 120.

Thus, the long polarizing film 60; 160 is continuously manufactured by transferring the phase difference layer 40P; 140P and the alignment layer 30P; 130P from the long phase difference film 10; 110 onto the receiving film 50. The manufactured long polarizing film 60; 160 is taken up by the first take-up core 93. The substrate 20; 120 peeled off from the alignment layer 30P; 130P and the phase difference layer 40P; 140P is taken up by the second take-up core 94.

From the viewpoint of increasing the yield of an optical film 55X; 155X and a polarizing film 60X; 160X and the viewpoint of implementing stable transfer of the phase difference layer 40; 140, the length L42A; L142A (see FIGS. 19 and 20) of the second region (part) 42A; 142A in the transverse direction (first direction D1), included in the phase difference layer 40P; 140P, may be determined as follows. The length L42A; L142A may be larger than or equal to 1 mm, may be larger than or equal to 2 mm, or may be larger than or equal to 5 mm. The length L42A; L142A may be smaller than or equal to 100 mm, may be smaller than or equal to 50 mm, or may be smaller than or equal to 25 mm. From the similar viewpoint, the length L32A; L132A (see FIGS. 19 and 20) of the end region 32; 132 (that is, the part 32A; 132A) in the transverse direction (first direction D1), included in the alignment layer 30P; 130P, may be determined as follows. The length L32A; L132A may be larger than or equal to 1 mm, may be larger than or equal to 2 mm, or may be larger than or equal to 5 mm. The length L32A; L132A may be smaller than or equal to 100 mm, may be smaller than or equal to 50 mm, or may be smaller than or equal to 25 mm. The length L41; L141 of the first region 41; 141 in the transverse direction (first direction D1), included in the phase difference layer 40P; 140P, may be larger than or equal to 12 times, may be larger than or equal to 24 times, or may be larger than or equal to 40 times the length L42A; L142A of the second region (part) 42A; 142A in the transverse direction (first direction D1), included in the phase difference layer 40P; 140P. The length L41A; L141A may be smaller than or equal to 500 times the length L42A; L142A.

The receiving film 50, the long optical film 55; 155, and the long polarizing film 60; 160, as in the case of the above-described long phase difference film 10; 110, can be handled as rolled bodies 50R, 55R, 60R; 50R, 155R, 160R taken up with the take-up core 12 about the take-up axis RA as shown in FIG. 3. Thus, the long films 50, 55, 60; 50, 155, 160 are easily handled. The long films 50, 55, 60; 50, 155, 160 can be manufactured with a roll-to-roll manufacturing method. The long films 50, 55, 60; 50, 155, 160 are high in production efficiency and low in manufacturing cost. The individual optical film 55X; 155X or the individual polarizing film 60X; 160X is obtained by cutting the long optical film 55; 155 that is long and the long polarizing film 60; 160 that is long into a desired size. With this example, sheet optical films 55X; 155X or sheet polarizing films 60X; 160X with various dimensions can be obtained from the long optical film 55; 155 that is long or the long polarizing film 60; 160 that is long, suited to needs. Optical films 55X; 155X or polarizing films 60X; 160X with various dimensions can be timely provided.

Figure 28:
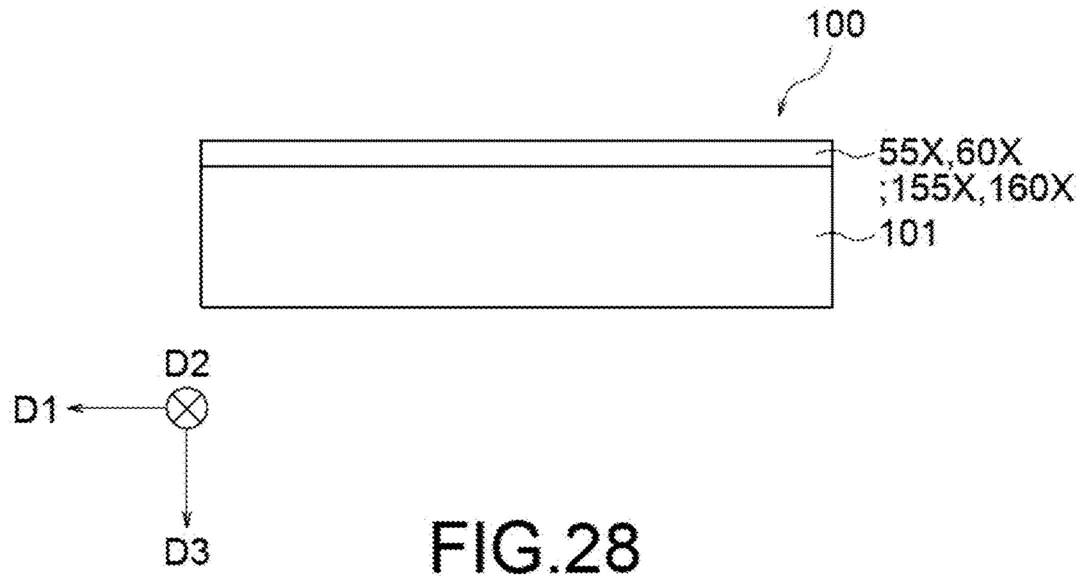
FIG. 28 is a diagram showing an application example of an optical film and a polarizing film obtained from the long optical film and the long polarizing film of FIG. 19 and the long optical film and the long polarizing film of FIG. 20.

The optical film 55X; 155X obtained from the long optical film 55; 155 and the polarizing film 60X; 160X obtained from the long polarizing film 60; 160 may be applied to a display 100. In the example shown in FIG. 28, the optical film 55X; 155X and the polarizing film 60X; 160X are disposed so as to be superimposed on a display element 101 serving as an image forming apparatus. In this example, the optical film 55X; 155X and the polarizing film 60X; 160X have a reflection suppression function to suppress reflection of outside light, such as ambient light, on the surface of the display 100. With the reflection suppression function, it is possible to improve the contrast of an image displayed by the display 100.

Examples of the display element 101 include a liquid crystal display element, an organic EL display element, an inorganic EL display element, a plasma display element, an electronic paper display element, an LED display element (a micro LED or the like), and quantum dot. These display elements may have a touch panel function in the display element.

Figure 29:
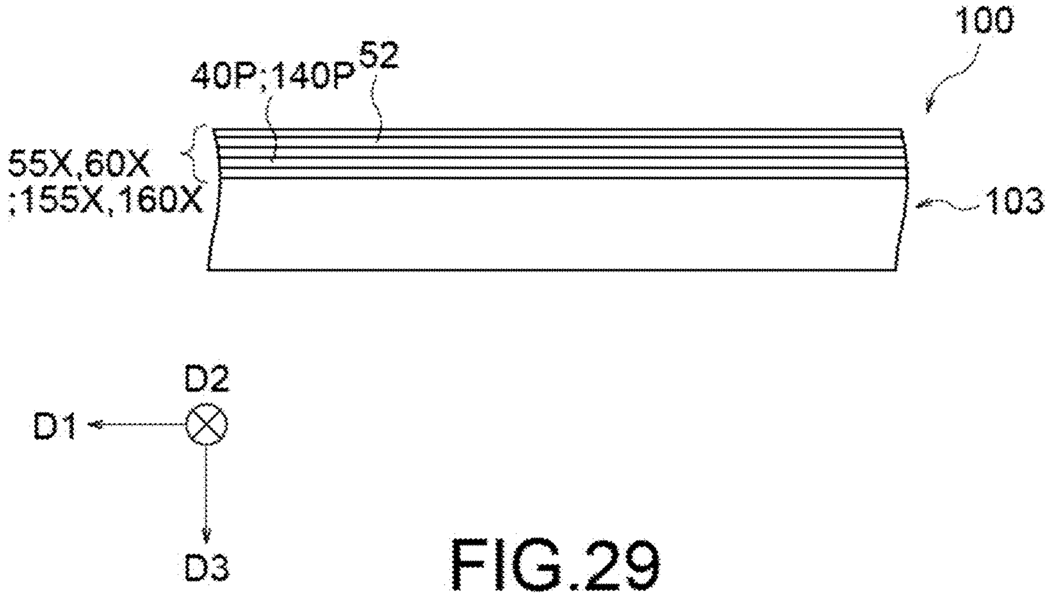
FIG. 29 is a diagram showing another application example of the optical film and the polarizing film.

In the specific example shown in FIG. 29, the display 100 makes up an organic EL display. The display 100 includes an organic EL display panel 103 and an optical film 55X; 155X (a polarizing film 60X; 160X). The optical film 55X; 155X (the polarizing film 60X; 160X) is superimposed on an image display surface of the organic EL display panel 103 and exhibits a reflection suppression function. In this example, the optical film 55X; 155X includes the phase difference layer 40P; 140P that functions as a λ/4 phase difference layer and the sheet polarizing layer 52 that functions as a polarizer. The phase difference layer 40P; 140P is located between the polarizing layer 52 and the organic EL display panel 103.

According to the first embodiment, in the second region 42 of the phase difference layer 40 that is torn at the time of transfer, the second orientation angle θ42 of the second slow axis A42 is larger than or equal to 0° and smaller than 10° or larger than 170° and smaller than 180°. The direction in which the phase difference layer 40 is torn comes under the influence of the orientation of the liquid crystal compound. For this reason, the phase difference layer 40 is torn in the second region 42 substantially in the longitudinal direction (second direction D2) that is the direction in which the substrate 20 is peeled off. Accordingly, tearing in the second region 42 of the phase difference layer 40 is smoothly performed. As a result, it is possible to effectively suppress occurrence of burrs at ends E40P of the phase difference layer 40P in the transverse direction (first direction D1).

In the illustrated specific example of the first embodiment, the absolute value of a value obtained by subtracting 90° from the first orientation angle θ41 of the first slow axis A41 in the first region 41 is smaller than the absolute value of a value obtained by subtracting 90° from the second orientation angle θ42. With such an example, the first region 41 is more difficult to be torn in the longitudinal direction (second direction D2) than the second region 42. As a result, tearing in the second region 42 of the phase difference layer 40 is smoothly performed.

For example, in the specific example of the first embodiment, the first orientation angle θ41 may be larger than or equal to 10° and smaller than or equal to 170°.

In the above-described specific example of the first embodiment, the first orientation angle θ41 may be larger than or equal to 30° and smaller than or equal to 150°. With such an example, the first region 41 is remarkably more difficult to be torn in the longitudinal direction than the second region 42. As a result, when the substrate 20 is peeled off from the long phase difference film 10, tearing of the phase difference layer 40 in the second region 42 is effectively facilitated.

In the illustrated specific example of the first embodiment, the absolute value of a value obtained by subtracting 90° from the third orientation angle θ43 of the third slow axis A43 in the third region 43 is smaller than the absolute value of a value obtained by subtracting 90° from the second orientation angle θ42. With such an example, the third region 43 is more difficult to be torn in the longitudinal direction (second direction D2) than the second region 42. As a result, tearing in the second region 42 of the phase difference layer 40 is smoothly performed.

In the above-described specific example of the first embodiment, the third orientation angle θ43 may be larger than or equal to 40° and smaller than or equal to 140°. Therefore, the third region 43 is remarkably more difficult to be torn in the longitudinal direction than the second region 42. As a result, when the substrate 20 is peeled off from the long phase difference film 10, tearing of the phase difference layer 40 in the second region 42 is effectively facilitated.

In the above-described specific example of the first embodiment, the first region 41 of the phase difference layer 40 may include a center position of the phase difference layer 40 in the transverse direction (first direction D1). The third region 43 may include the end E40 of the phase difference layer 40 in the transverse direction (first direction D1) of the phase difference layer 40. With such an example, a large area can be ensured for the first region 41 intended to be used as the phase difference film 10X. On the other hand, the area of the third region 43 intended to remain on the substrate 20 can be reduced. As a result, the yield at the time of collecting the phase difference film 10X from the long phase difference film 10 can be sufficiently increased.

In the illustrated specific example of the first embodiment, the long phase difference film 10 includes the alignment layer 30 located between the substrate 20 and the first region 41 and second regions 42 of the phase difference layer 40. The third regions 43 are in contact with the substrate 20. With such an example, it is possible to adjust the orientation of the first region 41 and second regions 42 of the phase difference layer 40 with the alignment layer 30. It is possible to adjust the orientation of the third regions 43 of the phase difference layer 40 with the substrate 20.

In the above-described specific example of the first embodiment, the alignment layer may include a photo-alignment layer. With such an example, the alignment layer can be imparted with an alignment control force when irradiated with polarized light.

In the above-described specific example of the first embodiment, the substrate 20 may include a polyester film having a slow axis. The angle between the slow axis of the polyester film and the longitudinal direction (second direction D2) is larger than or equal to 40° and smaller than or equal to 140°. With such an example, when the third region 43 of the phase difference layer 40 is formed on the polyester film, the third orientation angle θ43 of the third slow axis A43 of the third region 43 can be made larger than or equal to 40° and smaller than or equal to 140°, so it is possible to make it extremely difficult to tear the third region 43 in the longitudinal direction.

In the above-described specific example of the first embodiment, the length L42 of the second region 42 of the phase difference layer 40 in the transverse direction (first direction D1) may be larger than or equal to 1 mm and smaller than or equal to 100 mm. With such an example, the yield of the phase difference film 10X can be increased, and stable transfer of the phase difference layer 40 can be implemented.

In the above-described specific example of the first embodiment, the length L41 of the first region 41 of the phase difference layer 40 in the transverse direction (first direction D1) may be larger than or equal to 12 times the length L42 of the second region 42 of the phase difference layer 40 in the transverse direction (first direction D1). With such an example, the yield of the phase difference film 10X can be increased, and stable transfer of the phase difference layer 40 can be implemented.

In the above-described specific example of the first embodiment, the length L43 of the third region 43 of the phase difference layer 40 in the transverse direction (first direction D1) is larger than or equal to 0.5 mm and smaller than or equal to 50 mm. With such an example, the yield of the phase difference film 10X can be increased, and stable transfer of the phase difference layer 40 can be implemented.

In the above-described specific example of the first embodiment, an in-plane phase difference Re(450) in the first region 41 of the phase difference layer 40 at a wavelength of 450 nm is smaller than an in-plane phase difference Re(550) in the first region 41 of the phase difference layer 40 at a wavelength of 550 nm. The in-plane phase difference Re(550) is smaller than an in-plane phase difference Re(650) in the first region 41 of the phase difference layer 40 at a wavelength of 650 nm. The in-plane phase difference Re(550) is larger than or equal to 130 nm and smaller than or equal to 153 nm. With such an example, the wavelength dispersion of the phase difference layer 40 is reverse dispersion. Thus, it is possible to suppress fluctuations in the in-plane phase difference Re according to a wavelength, and it is excellent in color representation.

According to the second embodiment, the second region 142 of the phase difference layer 140 torn at the time of transfer has no orientation. In the second region 142, the liquid crystal compound is irregularly arranged. Therefore, the direction in which the phase difference layer 140 is torn in the second region 142 is less likely to receive the influence of the orientation of the liquid crystal compound contained in the phase difference layer 140. For this reason, the phase difference layer 140 can be torn in the second region 142 substantially in the longitudinal direction (second direction D2) that is the direction in which the substrate 120 is peeled off. In the second embodiment, the liquid crystal compound in the third region 143 of the phase difference layer 140 is horizontally oriented. Therefore, when the phase difference layer 140 is torn in the longitudinal direction (second direction D2), the third region 143 can stably maintain stable adherence to the substrate 120. Accordingly, tearing in the second region 142 of the phase difference layer 140 is smoothly performed. As a result, it is possible to effectively suppress occurrence of burrs at ends E140P of the phase difference layer 140P in the transverse direction (first direction D1).

In the illustrated specific example of the second embodiment, the end region 132 of the alignment layer 130 is not imparted with an alignment control force. In other words, the end region 132 has no component having directivity. Therefore, tearing in the end region 132 of the alignment layer 130 is also smoothly performed substantially in the direction in which the substrate 120 is peeled off. From this point as well, it is possible to suppress occurrence of burrs.

In the above-described specific example of the second embodiment, the third region 143 has the third slow axis A143. The third orientation angle θ143 between the third slow axis A143 and the longitudinal direction may be larger than or equal to 40° and smaller than or equal to 140°. With such an example, the phase difference layer 140 exhibits high adhesion properties to an adjacent layer in the third region 143. Therefore, tearing in the second region 142 of the phase difference layer 140 is stably performed, so it is possible to effectively suppress occurrence of burrs at the ends E140P of the phase difference layer 140P in the transverse direction (first direction D1).

From the viewpoint of reducing burrs to occur at the ends E140P of the transferred phase difference layer 140P, the third orientation angle θ143 may be larger than or equal to 40°, may be larger than or equal to 50°, may be larger than or equal to 60°, may be larger than or equal to 70°, or may be larger than or equal to 80°. The third orientation angle θ143 may be smaller than or equal to 140°, may be smaller than or equal to 130°, may be smaller than or equal to 120°, may be smaller than or equal to 110°, or may be smaller than or equal to 100°. The third orientation angle θ143 may be 90°.

EXAMPLES

The present disclosure will be described in further more details with reference to examples. The present disclosure is not limited to the following examples. Hatching according to the alignment control force of the alignment layer and the oriented state of the phase difference layer is drawn in FIGS. 30 to 35 referenced together with the description of the examples. Hatching drawn in FIGS. 30 to 35 does not indicate a cross section. In FIGS. 30 to 35, no pattern is drawn in regions in which the liquid crystal compound has no regular orientation in the phase difference layer.

<Long Phase Difference Film>

Long phase difference films according to Example 1-1, Example 1-2, Example 2-1, Comparative Example 1, Comparative Example 2, and Comparative Example 3 were manufactured by a roll-to-roll process as will be described below.

Example 1-1

The long phase difference film 10 shown in FIGS. 1 to 4 was manufactured with the above-described manufacturing method described with reference to FIGS. 5 to 11.

A PET film "COSMOSHINE A4160 (thickness 100 μm, PET film (A))" made by TOYOBO CO., LTD. was used as a substrate. The substrate was a biaxially-stretched film and was in-plane birefringent. The stretching ratio in the transverse direction in biaxial stretching was larger than the stretching ratio in the longitudinal direction.

A first coating layer with a thickness of 300 nm was formed by applying an alignment layer formation composition onto an untreated surface (non-primer surface) of the substrate. The alignment layer formation composition contained a polycinnamate compound and a propylene glycol methyl ether solution (solid content 4.5%). The first coating layer was dried by being held in the atmosphere of 100° C. for a minute. An alignment layer was made by exposing the first coating layer to polarized light. The polarized light exposure conditions included an irradiation wavelength of 310 nm and an amount of irradiation of 20 mJ/cm$^2$. Thus, an intermediate including the substrate and the alignment layer was obtained.

As described with reference to FIGS. 7 and 8, exposure of the first coating layer was partial exposure with a mask. A central region and end regions of the first coating layer were subjected to polarized light exposure with rays of polarized light different in polarized state from each other. An alignment control force with an orientation angle of 45° was imparted to the central region of the obtained alignment layer. An alignment control force with an orientation angle of 0° was imparted to the end regions of the obtained alignment layer.

A polymerizable liquid crystal compound was synthesized by referring to a synthesis of chemical compound 4 of Example 4 of JP 5962760 B. The polymerizable liquid crystal compound exhibited reverse wavelength dispersion. A polymerizable liquid crystal composition was prepared by adding four parts by mass of Irgacure 907 as an initiator and 0.3 parts by mass of MEGAFAC F-477 made by DIC corporation as a surfactant to 100 parts by mass of the polymerizable liquid crystal compound. The polymerizable liquid crystal composition further contained toluene such that the solid content was 20%. A second coating layer was formed by applying the polymerizable liquid crystal composition onto the surface of the intermediate, on which the alignment layer was formed.

Subsequently, the second coating layer was dried by being held in the atmosphere of 120° C. for a minute. After that, the second coating layer 45 was cured by applying ultra violet radiation to the second coating layer at an amount of irradiation of 300 mJ/cm$^2$ with a Fusion-UV apparatus made by Heraeus to form a phase difference layer 40. Thus, a long phase difference film including the substrate, the alignment layer, and the phase difference layer was obtained.

Figure 30:
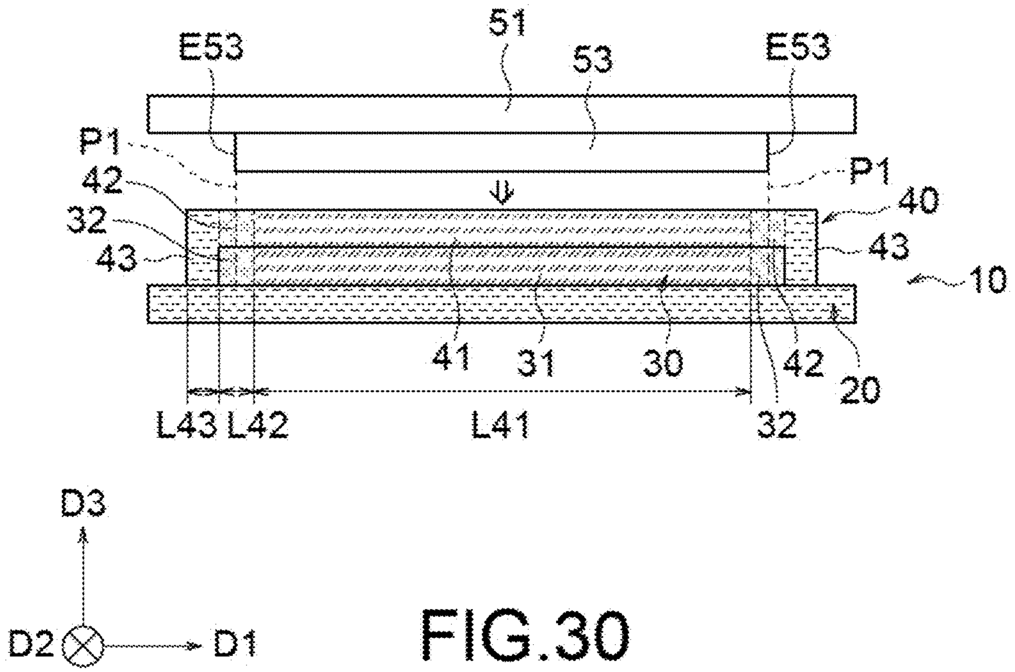
FIG. 30 is a sectional view showing a long phase difference film according to Example 1-1 together with a receiving film.

As shown in FIG. 30, the phase difference layer 40 included in the long phase difference film 10 of Example 1 included a first region 41 facing a central region 31 of the alignment layer 30 in the third direction D3, a pair of second regions 42 facing end regions 32 of the alignment layer 30 in the third direction D3, and a pair of third regions 43 located on the outer sides of the alignment layer 30 in the first direction D1 and facing the substrate 20 in the third direction D3. In the first region 41, the polymerizable liquid crystal compound was horizontally oriented at an orientation angle of 45°. In the second regions 42, the polymerizable liquid crystal compound was horizontally oriented at an orientation angle of 0°. In the third regions 43, the polymerizable liquid crystal compound was horizontally oriented. The third orientation angle of the polymerizable liquid crystal compound in the third region 43 that is one of the pair of third regions 43 spaced apart in the first direction D1 was 60°. The third orientation angle of the polymerizable liquid crystal compound in the other third region 43 was 87°. The in-plane phase difference Re in the first region 41 was 140 nm. As described above, the in-plane phase difference Re was measured with the product named "RETS-100" made by Otsuka Electronics Co., Ltd.

The width L41 of the first region 41 in the transverse direction (first direction D1) orthogonal to the longitudinal direction was 1250 mm. The width L42 of each of the second regions 42 in the transverse direction (first direction D1) orthogonal to the longitudinal direction was 30 mm. The width L43 of each of the third regions 43 in the transverse direction (first direction D1) orthogonal to the longitudinal direction was 5 mm.

Example 1-2

In Example 1-2, an intermediate 15 including a substrate 20 and an alignment layer 30 was prepared as in the case of Example 1-1. The alignment layer 30 of the obtained intermediate 15 included a central region 31 having an alignment control force to set the orientation angle to 45° and end regions 32 each having an alignment control force to set the orientation angle to 0°. However, in Example 1-2, a phase difference layer 40 was prepared on the intermediate 15 of which the length of each end region 32 of the alignment layer 30 in the first direction D1 was made longer than that of Example 1-1. The phase difference layer 40 was prepared with a preparation method similar to that of Example 1-1. However, in Example 1-2, the width of the phase difference layer 40 in the first direction D1 was made shorter than the width of the alignment layer 30 in the first direction D1. The phase difference layer 40 was located only in a region facing the alignment layer 30 in the third direction D3.

Figure 31:
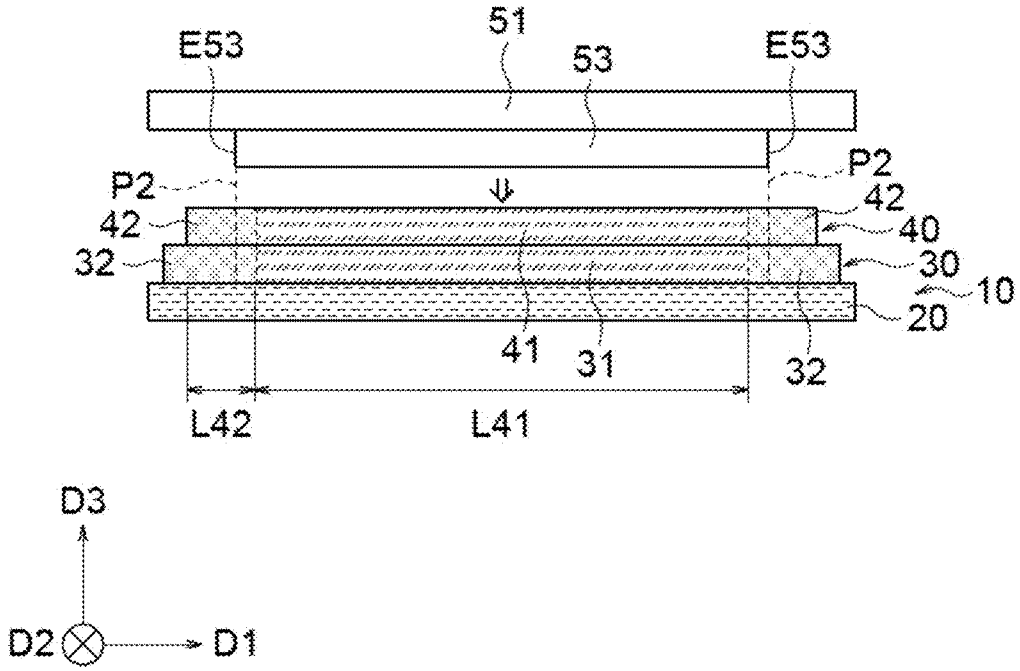
FIG. 31 is a sectional view showing a long phase difference film according to Example 1-2 together with a receiving film.

As shown in FIG. 31, the phase difference layer 40 included in the long phase difference film 10 of Example 1-2 included a first region 41 facing the central region 31 of the alignment layer 30 in the third direction D3 and a pair of second regions 42 facing the end regions 32 of the alignment layer 30 in the third direction D3. In the first region 41, the polymerizable liquid crystal compound was horizontally oriented at an orientation angle of 45°. In the second regions 42, the polymerizable liquid crystal compound was horizontally oriented at an orientation angle of 0°. The in-plane phase difference Re in the first region 41 was 140 nm. As described above, the in-plane phase difference Re was measured with the product named "RETS-100" made by Otsuka Electronics Co., Ltd.

The width L41 of the first region 41 in the transverse direction (first direction D1) orthogonal to the longitudinal direction was 1250 mm. The width L42 of each of the second regions 42 in the transverse direction (first direction D1) orthogonal to the longitudinal direction was 35 mm.

Example 2-1

In Example 2-1, an intermediate including a substrate and an alignment layer was prepared as in the case of Example 1-1. However, as described with reference to FIG. 15, exposure of a first coating layer was partial exposure with a mask, and only the central region of the first coating layer was subjected to polarized light exposure. In other words, an intermediate 115 including a substrate 120 and an alignment layer 130 was prepared with the above-described manufacturing method described with reference to FIGS. 13 to 16. In Example 2-1, a phase difference layer 140 was prepared with a preparation method similar to the preparation method for the phase difference layer 40 of Example 1-1. This method is the preparation method for the phase difference layer 140, described with reference to FIGS. 17 and 18.

In Example 2-1, an alignment control force with an orientation angle of 45° was imparted to the central region 131 of the alignment layer 130 of the obtained intermediate 115. No alignment control force was imparted to the end regions 132 of the obtained alignment layer 130.

Figure 32:
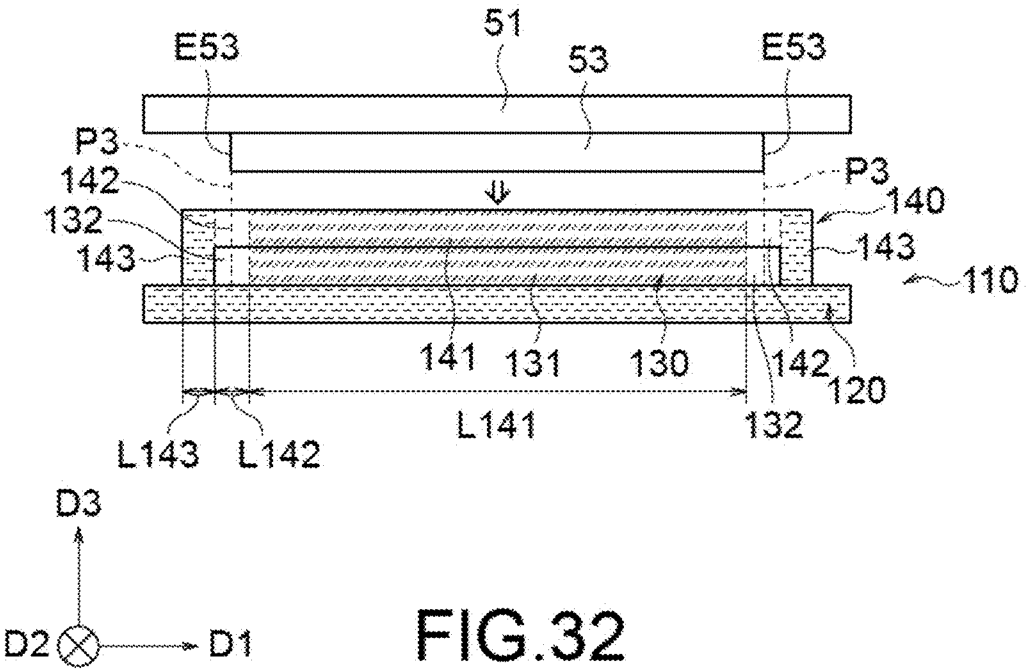
FIG. 32 is a sectional view showing a long phase difference film according to Example 2-1 together with a receiving film.

As shown in FIG. 32, the phase difference layer 140 included in a long phase difference film 110 of Example 2-1 included a first region 141 facing the central region 131 of the alignment layer 130 in the third direction D3, a pair of second regions 142 facing the end regions 132 of the alignment layer 130 in the third direction D3, and a pair of third regions 143 located on the outer sides of the alignment layer 130 in the first direction D1 and facing the substrate 120 in the third direction D3. In the first region 141, the polymerizable liquid crystal compound was horizontally oriented at an orientation angle of 45°. In the second region 142, the polymerizable liquid crystal compound had no orientation. In the third regions 143, the polymerizable liquid crystal compound was horizontally oriented. The third orientation angle of the polymerizable liquid crystal compound in the third region 143 that is one of the pair of third regions 143 spaced apart in the first direction D1 was 60°. The third orientation angle of the polymerizable liquid crystal compound in the other third region 143 was 87°. The in-plane phase difference Re in the first region 141 was 140 nm. As described above, the in-plane phase difference Re was measured with the product named "RETS-100" made by Otsuka Electronics Co., Ltd.

The width L141 of the first region 141 in the transverse direction (first direction D1) orthogonal to the longitudinal direction was 1250 mm. The width L142 of each of the second regions 142 in the transverse direction (first direction D1) orthogonal to the longitudinal direction was 30 mm. The width L143 of each of the third regions 143 in the transverse direction (first direction D1) orthogonal to the longitudinal direction was 5 mm.

Comparative Example 1

A manufacturing method for a long phase difference film 210 of Comparative Example 1 differed from the manufacturing method for the long phase difference film of Example 1-1 only in that all the regions of the first coating layer were exposed to the same polarized light. Therefore, in Comparative Example 1, an alignment layer 230 was imparted with an alignment control force to set the orientation angle to 45° in all the regions. In Comparative Example 1, the polymerizable liquid crystal compound was horizontally oriented at an orientation angle of 45° in all the regions facing the alignment layer 130 of the phase difference layer 240.

Figure 33:
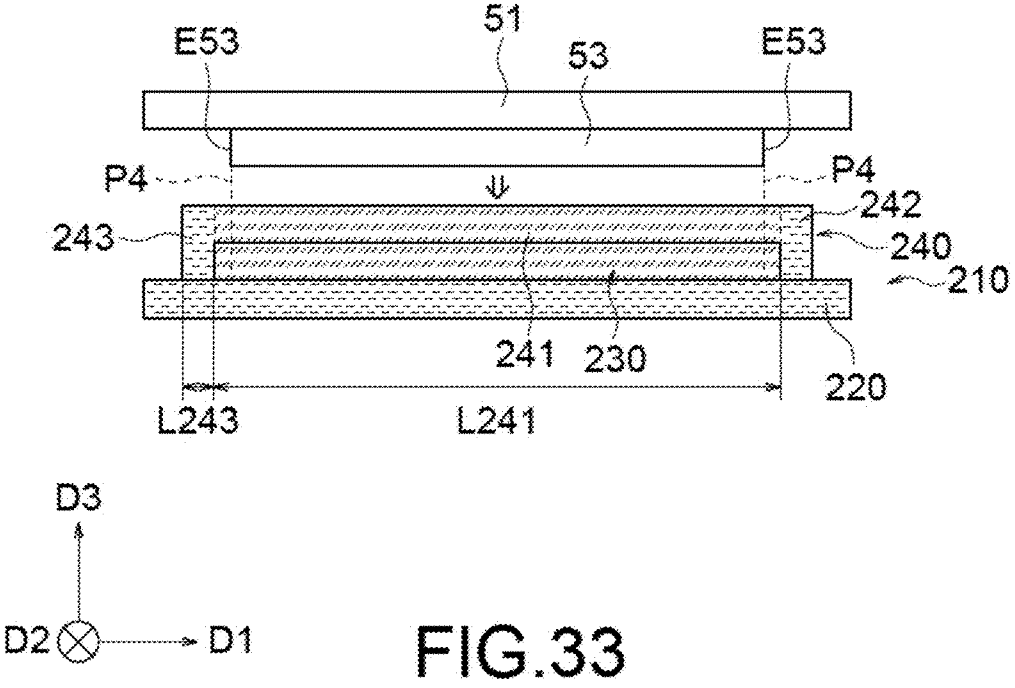
FIG. 33 is a sectional view showing a long phase difference film according to Comparative Example 1 together with a receiving film.

As shown in FIG. 33, the phase difference layer 240 included in the long phase difference film 210 of Comparative Example 1 included a first region 241 facing the alignment layer 230 in the third direction D3, and a pair of third regions 243 located on both outer sides of the alignment layer 230 in the first direction D1 and facing a substrate 220 in the third direction D3. In the first region 241, the polymerizable liquid crystal compound was horizontally oriented at an orientation angle of 45°. In the third regions 243, the polymerizable liquid crystal compound was horizontally oriented. The third orientation angle of the polymerizable liquid crystal compound in the third region 243 that is one of the pair of third regions 243 spaced apart in the first direction D1 was 60°. The third orientation angle of the polymerizable liquid crystal compound in the other third region 243 was 87°. The in-plane phase difference Re in the first region was 140 nm. As described above, the in-plane phase difference Re was measured with the product named "RETS-100" made by Otsuka Electronics Co., Ltd.

The width L241 of the first region 241 in the transverse direction (first direction D1) orthogonal to the longitudinal direction was 1310 mm. The width L243 of each of the third regions 243 in the transverse direction (first direction D1) orthogonal to the longitudinal direction was 5 mm. The phase difference layer of the long phase difference film of Comparative Example 1 had such a configuration that the configuration of the first region 41 was applied to the region of the second regions 42 of the phase difference layer of the long phase difference film of Example 1-1.

Comparative Example 2

A manufacturing method for a long phase difference film of Comparative Example 2 differed from the manufacturing method for the long phase difference film of Example 2-1 only in that all the regions of the first coating layer were exposed to polarized light. Therefore, in Comparative Example 2, an alignment layer was imparted with an alignment control force to set the orientation angle to 45° in all the regions. In Comparative Example 2, the polymerizable liquid crystal compound was horizontally oriented at an orientation angle of 45° in all the regions facing the alignment layer of a phase difference layer.

Figure 34:
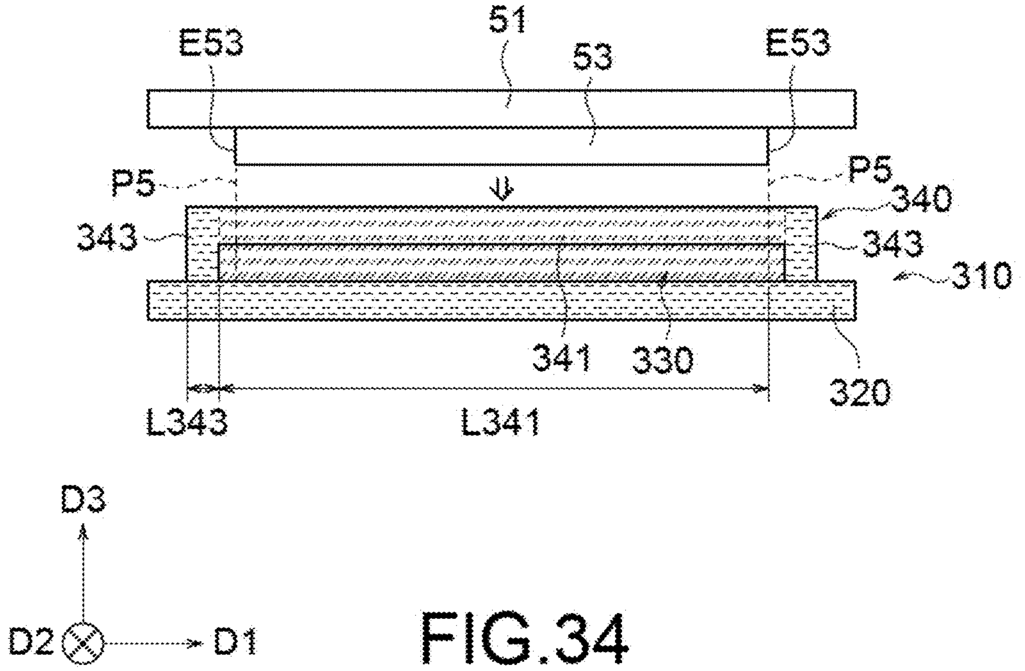
FIG. 34 is a sectional view showing a long phase difference film according to Comparative Example 2 together with a receiving film.

As shown in FIG. 34, a phase difference layer 340 included in a long phase difference film 310 of Comparative Example 2 included a first region 341 facing an alignment layer 330 in the third direction D3, and a pair of third regions 343 located on both outer sides of the alignment layer 330 in the first direction D1 and facing a substrate 320 in the third direction D3. In the first region 341, the polymerizable liquid crystal compound was horizontally oriented at an orientation angle of 45°. In the third regions 343, the polymerizable liquid crystal compound was horizontally oriented. The third orientation angle of the polymerizable liquid crystal compound in the third region 343 that is one of the pair of third regions 343 spaced apart in the first direction D1 was 60°. The third orientation angle of the polymerizable liquid crystal compound in the other third region 343 was 87°. The in-plane phase difference Re in the first region was 140 nm. As described above, the in-plane phase difference Re was measured with the product named "RETS-100" made by Otsuka Electronics Co., Ltd.

The width L341 of the first region 341 in the transverse direction (first direction D1) orthogonal to the longitudinal direction was 1310 mm. The width L343 of each of the third regions 343 in the transverse direction (first direction D1) orthogonal to the longitudinal direction was 5 mm. The phase difference layer of the long phase difference film of Comparative Example 2 had such a configuration that the configuration of the first region 41 was applied to the region of the second regions 42 of the phase difference layer of the long phase difference film of Example 2-1.

Comparative Example 3

In Comparative Example 3, an intermediate including a substrate and an alignment layer was prepared as in the case of Example 2-1. The alignment layer of the obtained intermediate included a central region having an alignment control force to set the orientation angle to 45° and end regions each having no alignment control force. However, in Comparative Example 3, the length of each end region of the alignment layer in the first direction D1 was made longer than that of Example 2-1. A phase difference layer was prepared on the intermediate. The phase difference layer was prepared with a preparation method similar to that of Example 2-1. However, in Comparative Example 3, the width of the phase difference layer in the first direction was made shorter than the width of the alignment layer in the first direction. The phase difference layer was located only in a region facing the alignment layer in the third direction D3.

Figure 35:
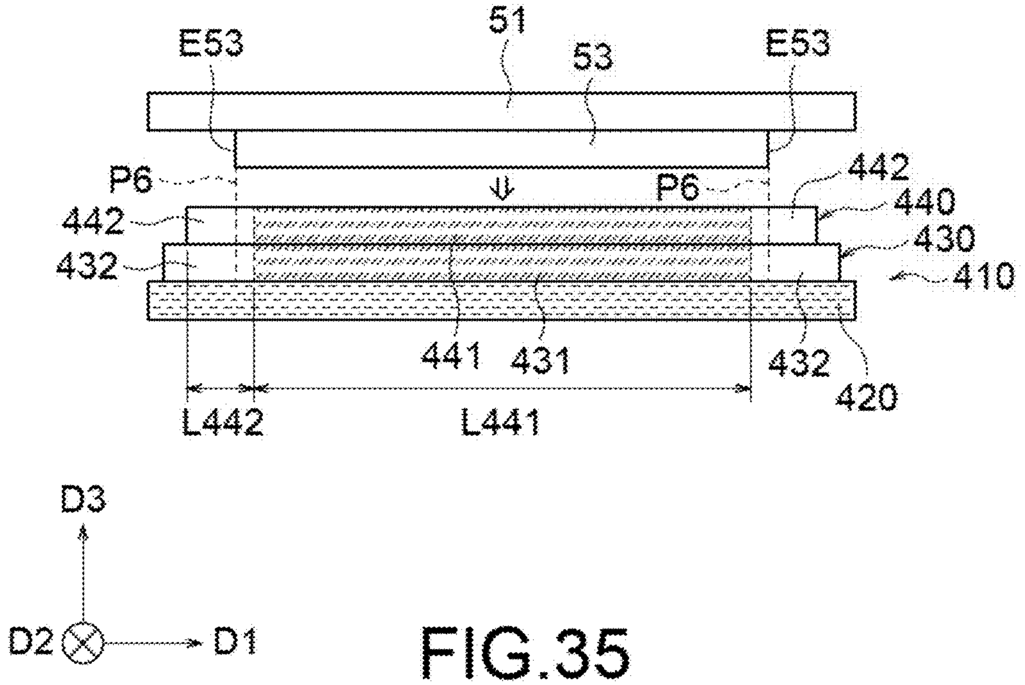
FIG. 35 is a sectional view showing a long phase difference film according to Comparative Example 3 together with a receiving film.

As shown in FIG. 35, in a long phase difference film 410 of Comparative Example 3, a phase difference layer 440 included a first region 441 facing a central region 431 of the alignment layer 430 in the third direction D3 and second regions 442 facing end regions 432 of the alignment layer 430 in the third direction D3. In the first region 441, the polymerizable liquid crystal compound was horizontally oriented at an orientation angle of 45°. In the second region 442, the polymerizable liquid crystal compound had no orientation. The in-plane phase difference Re in the first region was 140 nm. As described above, the in-plane phase difference Re was measured with the product named "RETS-100" made by Otsuka Electronics Co., Ltd.

The width L441 of the first region 441 in the transverse direction (first direction D1) orthogonal to the longitudinal direction was 1250 mm. The width L442 of each of the second regions 442 in the transverse direction (first direction D1) orthogonal to the longitudinal direction was 30 mm. The phase difference layer of the long phase difference film of Comparative Example 3 had such a configuration that the configuration of the second region 42 was applied to the region of the third regions 43 of the phase difference layer of the long phase difference film of Example 2-1.

<Evaluation>

With a transfer method described with reference to FIGS. 22 to 27, long optical films were prepared with a roll-to-roll process by laminating the long phase difference films 10, 110, 210, 310, 410 of Example 1-1, Example 1-2, Example 2-1, Comparative Example 1, Comparative Example 2, and Comparative Example 3 on the long receiving films 50 each including the bonding layer 53 and then peeling off the substrates 20, 120, 220, 320, 420 from the long phase difference films 10, 110, 210, 310, 410 each bonded to the bonding layer 53. The length of each of the long phase difference film and the receiving film in the second direction D2 was about 20 m, and a long optical film with a length of about 20 m was prepared.

(Receiving Film)

As shown in FIGS. 30 to 35, the receiving film 50 included the substrate 51 and the bonding layer 53. The receiving films have the same configuration among Example 1-1, Example 1-2, Example 2-1, Comparative Example 1, Comparative Example 2, and Comparative Example 3. FUJITAC TD80 UL (thickness 80 μm, TAC film (A)) made by FUJIFILM Corporation was used as the substrate of the receiving film. A long receiving film was prepared by laminating a bonding layer on the substrate. The bonding layer was PANACLEAN PD-S1 (made by Panac Co., Ltd.) (thickness 25 μm). The width W51 (see FIG. 21) of the substrate in the transverse direction (first direction D1) in the receiving film was 1330 mm. The width W53 (see FIG. 21) of the bonding layer in the transverse direction (first direction D1) in the receiving film was 1280 mm.

Example 1-1

As shown in FIG. 30, the long phase difference film 10 of Example 1-1 was laminated with the receiving film 50. Both ends E53 of the bonding layer 53 of the receiving film 50 in the first direction D1 faced the second regions 42 of the phase difference layer 40 in the third direction D3. The phase difference layer and the alignment layer were transferred onto the receiving film by peeling off the substrate from the long phase difference film, with the result that a long optical film was obtained. The phase difference layer and the alignment layer were torn at positions P1 facing the ends E53 of the bonding layer in the second regions. Parts of the phase difference layer and the alignment layer on the outer sides in the first direction D1 than the torn positions P1 remained on the substrate.

Example 1-2

As shown in FIG. 31, the long phase difference film 10 of Example 1-2 was laminated with the receiving film 50. Both ends E53 of the bonding layer 53 of the receiving film 50 in the first direction D1 faced the second regions 42 of the phase difference layer 40 in the third direction D3. The phase difference layer and the alignment layer were transferred onto the receiving film by peeling off the substrate from the long phase difference film, with the result that a long optical film was obtained. The phase difference layer and the alignment layer were torn at positions P2 in the second regions, and parts on the outer sides of the positions P2 in the first direction D1 remained on the substrate.

Example 2-1

As shown in FIG. 32, the long phase difference film 110 of Example 2-1 was laminated with the receiving film 50. Both ends E53 of the bonding layer 53 of the receiving film 50 in the first direction D1 faced the second regions 142 of the phase difference layer 140 in the third direction D3. The phase difference layer and the alignment layer were transferred onto the receiving film by peeling off the substrate from the long phase difference film, with the result that a long optical film was obtained. The phase difference layer and the alignment layer were torn at positions P3 facing the ends E53 of the bonding layer in the second regions in the first direction D1. Parts of the phase difference layer and the alignment layer on the outer sides in the first direction D1 than the torn positions P3 remained on the substrate.

Comparative Example 1

As shown in FIG. 33, the long phase difference film 210 of Comparative Example 1 was laminated with the receiving film 50. Both ends E53 of the bonding layer 53 of the receiving film 50 in the first direction D1 faced the first region 241 of the phase difference layer 240 in the third direction D3. The phase difference layer and the alignment layer were transferred onto the receiving film by peeling off the substrate from the long phase difference film, with the result that a long optical film was obtained. The phase difference layer and the alignment layer were torn at positions P4 in the first region, and parts on the outer sides of the positions P4 in the first direction D1 remained on the substrate.

Comparative Example 2

As shown in FIG. 34, the long phase difference film 310 of Comparative Example 2 was laminated with the receiving film 50. Both ends E53 of the bonding layer 53 of the receiving film 50 in the first direction D1 faced the first region 341 of the phase difference layer 340 in the third direction D3. The phase difference layer and the alignment layer were transferred onto the receiving film by peeling off the substrate from the long phase difference film, with the result that a long optical film was obtained. The phase difference layer and the alignment layer were torn at positions P5 in the first region, and parts on the outer sides of the positions P5 in the first direction D1 remained on the substrate.

Comparative Example 3

As shown in FIG. 35, the long phase difference film 410 of Comparative Example 3 was laminated with the receiving film 50. Both ends E53 of the bonding layer 53 of the receiving film 50 in the first direction D1 faced the second regions 442 of the phase difference layer 440 in the third direction D3. The phase difference layer and the alignment layer were transferred onto the receiving film by peeling off the substrate from the long phase difference film, with the result that a long optical film was obtained. The phase difference layer and the alignment layer were torn at positions P6 in the second regions in the first direction D1 in part of the region in the longitudinal direction, and parts on the outer sides of the positions P6 in the first direction D1 remained on the substrate. The phase difference layer and the alignment layer were not torn at positions P6 facing the ends E53 of the bonding layer 53 in the other wide regions in the longitudinal direction and were transferred onto the receiving film 50 over all the width of each second region in the first direction D1.

Evaluation Results

Occurrence of burrs at ends of the phase difference layer was checked for the long optical films prepared as Example 1-1, Example 1-2, Example 2-1, Comparative Example 1, Comparative Example 2, and Comparative Example 3. No burrs occurred in Example 1-1, Example 1-2, and Example 2-1. Burrs were observed in Comparative Example 1, Comparative Example 2, and Comparative Example 3.

As for Comparative Example 3, in the wide region in the longitudinal direction, the phase difference layer and the alignment layer were not torn at the positions P6 in the second regions in the first direction D1, and one second region of the phase difference layer in the first direction D1 was transferred onto the receiving film over the entire width including its end. The alignment layer was also transferred onto the receiving film over the entire width including its ends in the wide region in the longitudinal direction. As a result, in a partial region in the longitudinal direction of the long optical film, obtained as Comparative Example 3, there was the second region of the phase difference layer, extending outward in the first direction D1 beyond the bonding layer. The second region extending beyond the bonding layer was not bonded to the bonding layer. The second region extending beyond the bonding layer remained on the long optical film as burrs or foreign substance ruptured from the phase difference layer. During manufacturing of the long optical film according to Comparative Example 3, a part not bonded to the bonding layer of the phase difference layer contacted the first region of the phase difference layer, and, therefore, the first region was partially damaged to such an extent as to be not handled as a product. Such an inconvenience did not occur in Example 1-1, Example 1-2, Example 2-1, Comparative Example 1, or Comparative Example 2.

Figure 36:
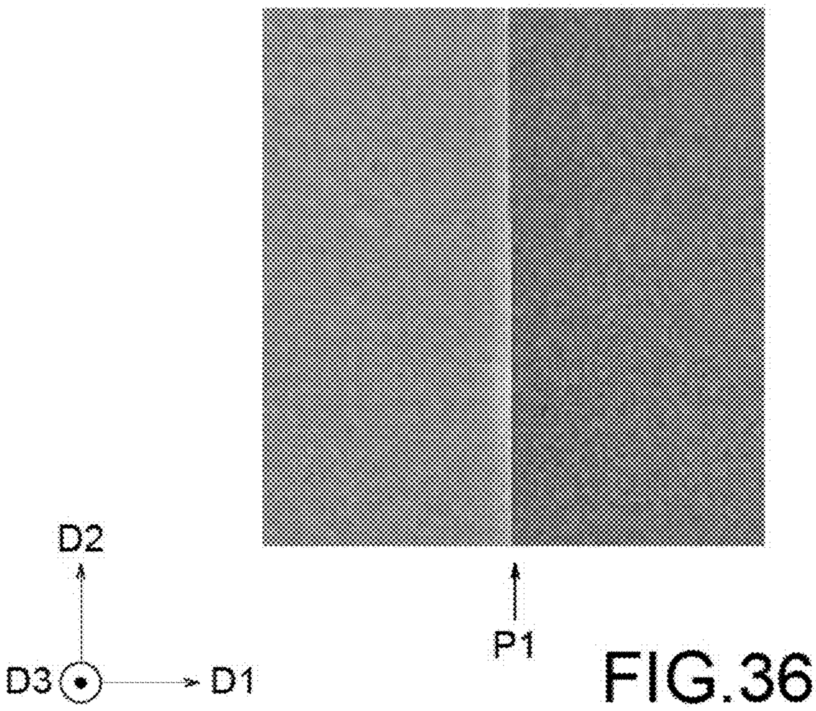
FIG. 36 is a photograph showing the long optical film according to Example 1-1.
Figure 37:
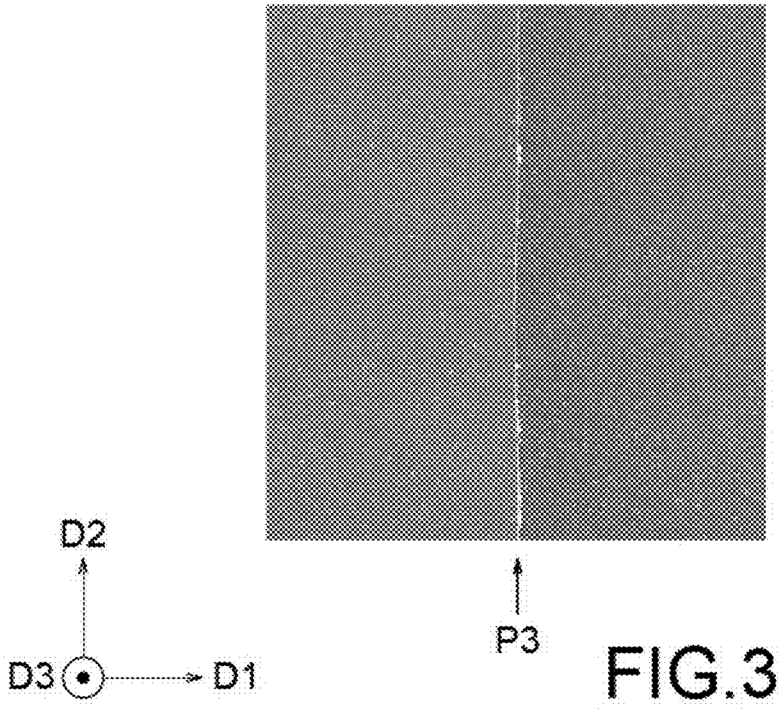
FIG. 37 is a photograph showing the long optical film according to Example 2-1.
Figure 38:
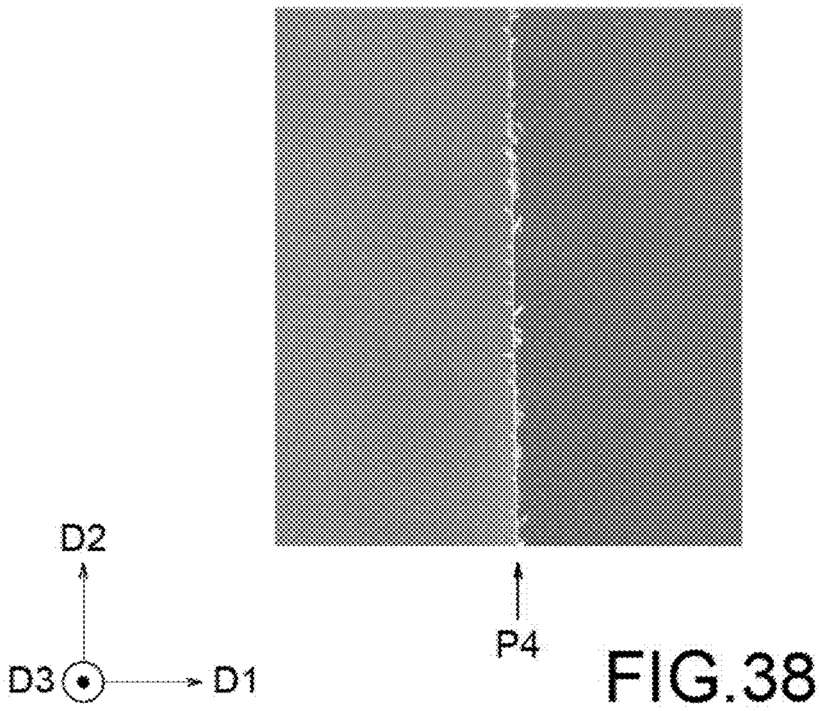
FIG. 38 is a photograph showing the long optical film according to Comparative Example 1.
Figure 39:
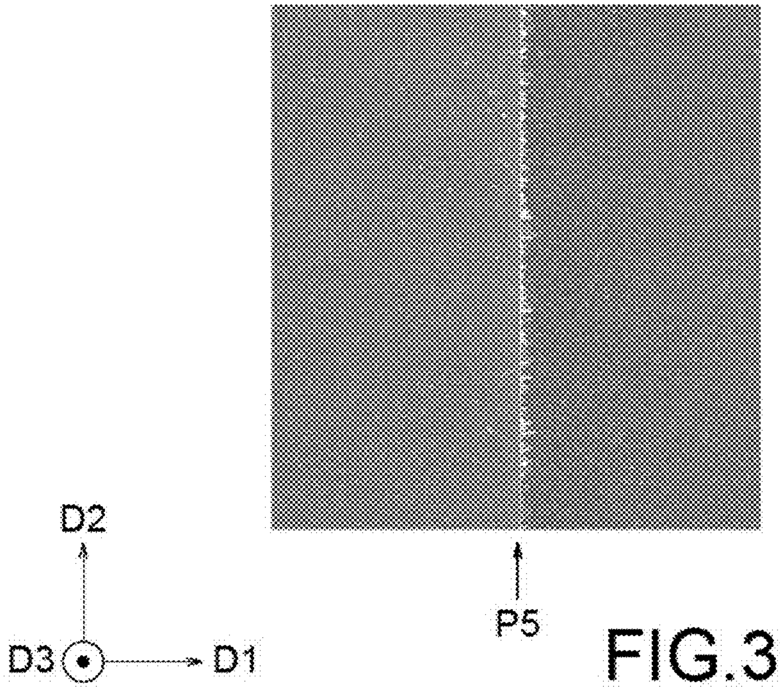
FIG. 39 is a photograph showing the long optical film according to Comparative Example 2.
Figure 40:
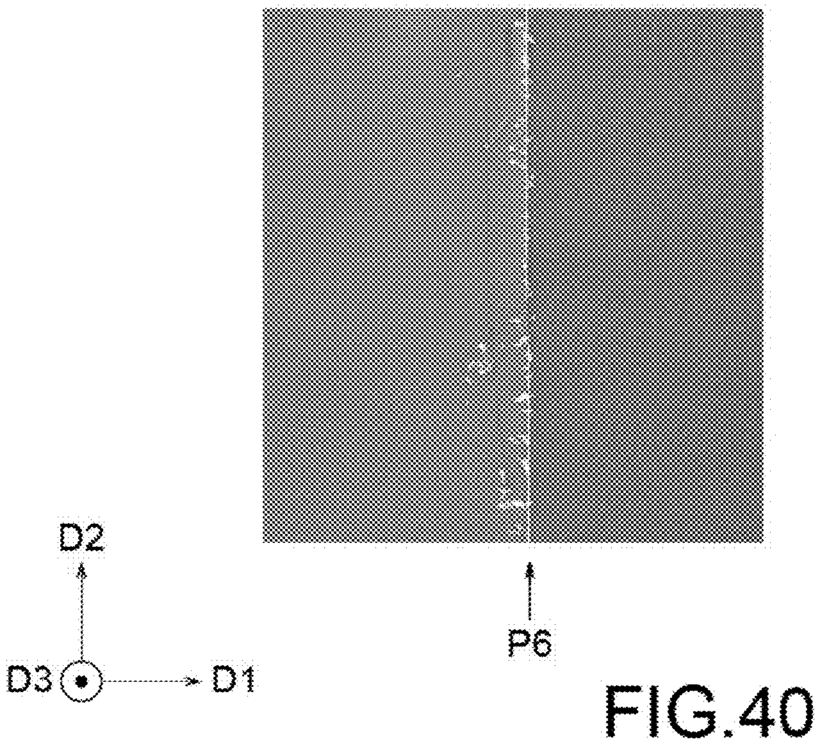
FIG. 40 is a photograph showing the long optical film according to Comparative Example 3.

FIG. 36 is a light microscope photograph showing the end in the first direction D1 of the phase difference layer 40 of the long optical film 55 obtained as Example 1-1. FIG. 37 is a light microscope photograph showing the end in the first direction D1 of the phase difference layer 140 of the long optical film 155 obtained as Example 2-1. FIG. 38 is a photograph showing the end in the first direction D1 of the phase difference layer of the long optical film obtained as Comparative Example 1. FIG. 39 is a photograph showing the end in the first direction D1 of the phase difference layer of the long optical film obtained as Comparative Example 2. FIG. 40 is a light microscope photograph showing the end in the first direction D1 of the phase difference layer of the long optical film obtained as Comparative Example 3. The scale of the photographs shown in FIGS. 36 to 40 is twice. In the photographs shown in FIGS. 36 to 40, the phase difference layer and the alignment layer are transferred to the left-side region.

The embodiments and their modifications have been described above; of course, a combination of some of the embodiments and the modifications is applicable as needed.

REFERENCE SIGNS LIST

10, 110 long phase difference film
10R, 110R rolled body
10X, 110X phase difference film
12 take-up core
15 intermediate
20, 120 substrate
30, 130 alignment layer
30P, 130P alignment layer
31, 131 central region
32, 132 end region
35, 135 first coating layer
40, 140 phase difference layer
40P, 140P phase difference layer
41, 141 first region
42, 142 second region
43, 143 third region
44, 144 liquid crystal composition
45, 145 second coating layer
50 receiving film
50R rolled body
52 polarizing layer
53 bonding layer
55 long optical film
55R rolled body
55X, 155X optical film
60, 160 long polarizing film
60R, 160R rolled body
60X, 160X polarizing film
70 manufacturing apparatus
71 supply core
72 take-up core
73 conveyance roll
76 first supply apparatus
77 first drying apparatus
78 first curing apparatus
78A first exposure apparatus
78B first mask
78C second exposure apparatus
78D second mask
81 second supply apparatus
82 second drying apparatus
83 second curing apparatus
90 manufacturing apparatus
91 first supply core
92 second supply core
93 first take-up core
94 second take-up core
95 conveyance roll
95A first conveyance roll
95B second conveyance roll
100 display
103 organic EL display panel
D1 first direction
D2 second direction D3 third direction
A20 substrate slow axis
A41 first slow axis
A42 second slow axis
A43 third slow axis
θ41 first orientation angle
θ42 second orientation angle
θ43 third orientation angle

The invention claimed is:

1. A long phase difference film having a longitudinal direction and a transverse direction, the long phase difference film comprising:
- a substrate; and
- an alignment layer and a phase difference layer superimposed to the substrate,
- wherein
- the phase difference layer includes a first region, a pair of second regions, and a pair of third regions,
- the first region is located between the pair of second regions in the transverse direction,
- the pair of second regions is located between the pair of third regions in the transverse direction,
- the phase difference layer contains cured material of a liquid crystal composition,
- the alignment layer is located between the substrate and the first and second regions,
- the second region has a second slow axis,
- a second orientation angle between the second slow axis and the longitudinal direction is larger than or equal to 0° and smaller than 10° or larger than 170° and smaller than 180°,
- the third region has a third slow axis, and
- an absolute value of a value obtained by subtracting 90° from a third orientation angle between the third slow axis and the longitudinal direction is smaller than an absolute value of a value obtained by subtracting 90° from the second orientation angle,
- the third region is in contact with the substrate,
- the substrate includes a polyethylene terephthalate film having a slow axis,
- an absolute value of a value obtained by subtracting 90° from an angle between the slow axis of the polyethylene terephthalate film and the longitudinal direction is smaller than an absolute value of a value obtained by subtracting 90° from the second orientation angle.

2. The long phase difference film according to claim 1, wherein
- the first region has a first slow axis, and
- an absolute value of a value obtained by subtracting 90° from a first orientation angle between the first slow axis and the longitudinal direction is smaller than an absolute value of a value obtained by subtracting 90° from the second orientation angle.

3. The long phase difference film according to claim 2, wherein the first orientation angle is larger than or equal to 10° and smaller than or equal to 170°.

4. The long phase difference film according to claim 2, wherein the first orientation angle is larger than or equal to 30° and smaller than or equal to 150°.

5. The long phase difference film according to claim 1, wherein the first region includes a center of the phase difference layer in the transverse direction.

6. The long phase difference film according to claim 1, wherein a length of the second region in the transverse direction is larger than or equal to 1 mm and smaller than or equal to 100 mm.

7. The long phase difference film according to claim 1, wherein a length of the first region in the transverse direction is larger than or equal to 12 times a length of the second region in the transverse direction.

8. The long phase difference film according to claim 1, wherein the third orientation angle is larger than or equal to 40° and smaller than or equal to 140°.

9. The long phase difference film according to claim 1, wherein the third region includes an end of the phase difference layer in the transverse direction.

10. The long phase difference film according to claim 1, wherein the alignment layer includes a photo-alignment layer.

11. The long phase difference film according to claim 1, wherein an angle between the slow axis of the polyethylene terephthalate film and the longitudinal direction is larger than or equal to 40° and smaller than or equal to 140°.

12. The long phase difference film according to claim 1, wherein a length of the third region in the transverse direction is larger than or equal to 0.5 mm and smaller than or equal to 50 mm.

13. The long phase difference film according to claim 1, wherein
- an in-plane phase difference Re(450) in the first region of the phase difference layer at a wavelength of 450 nm is smaller than an in-plane phase difference Re(550) in the first region of the phase difference layer at a wavelength of 550 nm,
- the in-plane phase difference Re(550) is smaller than an in-plane phase difference Re(650) in the first region of the phase difference layer at a wavelength of 650 nm, and
- the in-plane phase difference Re(550) is larger than or equal to 130 nm and smaller than or equal to 153 nm.

14. A manufacturing method for a long optical film, the manufacturing method comprising:
- laminating the long phase difference film according to claim 1 to a long receiving film including a bonding layer; and
- peeling the substrate from the long phase difference film bonded to the bonding layer.

15. The manufacturing method for a long optical film according to claim 14, wherein
- the long optical film includes the first region of the phase difference layer and part of the second region of the phase difference layer, and
- the third region of the phase difference layer and remaining part of the second region, other than the part of the second region, remain on the substrate.

16. The manufacturing method for a long optical film according to claim 14, wherein
- in a state where the long phase difference film is laminated to the receiving film, the second region faces an end of the bonding layer in the transverse direction, and the third region is located on an outer side of the bonding layer in the transverse direction and faces the substrate of the receiving film.

17. The manufacturing method for a long optical film according to claim 14, wherein the receiving film includes a polarizing layer containing a polarizer.

* * * * *